US012119961B2

United States Patent
Shimoda et al.

(10) Patent No.: US 12,119,961 B2
(45) Date of Patent: Oct. 15, 2024

(54) USER APPARATUS, BASE STATION, AND COMMUNICATION SYSTEM

(71) Applicant: Mitsubishi Electric Corporation, Chiyoda-ku (JP)

(72) Inventors: Tadahiro Shimoda, Tokyo (JP); Mitsuru Mochizuki, Tokyo (JP); Fumihiro Hasegawa, Chiyoda-ku (JP); Noriyuki Fukui, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 18/297,079

(22) Filed: Apr. 7, 2023

(65) Prior Publication Data

US 2023/0254185 A1    Aug. 10, 2023

Related U.S. Application Data

(62) Division of application No. 17/040,849, filed as application No. PCT/JP2019/012736 on Mar. 26, 2019, now abandoned.

(30) Foreign Application Priority Data

Apr. 4, 2018  (JP) ................ 2018-072042

(51) Int. Cl.
  *H04L 25/02*    (2006.01)
  *H04L 5/00*    (2006.01)
  *H04L 27/26*    (2006.01)
  *H04W 72/1268*    (2023.01)

(52) U.S. Cl.
  CPC ........ *H04L 25/0226* (2013.01); *H04L 5/0048* (2013.01); *H04L 27/2605* (2013.01); *H04W 72/1268* (2013.01)

(58) Field of Classification Search
  None
  See application file for complete search history.

(56) References Cited

U.S. PATENT DOCUMENTS

| 2011/0275382 A1* | 11/2011 | Hakola ................. H04W 24/10 |
| | | 455/452.2 |
| 2013/0194908 A1 | 8/2013 | Gao et al. |
| 2013/0229989 A1 | 9/2013 | Natarajan et al. |

(Continued)

FOREIGN PATENT DOCUMENTS

WO    WO 2017/075807 A1    5/2017

OTHER PUBLICATIONS

Notice of Reasons for Refusal issued May 16, 2023 in Japanese Patent Application No. 2020-511713 (with English language translation), 8 pages.

(Continued)

*Primary Examiner* — Lonnie V Sweet
(74) *Attorney, Agent, or Firm* — PROCOPIO, CORY, HARGREAVES & SAVITCH LLP

(57) ABSTRACT

A user apparatus in a communication system includes: a plurality of user apparatuses each of which is configured to transmit a sounding reference signal (SRS); and a base station configured to wirelessly communicate with the plurality of the user apparatuses. The user apparatus receives, from the base station, configuration information related to a wireless resource of the sounding reference signal allocated to another user apparatus.

6 Claims, 38 Drawing Sheets

(56) References Cited

U.S. PATENT DOCUMENTS

| | | |
|---|---|---|
| 2015/0222402 A1 | 8/2015 | Ouchi et al. |
| 2017/0290041 A1 | 10/2017 | Rico Alvarino et al. |
| 2017/0325258 A1 | 11/2017 | Nogami |
| 2018/0220448 A1* | 8/2018 | Akkarakaran ........ H04L 5/0023 |
| 2018/0254869 A1 | 9/2018 | Li et al. |
| 2018/0278384 A1 | 9/2018 | Manolakos |
| 2019/0182794 A1* | 6/2019 | Wong ................ H04W 52/0216 |
| 2020/0314706 A1* | 10/2020 | Xing ....................... H04B 7/024 |
| 2020/0322119 A1* | 10/2020 | Matsumura ........... H04L 5/0037 |
| 2021/0135808 A1 | 5/2021 | Choi |
| 2021/0136794 A1* | 5/2021 | Takeda .............. H04W 72/1268 |
| 2021/0306038 A1* | 9/2021 | Kim ..................... H04B 7/0695 |

OTHER PUBLICATIONS

International Search Report issued on Jun. 18, 2019 in PCT/JP2019/012736 filed on Mar. 26, 2019, 2 pages.
"3rd Generation Partnership Project;Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.3.0, Jun. 2017, 331 total pages.
"LS on HNB/HeNB Open Access Mode," 3GPP SA WG1, 3GPP TSG-SA1 #42, S1-083461, Oct. 2008, 2 total pages.
"3rd Generation Partnership Project; Technical Specification Group Radio Access Network; Evolved Universal Terrestrial Radio Access (E-UTRA); Further advancements for E-UTRA physical layer aspects (Release 9)," 3GPP TR 36.814 V9.2.0, Mar. 2017, 105 total pages.
"3rd Generation Partnership Project; Technical Specification Group Radio Access Network; Feasibility study for Further Advancements for E-UTRA (LTE-Advanced)(Release 14)," 3GPP TR 36.912 V14.0.0, Mar. 2017, 254 total pages.
"Scenarios, requirements and KPIs for 5G mobile and wireless system," Metis, ICT-317669-METIS/D1.1, Apr. 2013, 84 total pages.
"3rd Generation Partnership Project; Technical Specification Group Services and System Aspects; Study on Architecture for Next Generation System (Release 14)," 3GPP TR 23.799 V14.0.0, Dec. 2016, 522 total pages.
"3rd Generation Partnership Project; Technical Specification Group Radio Access Network; Study on new radio access technology: Radio access architecture and interfaces (Release 14)," 3GPP TR 38.801 V14.0.0, Mar. 2017, 91 total pages.
"3rd Generation Partnership Project; Technical Specification Group Radio Access Network; Study on New Radio Access Technology Physical Layer Aspects (Release 14)," 3GPP TR 38.802 V14.1.0, Jun. 2017, 144 total pages.
"3rd Generation Partnership Project; Technical Specification Group Radio Access Network; Study on New Radio Access Technology; Radio Interface Protocol Aspects (Release 14)," 3GPP TR 38.804 V14.0.0, Mar. 2017, 57 total pages.
"3rd Generation Partnership Project; Technical Specification Group Radio Access Network; Study on New Radio (NR) access technology (Release 14)," 3GPP TR 38.912 V14.0.0, Mar. 2017, 74 total pages.
"Revised WID on New Radio Access Technology," NTT Docomo, Inc., 3GPP TSG RAN Meeting #77, RP-172115, Sep. 2017, 48 total pages.
"3rd Generation Partnership Project; Technical Specification Group Radio Access Network; Evolved Universal Terrestrial Radio Access (E-UTRA) and NR; Multi connectivity; Stage 2 (Release 15)," 3GPP TS 37.340 V15.0.0, Dec. 2017, 51 total pages.
"3rd Generation Partnership Project; Technical Specification Group Radio Access Network; NR; Physical channels and modulation (Release 15)," 3GPP TS 38.211 V15.0.0, Dec. 2017, 73 total pages.
"3rd Generation Partnership Project; Technical Specification Group Radio Access Network; NR; Physical layer procedures for control (Release 15)," 3GPP TS 38.213 V15.0.0, Dec. 2017, 56 total pages.
"3rd Generation Partnership Project; Technical Specification Group Radio Access Network; NR; Physical layer procedures for data (Release 15)," 3GPP TS 38.214 V15.0.0, Dec. 2017. 71 total pages.
"3rd Generation Partnership Project; Technical Specification Group Radio Access Network; NR; NR and NG-RAN Overall Description; Stage 2 (Release 15)," 3GPP TS 38.300 V15.0.0, Dec. 2017, 68 total pages.
"3rd Generation Partnership Project; Technical Specification Group Radio Access Network; NR; Medium Access Control (MAC) protocol specification (Release 15)," 3GPP TS 38.321 V15.0.0, Dec. 2017, 55 total pages.
"Maintenance for SRS," Qualcomm Incorporated. 3GPP TSG RAN WG1 Meeting #92, R1-1802830, 2018, 6 total pages.
"Remaining issues on rate matching for PDSCH and PUSCH," CATT, 3GPP TSG RAN WG1 Meeting #92, R1-1801741, 2018, 5 total pages.
"Remaining issues on long PUCCH formats," CATT, 3GPP TSG RAN WG1 Meeting #92, R1-1801732, 2018, 5 total pages.
"Correction on aperiodic SRS trigger time offset in 38.214," Huawei, HiSilicon, 3GPP TSG-RAN WG1 Ad Hoc Meeting, R1-1800935, Jan. 2018, 2 total pages.
"WF on measurement for a UE on bandwidth part operation," 3GPP TSG RAN1 #90, R1-1715277, Aug. 2017, 2 total pages.
"On Bandwidth Part Operation," Samsung, 3GPP TSG RAN WG1 Meeting #91, R1-1720349, 2017, 5 total pages.
"Multiplexing data with different transmission durations," NTT Docomo, Inc., 3GPP TSG RAN WG1 Meeting AH 1801, R1-1800679, Jan. 2018, 4 total pages.
"3rd Generation Partnership Project; Technical Specification Group Radio Access Network; NR; Multiplexing and channel coding (Release 15)," 3GPP TS 38.212 V15.0.0, Dec. 2017, 82 total pages.
"UL SRS design for beam management and CSI acquisition," Huawei, HiSilicon, 3GPP TSG RAN WG1 NR Ad Hoc Meeting, R1-1709936, Jun. 2017, 8 total pages.
"Add sTTI support to 6.3.4 On/Off Mask section," Ericsson, Qualcomm, Huawei, 3GPP TSG-RAN WG4 Meeting #84Bis, R4-1714193, 2017, 18 total pages.
Extended European Search Report issued Nov. 24, 2021 in European Patent Application No. 19781845.3, 8 pages.
Huawei, et al., "UL SRS design for beam management, CSI acquisition," 3GPP TSG RAN WG1 Meeting #89 R1-1706938, XP051272168, May 2017, 9 pages.
Indian Office Action issued Aug. 10, 2022 in Indian Patent Application No. 202047041089, 7 pages.
Combined Chinese Office Action and Search Report issued Jul. 1, 2023, in corresponding Chinese Patent Application No. 201980023136.5 (with English Translation), 17 pages.
European Patent Office, Extended European Search Report, Application No. 23201863.0, dated Nov. 28, 2023, in 9 pages.
Intellectual Property Office of India, Office Action, Application No. 202348029471, dated May 31, 2024, in 6 pages.
Japanese Patent Office, Office Action, Application No. 2023-105728, dated Aug. 27, 2024, in 8 pages.

* cited by examiner

F I G. 1
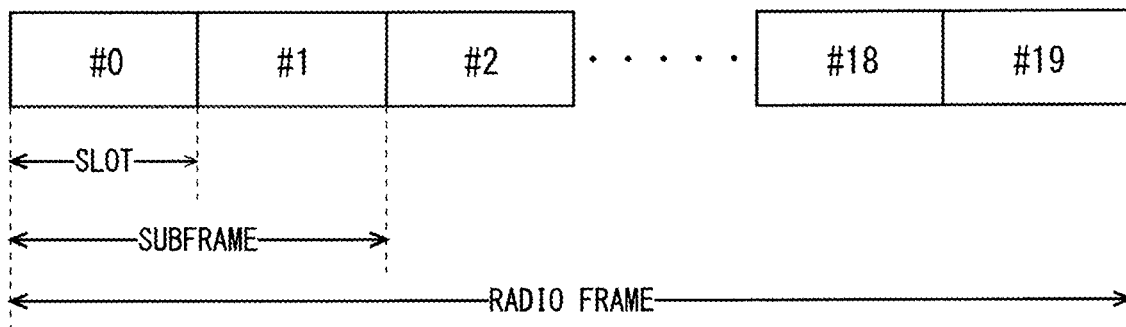

FIG. 13

F I G. 1 4
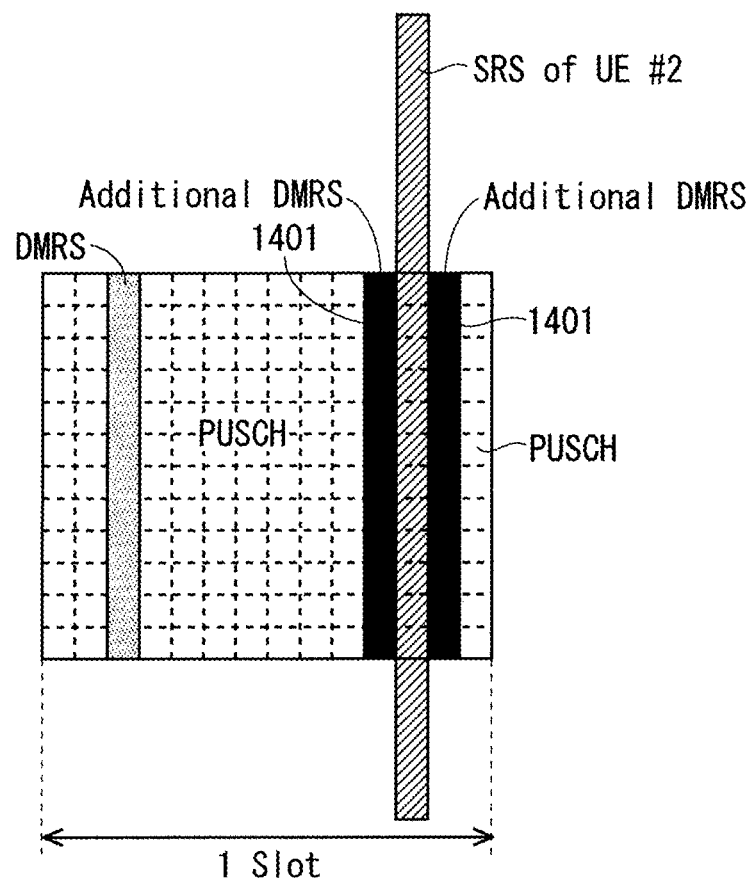

F I G. 15
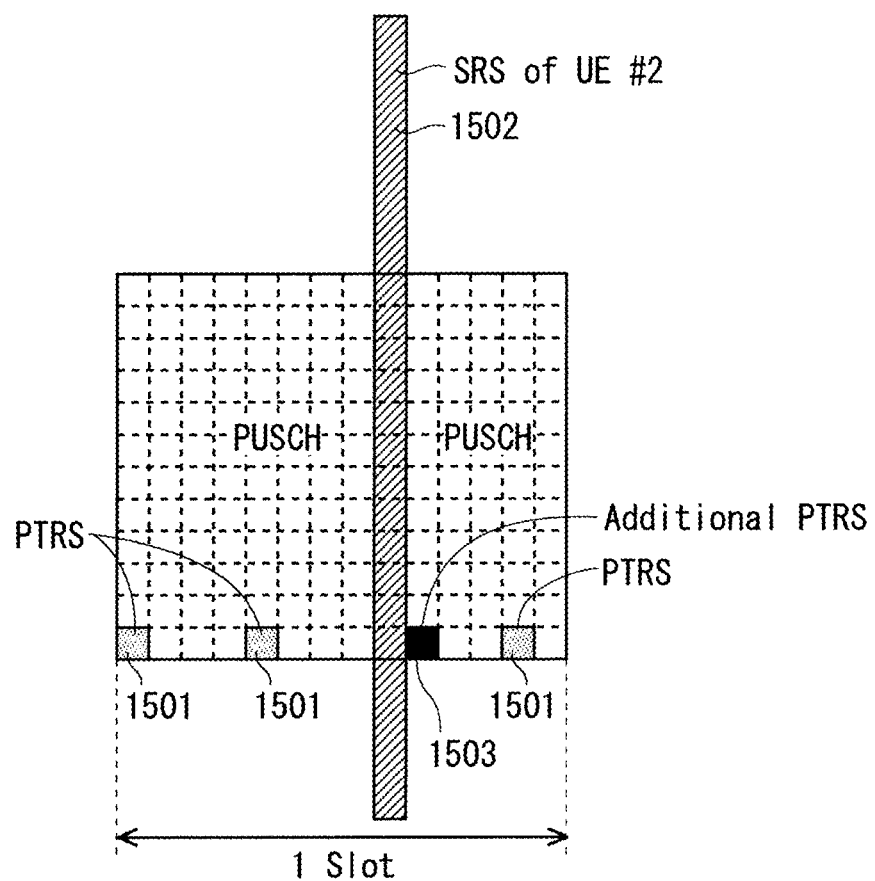

USER APPARATUS, BASE STATION, AND COMMUNICATION SYSTEM

CROSS-REFERENCE TO RELATED APPLICATIONS

This application is a divisional of U.S. application Ser. No. 17/040,849, filed Sep. 23, 2020, which is a '371 National Stage Entry of PCT/JP2019/012736, filed Mar. 26, 2019, and claims priority from Japanese Patent Applications JP 2018-072042, filed Apr. 4, 2018, the entire contents of which are hereby incorporated by reference

TECHNICAL FIELD

The present invention relates to a communication system, etc., in which radio communication is performed between a communication terminal device such as a user equipment device and a base station device.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network which is hereinafter collectively referred to as a network as well (for example, see Non-Patent Documents 1 to 5). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in LTE.

The decisions taken in 3GPP regarding the frame configuration in LTE system described in Non-Patent Document 1 (Chapter 5) are described with reference to FIG. 1. FIG. 1 is a diagram illustrating the configuration of a radio frame used in LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies of the resource allocation information for downlink shared channel (DL-SCH) being one of the transport channels described below, resource allocation information for a paging channel (PCH) being one of the transport channels described below, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in LTE communication system. The following five types of downlink reference signals are defined as: a cell-specific reference signal (CRS), an MBSFN reference signal, a data demodulation reference signal (DM-RS) being a UE-specific reference signal, a positioning reference signal (PRS), and a channel state information reference signal (CSI-RS). The physical layer measurement objects of a communication terminal include reference signal received powers (RSRPs).

The transport channels described in Non-Patent Document 1 (Chapter 5) are described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcasting the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ is described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) are described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in a case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced into the LTE, and the long term evolution advanced (LTE-A) and universal mobile telecommunication system (UMTS) described below.

The closed subscriber group (CSG) cell is a cell in which subscribers who are allowed to use are specified by an operator (hereinafter, also referred to as a "cell for specific subscribers"). The specified subscribers are allowed to access one or more cells of a public land mobile network (PLMN). One or more cells to which the specified subscribers are allowed access are referred to as "CSG cell(s)". Note that access is limited in the PLMN.

The CSG cell is part of the PLMN that broadcasts a specific CSG identity (CSG ID) and broadcasts "TRUE" in a CSG indication. The authorized members of the subscriber group who have registered in advance access the CSG cells using the CSG ID that is the access permission information.

The CSG ID is broadcast by the CSG cell or cells. A plurality of CSG IDs exist in LTE communication system. The CSG IDs are used by communication terminals (UEs) for making access from CSG-related members easier.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

In 3GPP, base stations referred to as Home-NodeB (Home-NB; HNB) and Home-eNodeB (Home-eNB; HeNB) are studied. HNB/HeNB is a base station for, for example, household, corporation, or commercial access service in UTRAN/E-UTRAN. Non-Patent Document 2 discloses three different modes of the access to the HeNB and HNB. Specifically, an open access mode, a closed access mode, and a hybrid access mode are disclosed.

Further, specifications of long term evolution advanced (LTE-A) are pursed as Release 10 in 3GPP (see Non-Patent Documents 3 and 4). The LTE-A is based on the LTE radio communication system and is configured by adding several new techniques to the system.

Carrier aggregation (CA) is studied for the LTE-A system in which two or more component carriers (CCs) are aggregated to support wider transmission bandwidths up to 100 MHz. Non-Patent Document 1 describes the CA.

In a case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in LTE-A include the technique of supporting wider bands (wider bandwidth extension) and the coordinated multiple point transmission and reception (CoMP) technique. The CoMP studied for LTE-A in 3GPP is described in Non-Patent Document 1.

Furthermore, the use of small eNBs (hereinafter also referred to as "small-scale base station devices") configuring small cells is studied in 3GPP to satisfy tremendous traffic in the future. In an example technique under study, a large number of small eNBs is installed to configure a large number of small cells, which increases spectral efficiency and communication capacity. The specific techniques include dual connectivity (abbreviated as DC) with which a UE communicates with two eNBs through connection thereto. Non-Patent Document 1 describes the DC.

For eNBs that perform dual connectivity (DC), one may be referred to as a master eNB (abbreviated as MeNB), and the other may be referred to as a secondary eNB (abbreviated as SeNB).

The traffic flow of a mobile network is on the rise, and the communication rate is also increasing. It is expected that the communication rate is further increased when the operations of the LTE and the LTE-A are fully initiated.

For increasingly enhanced mobile communications, the fifth generation (hereinafter also referred to as "5G") radio access system is studied whose service is aimed to be launched in 2020 and afterward. For example, in the Europe, an organization named METIS summarizes the requirements for 5G (see Non-Patent Document 5).

The requirements in the 5G radio access system show that a system capacity shall be 1000 times as high as, a data transmission rate shall be 100 times as high as, a data latency shall be one tenth (1/10) as low as, and simultaneously connected communication terminals 100 times as many as those of the LTE system, to further reduce the power consumption and device cost.

To satisfy such requirements, the study of 5G standards is pursued as Release 15 in 3GPP (see Non-Patent Documents 6 to 17 and 25). The techniques on 5G radio sections are referred to as "New Radio Access Technology" ("New Radio" is abbreviated as NR).

In NR, various subcarrier spacings, that is, various numerologies are supported. In NR, 1 subframe is 1 millisecond long, and 1 slot consists of 14 symbols, irrespective of the numerologies. Furthermore, the number of slots in 1 subframe is one in a numerology at a subcarrier spacing of 15 kHz. The number of slots in 1 subframe increases in proportion to the subcarrier spacing in the other numerologies (see Non-Patent Document 13 (TS38.211 v15.0.0)).

Furthermore, several new technologies have been studied in 3GPP. For example, a technology for avoiding a collision between a sounding reference signal (SRS) and the other channels and signals, and reduction in the power consumption with application of a bandwidth part (BWP) have been studied (see Non-Patent Documents 18 to 24).

In NR, the SRS to be used for sounding the uplink channel is allocated within the last 6 symbols in 1 slot consisting of 14 symbols. Furthermore, the number of symbols of the SRS is 1, 2, or, 4 (see Non-Patent Documents 13 and 15).

PRIOR-ART DOCUMENTS

Non-Patent Documents

Non-Patent Document 1: 3GPP TS36.300 V14.3.0
Non-Patent Document 2: 3GPP S1-083461
Non-Patent Document 3: 3GPP TR 36.814 V9.2.0
Non-Patent Document 4: 3GPP TR 36.912 V14.0.0
Non-Patent Document 5: "Scenarios, requirements and KPIs for 5G mobile and wireless system", ICT-317669-METIS/D1.1
Non-Patent Document 6: 3GPP TR 23.799 V14.0.0
Non-Patent Document 7: 3GPP TR 38.801 V14.0.0
Non-Patent Document 8: 3GPP TR 38.802 V14.1.0
Non-Patent Document 9: 3GPP TR 38.804 V14.0.0
Non-Patent Document 10: 3GPP TR 38.912 V14.0.0
Non-Patent Document 11: 3GPP RP-172115
Non-Patent Document 12: 3GPP TS 37.340 V15.0.0
Non-Patent Document 13: 3GPP TS 38.211 V15.0.0
Non-Patent Document 14: 3GPP TS 38.213 V15.0.0
Non-Patent Document 15: 3GPP TS 38.214 V15.0.0
Non-Patent Document 16: 3GPP TS 38.300 V15.0.0
Non-Patent Document 17: 3GPP TS 38.321 V15.0.0
Non-Patent Document 18: 3GPP R1-1802830
Non-Patent Document 19: 3GPP R1-1801741
Non-Patent Document 20: 3GPP R1-1801732
Non-Patent Document 21: 3GPP R1-1800935
Non-Patent Document 22: 3GPP R1-1715277
Non-Patent Document 23: 3GPP R1-1720349
Non-Patent Document 24: 3GPP R1-1800679
Non-Patent Document 25: 3GPP TS 38.212 V15.0.0

SUMMARY

Problems to be Solved by the Invention

The symbols in which the SRS can be transmitted have been increased from the last symbol in LTE to the last six symbols in NR. Thus, the symbols may collide with the other uplink channels, for example, the PUSCH and the PUCCH. This may cause a variance in the SRS configuration between the UE and the base station. Thus, the communication system using NR malfunctions, and the reliability in the communication cannot be maintained. Moreover, interference with the other UEs in the uplink communication occurs when the resources for the uplink communication of the other UEs are used for the SRS. Consequently, the reliability in transmission of the SRS of its own UE and in the uplink communication of the other UEs cannot be maintained.

Furthermore, a bandwidth part (BWP) is applied in NR for reducing the power consumption of the UE, where a part of the frequency bands of the uplink and downlink carriers can be scheduled. However, since a method for measuring a channel state in a band that is not configured as the BWP in the carrier frequency band has not yet been established, the UE and the base station cannot appropriately measure the channel state in the band. Thus, a problem of failing to maintain the reliability in the communication between the UE and the base station occurs.

In view of the problems, one of the objects of the present invention is to provide a communication system with high reliability, etc., under NR.

Means to Solve the Problems

The present invention provides, for example, a communication system including a base station, and a plurality of terminal devices configured to perform radio communication with the base station, wherein when one slot includes a sounding reference signal (SRS) symbol range consisting of one or more symbols allocated to an SRS of a first terminal device, a first symbol range consisting of one or more symbols before the SRS symbol range, and a second symbol range consisting of one or more symbols after the SRS symbol range, a second terminal device different from the first terminal device performs uplink communication to the base station using at least one of the first symbol range and the second symbol range.

The present invention provides, for example, a base station configured to perform radio communication with a plurality of terminal devices, wherein when one slot includes a sounding reference signal (SRS) symbol range consisting of one or more symbols allocated to an SRS of a first terminal device, a first symbol range consisting of one or more symbols before the SRS symbol range, and a second symbol range consisting of one or more symbols after the SRS symbol range, the base station performs uplink communication with a second terminal device different from the first terminal device using at least one of the first symbol range and the second symbol range.

The present invention provides, for example, a terminal device that performs radio communication with a base station configured to perform the radio communication with a plurality of terminal devices, wherein when one slot includes a sounding reference signal (SRS) symbol range consisting of one or more symbols allocated to an SRS of another terminal device, a first symbol range consisting of one or more symbols before the SRS symbol range, and a second symbol range consisting of one or more symbols after the SRS symbol range, the terminal device performs uplink communication using at least one of the first symbol range and the second symbol range.

Effects of the Invention

According to the present invention, a communication system with high reliability, etc., can be provided.

The objects, features, aspects and advantages of the present invention become more apparent from the following detailed description of the present invention when taken in conjunction with the accompanying drawings.

BRIEF DESCRIPTION OF DRAWINGS

FIG. 1 is a diagram illustrating the configuration of a radio frame for use in an LTE communication system.

FIG. 13 illustrates an example where the base station notifies, for each slot, the UE of information on the SRS transmissions of the other UEs according to the first embodiment.

FIG. 14 illustrates an example of adding the DMRSs before and after transmission of the SRS from another UE according to the first embodiment.

FIG. 15 illustrates an example of adding the PTRS after transmission of the SRS from another UE according to the first embodiment.

DESCRIPTION OF EMBODIMENTS

First Embodiment

Figure 2:
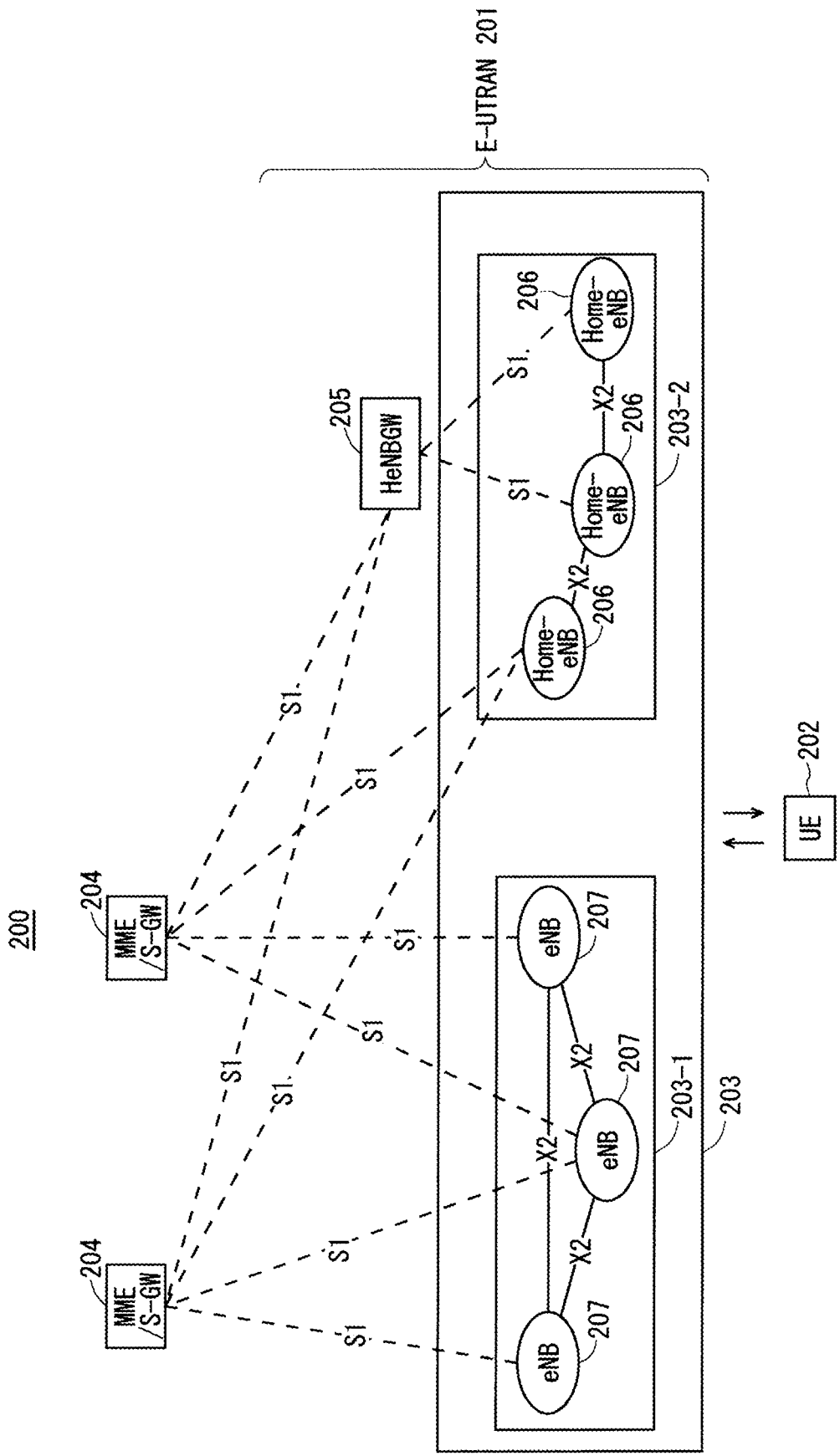
FIG. 2 is a block diagram showing the overall configuration of an LTE communication system 200 under discussion of 3GPP.

FIG. 2 is a block diagram showing an overall configuration of an LTE communication system 200 which is under discussion of 3GPP. FIG. 2 is described here. A radio access network is referred to as an evolved universal terrestrial radio access network (E-UTRAN) 201. A user equipment device (hereinafter, referred to as a "user equipment (UE)") 202 that is a communication terminal device is capable of radio communication with a base station device (hereinafter, referred to as a "base station (E-UTRAN Node B: eNB)") 203 and transmits and receives signals through radio communication.

Here, the "communication terminal device" covers not only a user equipment device such as a mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (RRC), and user planes (hereinafter also referred to as "U-planes") such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs, for example, broadcast, paging, and RRC connection management. The states of the base station 203 and the user equipment 202 in RRC are classified into RRC_IDLE and RRC_CONNECTED.

In RRC_IDLE, public land mobile network (PLMN) selection, system information (SI) broadcast, paging, cell re-selection, mobility, and the like are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 203 are classified into eNBs 207 and Home-eNBs 206. The communication system 200 is equipped with an eNB group 203-1 including a plurality of eNBs 207 and a Home-eNB group 203-2 including a plurality of Home-eNBs 206. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW) or an MME and an S-GW by means of an S1 interface, and control information is communicated between the eNB 207 and the MME unit 204. A plurality of MME units 204 may be connected to one eNB 207. The eNBs 207 are connected to each other by means of an X2 interface, and control information is communicated between the eNBs 207.

The Home-eNB 206 is connected to the MME unit 204 by means of an S1 interface, and control information is communicated between the Home-eNB 206 and the MME unit 204. A plurality of Home-eNBs 206 are connected to one MME unit 204. Alternatively, the Home-eNBs 206 are connected to the MME units 204 through a Home-eNB gateway (HeNBGW) 205. The Home-eNB 206 is connected to the HeNBGW 205 by means of an S1 interface, and the HeNBGW 205 is connected to the MME unit 204 by means of an S1 interface.

One or a plurality of Home-eNBs 206 are connected to one HeNBGW 205, and information is communicated therebetween through an S1 interface. The HeNBGW 205 is connected to one or a plurality of MME units 204, and information is communicated therebetween through an S1 interface.

The MME units 204 and HeNBGW 205 are entities of higher layer, specifically, higher nodes, and control the connections between the user equipment (UE) 202 and the eNB 207 and the Home-eNB 206 being base stations. The MME units 204 configure an EPC being a core network. The base station 203 and the HeNBGW 205 configure the E-UTRAN 201.

Further, the configuration below is studied in 3GPP. The X2 interface between the Home-eNBs 206 is supported. In other words, the Home-eNBs 206 are connected to each other by means of an X2 interface, and control information is communicated between the Home-eNBs 206. The HeNBGW 205 appears to the MME unit 204 as the Home-eNB 206. The HeNBGW 205 appears to the Home-eNB 206 as the MME unit 204.

The interfaces between the Home-eNBs 206 and the MME units 204 are the same, which are the S1 interfaces, in both cases where the Home-eNB 206 is connected to the MME unit 204 through the HeNBGW 205 and it is directly connected to the MME unit 204.

The base station device 203 may configure a single cell or a plurality of cells. Each cell has a range predetermined as a coverage in which the cell can communicate with the user equipment 202 and performs radio communication with the user equipment 202 within the coverage. In a case where one base station device 203 configures a plurality of cells, every cell is configured so as to communicate with the user equipment 202.

Figure 3:
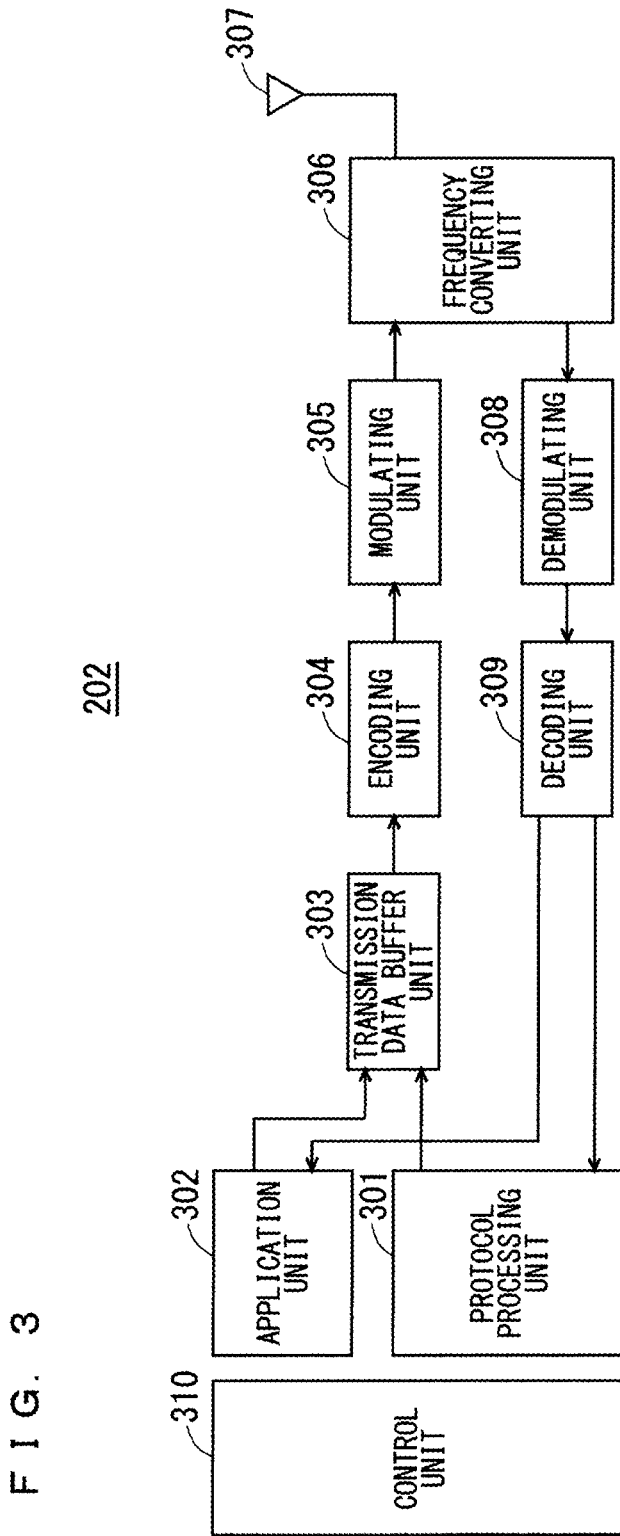
FIG. 3 is a block diagram showing the configuration of a user equipment 202 shown in FIG. 2, which is a communication terminal according to the present invention.

FIG. 3 is a block diagram showing the configuration of the user equipment 202 of FIG. 2. The transmission process of the user equipment 202 shown in FIG. 3 is described. First, a transmission data buffer unit 303 stores the control data from a protocol processing unit 301 and the user data from an application unit 302. The data stored in the transmission data buffer unit 303 is passed to an encoding unit 304, and is subjected to an encoding process such as error correction. There may exist the data output from the transmission data buffer unit 303 directly to a modulating unit 305 without the encoding process. The data encoded by the encoding unit 304 is modulated by the modulating unit 305. The modulated data is converted into a baseband signal, and the baseband signal is output to a frequency converting unit 306 and is then converted into a radio transmission frequency. After that, a transmission signal is transmitted from an antenna 307 to the base station 203.

The user equipment 202 executes the reception process as follows. The radio signal from the base station 203 is received through the antenna 307. The received signal is converted from a radio reception frequency into a baseband signal by the frequency converting unit 306 and is then demodulated by a demodulating unit 308. The demodulated data is passed to a decoding unit 309, and is subjected to a decoding process such as error correction. Among the pieces of decoded data, the control data is passed to the protocol processing unit 301, and the user data is passed to the application unit 302. A series of processes by the user equipment 202 is controlled by a control unit 310. This means that, though not shown in FIG. 3, the control unit 310 is connected to the individual units 301 to 309.

Figure 4:
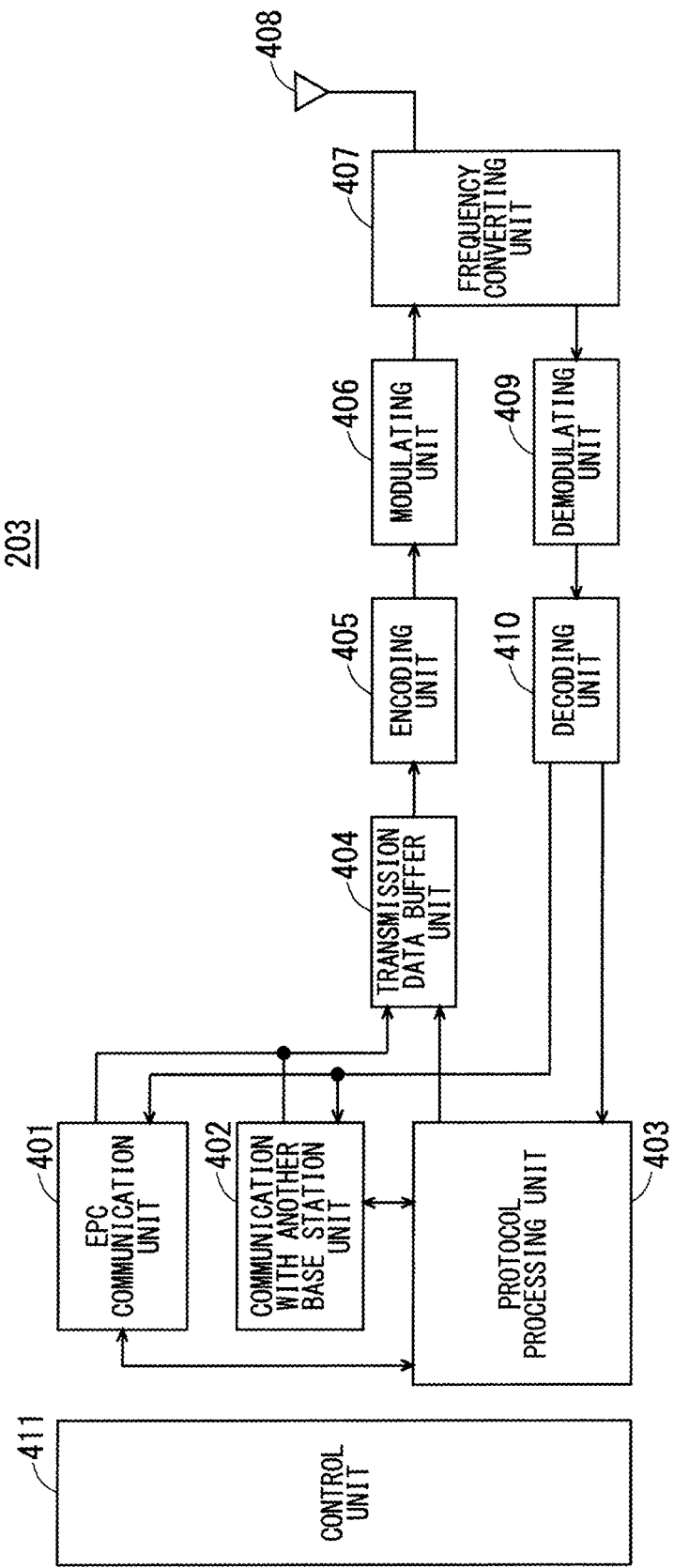
FIG. 4 is a block diagram showing the configuration of a base station 203 shown in FIG. 2, which is a base station according to the present invention.

FIG. 4 is a block diagram showing the configuration of the base station 203 of FIG. 2. The transmission process of the base station 203 shown in FIG. 4 is described. An EPC communication unit 401 performs data transmission and reception between the base station 203 and the EPC (such as the MME unit 204), HeNBGW 205, and the like. A communication with another base station unit 402 performs data transmission and reception to and from another base station. The EPC communication unit 401 and the communication with another base station unit 402 each transmit and receive information to and from a protocol processing unit 403. The control data from the protocol processing unit 403, and the user data and the control data from the EPC communication unit 401 and the communication with another base station unit 402 are stored in a transmission data buffer unit 404.

The data stored in the transmission data buffer unit 404 is passed to an encoding unit 405, and then an encoding process such as error correction is performed for the data. There may exist the data output from the transmission data buffer unit 404 directly to a modulating unit 406 without the encoding process. The encoded data is modulated by the modulating unit 406. The modulated data is converted into a baseband signal, and the baseband signal is output to a frequency converting unit 407 and is then converted into a radio transmission frequency. After that, a transmission signal is transmitted from an antenna 408 to one or a plurality of user equipments 202.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and then subject to a decoding process such as error correction. Among the pieces of decoded data, the control data is passed to the protocol processing unit 403, the EPC communication unit 401, or the communication with another base station unit 402, and the user data is passed to the EPC communication unit 401 and the communication with another base station unit 402. A series of processes by the base station 203 is controlled by a control unit 411. This means that, though not shown in FIG. 4, the control unit 411 is connected to the individual units 401 to 410.

Figure 5:
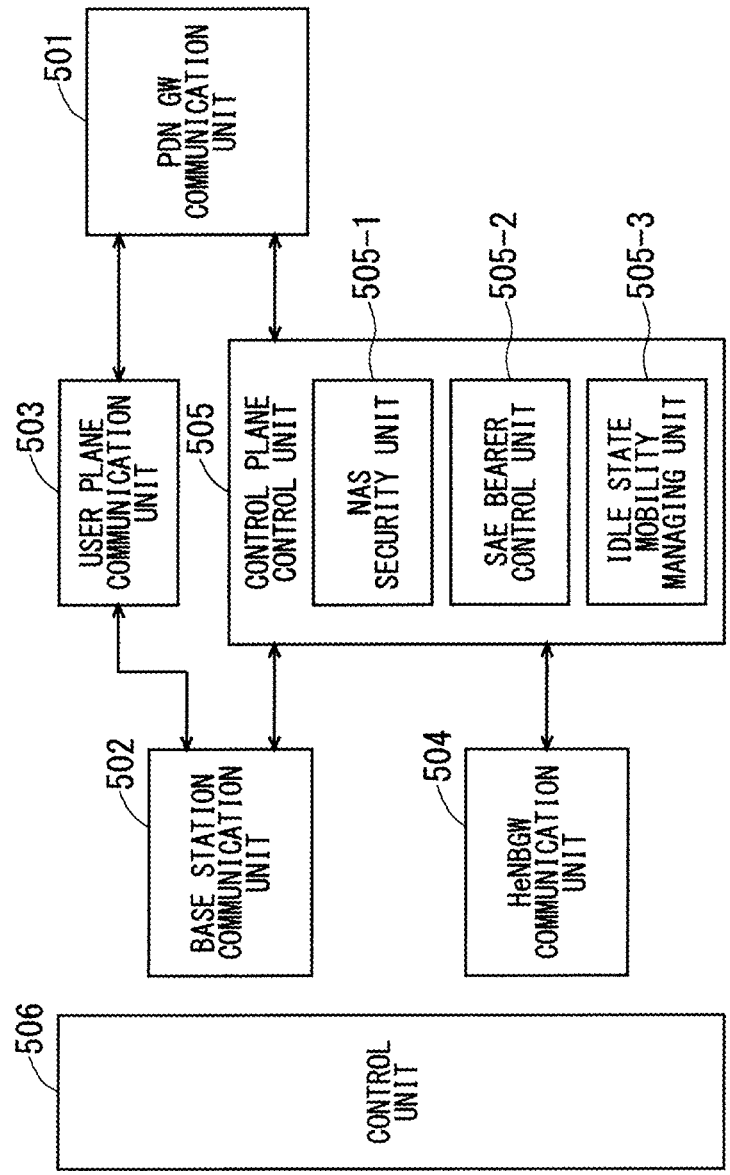
FIG. 5 is a block diagram showing the configuration of an MME according to the present invention.

FIG. 5 is a block diagram showing the configuration of the MME. FIG. 5 shows the configuration of an MME 204a included in the MME unit 204 shown in FIG. 2 described above. A PDN GW communication unit 501 performs data transmission and reception between the MME 204a and the PDN GW. A base station communication unit 502 performs data transmission and reception between the MME 204a and the base station 203 by means of the S1 interface. In a case where the data received from the PDN GW is user data, the user data is passed from the PDN GW communication unit 501 to the base station communication unit 502 via a user plane communication unit 503 and is then transmitted to one or a plurality of base stations 203. In a case where the data received from the base station 203 is user data, the user data is passed from the base station communication unit 502 to the PDN GW communication unit 501 via the user plane communication unit 503 and is then transmitted to the PDN GW.

In a case where the data received from the PDN GW is control data, the control data is passed from the PDN GW communication unit 501 to a control plane control unit 505. In a case where the data received from the base station 203 is control data, the control data is passed from the base station communication unit 502 to the control plane control unit 505.

A HeNBGW communication unit 504 is provided in a case where the HeNBGW 205 is provided, which performs data transmission and reception between the MME 204a and the HeNBGW 205 by means of the interface (IF) according to an information type. The control data received from the HeNBGW communication unit 504 is passed from the HeNBGW communication unit 504 to the control plane control unit 505. The processing results of the control plane control unit 505 are transmitted to the PDN GW via the PDN GW communication unit 501. The processing results of the control plane control unit 505 are transmitted to one or a plurality of base stations 203 by means of the S1 interface via the base station communication unit 502, and are transmitted to one or a plurality of HeNBGWs 205 via the HeNBGW communication unit 504.

The control plane control unit 505 includes a NAS security unit 505-1, an SAE bearer control unit 505-2, and an idle state mobility managing unit 505-3, and performs an overall process for the control plane (hereinafter also referred to as a "C-plane"). The NAS security unit 505-1 provides, for example, security of a non-access stratum (NAS) message. The SAE bearer control unit 505-2 manages, for example, a system architecture evolution (SAE) bearer. The idle state mobility managing unit 505-3 performs, for example, mobility management of an idle state (LTE-IDLE state which is merely referred to as idle as well), generation and control of a paging signal in the idle state, addition, deletion, update, and search of a tracking area of one or a plurality of user equipments 202 being served thereby, and tracking area list management.

The MME 204a distributes a paging signal to one or a plurality of base stations 203. In addition, the MME 204a performs mobility control of an idle state. When the user equipment is in the idle state and an active state, the MME 204a manages a list of tracking areas. The MME 204a begins a paging protocol by transmitting a paging message to the cell belonging to a tracking area in which the UE is registered. The idle state mobility managing unit 505-3 may manage the CSG of the Home-eNBs 206 to be connected to the MME 204a, CSG IDs, and a whitelist.

Figure 6:
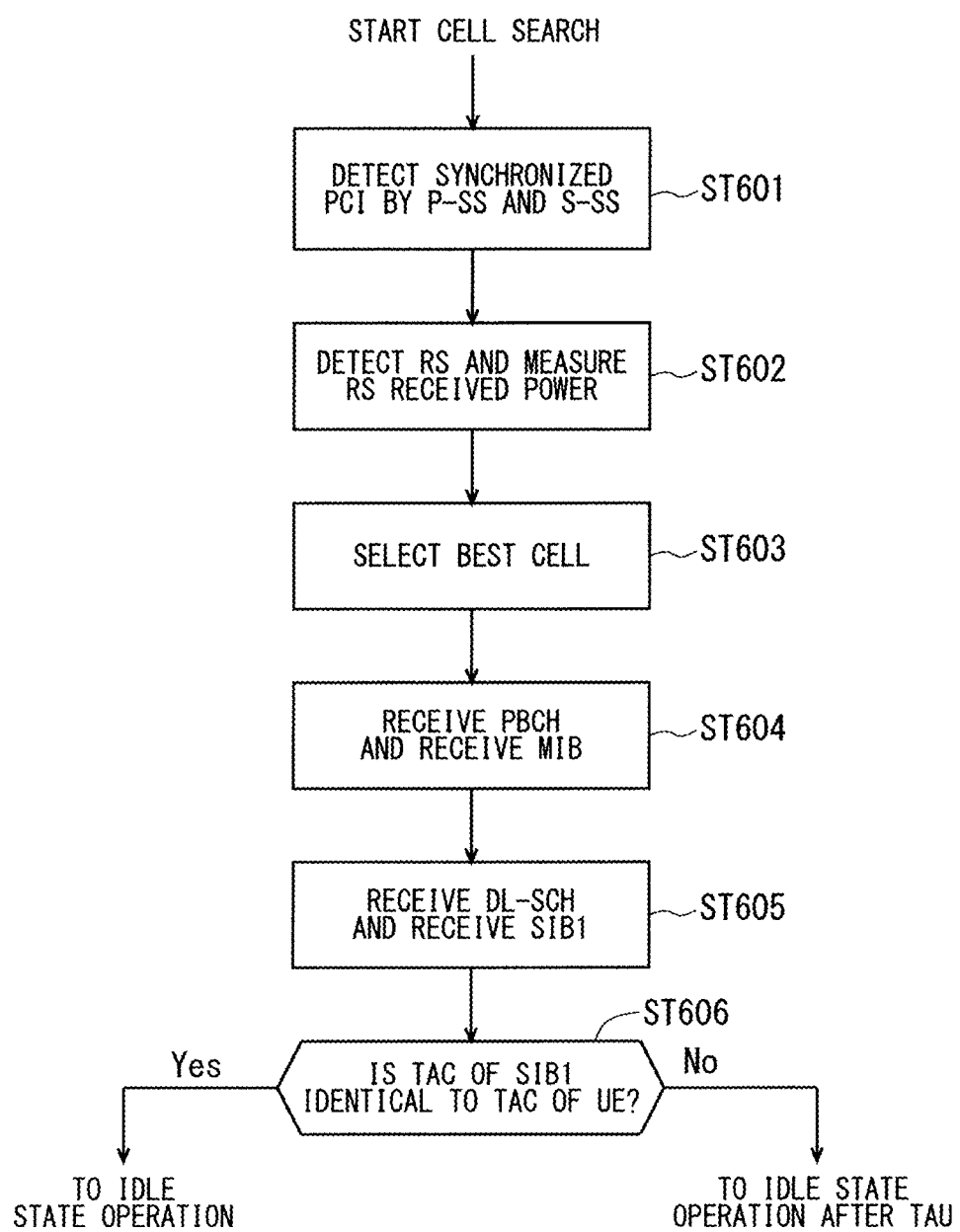
FIG. 6 is a flowchart showing an outline from a cell search to an idle state operation performed by a communication terminal (UE) in LTE communication system.

An example of a cell search method in a mobile communication system is described next. FIG. 6 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is calculated from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including MME to change a tracking area through the cell for performing tracking area update (TAU).

The device configuring a core network (hereinafter, also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

Widespread use of smartphones and tablet terminal devices explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell having a relatively wide coverage, such as a cell configured by a conventional eNB, and a "macro eNB" refers to an eNB configuring a macro cell. A "small cell" refers to a cell having a relatively narrow coverage, such as a downsized cell, and a "small eNB" refers to an eNB configuring a small cell.

The macro eNB may be, for example, a "wide area base station" described in Non-Patent Document 7.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 7.

Figure 7:
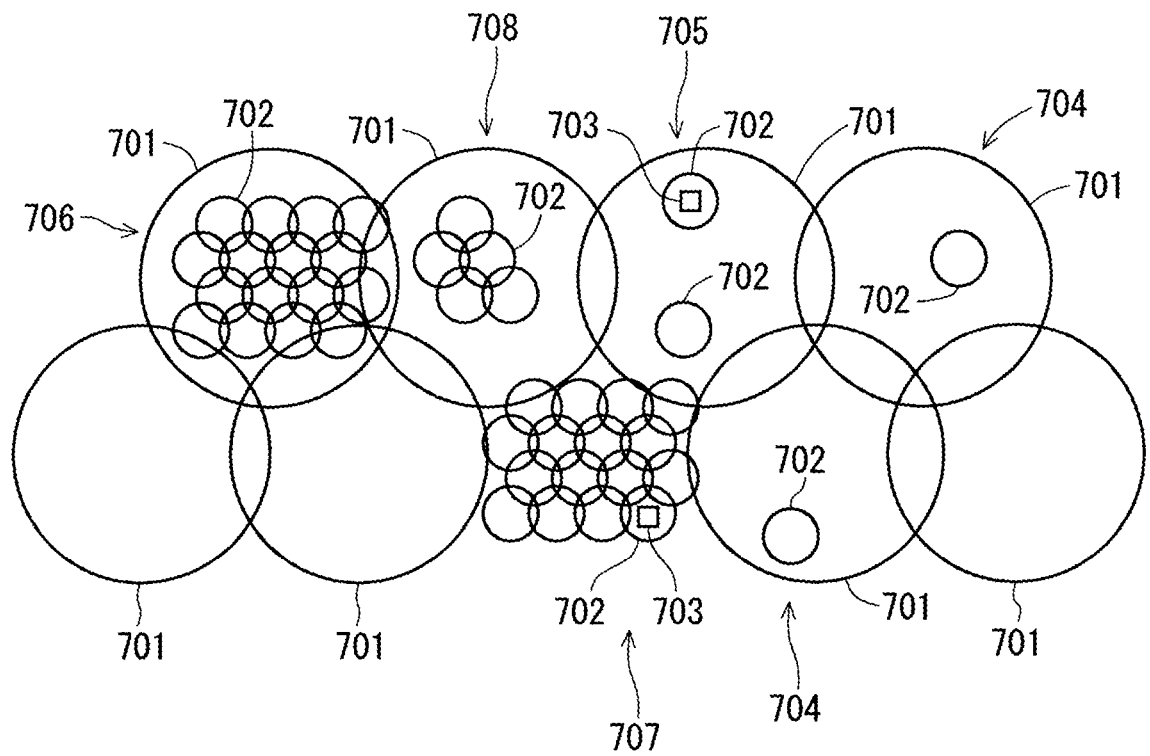
FIG. 7 shows the concept of a cell configuration when macro eNBs and small eNBs coexist.

FIG. 7 shows the concept of the cell configuration in which macro eNBs and small eNBs coexist. The macro cell configured by a macro eNB has a relatively-wide-range coverage 701. A small cell configured by a small eNB has a coverage 702 whose range is narrower than that of the coverage 701 of a macro eNB (macro cell).

When a plurality of eNBs coexist, the coverage of the cell configured by an eNB may be included in the coverage of the cell configured by another eNB. In the cell configuration shown in FIG. 7, as indicated by a reference "704" or "705", the coverage 702 of the small cell configured by a small eNB may be included in the coverage 701 of the macro cell configured by a macro eNB.

As indicated by the reference "705", the coverages 702 of a plurality of, for example, two small cells may be included in the coverage 701 of one macro cell. A user equipment (UE) 703 is included in, for example, the coverage 702 of the small cell and performs communication via the small cell.

In the cell configuration shown in FIG. 7, as indicated by a reference "706", the coverage 701 of the macro cell configured by a macro eNB may overlap the coverages 702 of the small cells configured by small eNBs in a complicated manner.

As indicated by a reference "707", the coverage 701 of the macro cell configured by a macro eNB need not overlap the coverages 702 of the small cells configured by small eNBs.

Further, as indicated by a reference "708", the coverages 702 of a large number of small cells configured by a large number of small eNBs may be configured in the coverage 701 of one macro cell configured by one macro eNB.

The base station places the PUSCH before or after the SRS to be transmitted by the same UE. The base station notifies the UE of information including the symbol number in which the PUSCH starts to be allocated and the number of allocated symbols. The base station may give the notification via the L1/L2 signaling or the RRC signaling.

However, none discusses the placement of the PUSCH when the UE for which the PUSCH is scheduled (may be hereinafter referred to as a PUSCH transmission UE) is different from the UE that transmits the SRS (may be hereinafter referred to as an SRS transmission UE). Thus, the base station cannot appropriately schedule the PUSCH for the PUSCH transmission UE. This creates, for example, a problem of mutual interference between the PUSCH and the SRS due to allocation of the PUSCH and the SRS to the same time and frequency resources.

A solution to the problem is disclosed. The aforementioned allocation is applied when the SRS transmission UE is different from the PUSCH transmission UE. The number of the SRS transmission UEs may be more than one. The base station may allocate, to the PUSCH transmission UE, a PUSCH transmission symbol before or after a group of symbols in which one or more UEs other than the UE transmit the SRSs.

The group of symbols may be a set of symbols of SRSs to be transmitted by one or more SRS transmission UEs. The symbols included in the group of symbols may be discrete. For example, a symbol to which the SRS is not allocated may be interposed between the symbols of the SRSs to be transmitted by the one or more SRS transmission UEs. This enables, for example, the base station to flexibly allocate the symbols of the SRSs. In the allocation of the PUSCH transmission symbol from the base station to the PUSCH transmission UE, "before the group of symbols" may mean before the earliest symbol among the symbols included in the group of symbols. "After the group of symbols" may mean after the latest symbol among the symbols included in the group of symbols.

As another example, the symbols included in the group of symbols may be consecutive. Allowing the symbols to be consecutive may be defined in a standard or determined by the base station. This can, for example, facilitate the scheduling in the communication system.

However, placing the PUSCH before or after an SRS symbol or a group of SRS symbols reduces the number of symbols in a slot where the PUSCHs can be placed, which consequently causes a problem of decrease in the transmission rate of the PUSCH. Moreover, allocation of the SRSs to be transmitted by another UE, particularly, a plurality of UEs to the frequency resources with which its own UE transmits the PUSCH further reduces the number of symbols in which the PUSCH of its own UE can be placed, which consequently causes a problem of further decrease in the transmission rate of the PUSCH of its own UE.

A solution to the problems is hereinafter disclosed.

The UE can transmit the PUSCH both before and after the SRS. The SRS may be an SRS to be transmitted by the UE or another UE. The UE may stop transmitting, in a symbol in which the SRS is transmitted, the PUSCH, the DMRS associated with the PUSCH, or a phase tracking reference signal (PTRS) associated with the PUSCH. Unless otherwise specified, the method on the PUSCH may be applied similarly to the DMRS associated with the PUSCH and the PTRS associated with the PUSCH.

Figure 8:
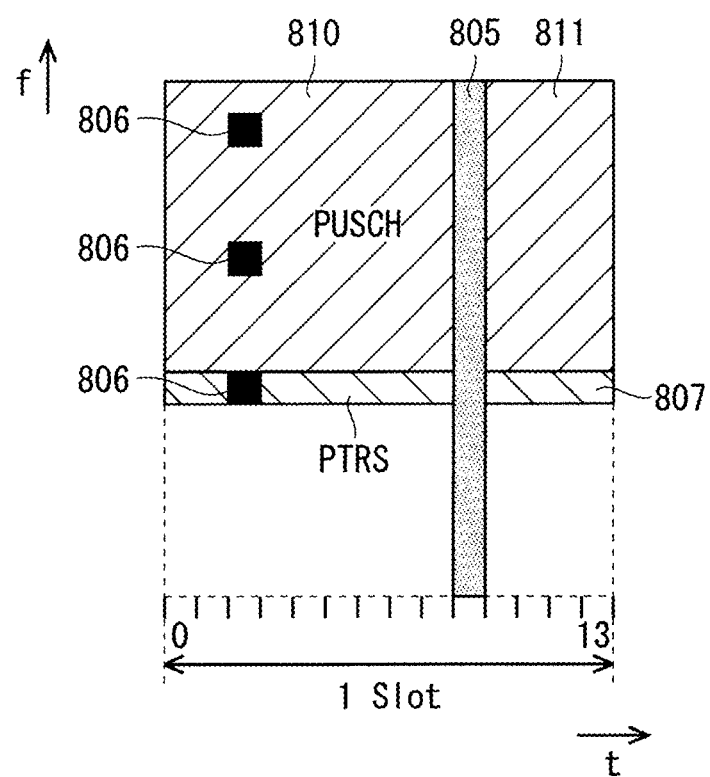
FIG. 8 illustrates transmission of the PUSCH both before and after the SRS of another UE according to the first embodiment.

FIG. 8 illustrates transmission of the PUSCHs both before and after the SRS of another UE. FIG. 8 illustrates an example where the UE #1 transmits the PUSCHs and the UE #2 transmits the SRS. In FIG. 8, the horizontal axis represents the time axis, and the vertical axis represents the frequency axis.

In the example illustrated in FIG. 8, an SRS 805 transmitted by the UE #2 is allocated to the 9-th symbol, assuming the beginning of a slot as a 0-th symbol. Hereinafter, the beginning of a slot is also assumed as the 0-th symbol. Moreover, the frequency band occupied by the SRS is allocated to include the frequency band allocated to transmission of the PUSCHs by the UE #1. In the example illustrated in FIG. 8, DMRSs 806 associated with the PUSCHs of the UE #1 are allocated to the second symbol, and a PTRS 807 associated with the PUSCHs is allocated to a subcarrier at the lowest frequency in the frequency band occupied by the PUSCHs.

In the example illustrated in FIG. 8, the UE #1 may transmit PUSCHs 810 and 811 on both sides of the 9-th symbol to which the SRS of the UE #2 is allocated. The UE #1 may stop transmitting the PUSCHs in the 9-th symbol.

The base station should notify, in advance, the PUSCH transmission UE of a configuration of the SRS allocated to UEs in a cell to which the UE belongs. The SRS in the notification is configured per symbol in the time axis direction and per physical resource block (PRB) in the frequency axis direction. In response to the notification, the PUSCH transmission UE stops transmitting the PUSCH in a symbol in which another UE transmits the SRS.

Although an example of stopping transmission of the PUSCH in a symbol in which another UE transmits the SRS is described, the aforementioned method may be applied to the SRS to be transmitted by its own UE. In other words, a UE may transmit the PUSCH both before and after the SRSs to be transmitted by its own UE. This can increase the transmission rate of the PUSCH.

Application of the aforementioned method creates the following problem. Specifically, none specifies which time operation of SRS the signaling from the base station to the UE is applied to. Particularly, it is not clear whether the signaling is applied to the semi-persistent SRS and the aperiodic SRS which are not probably actually transmitted. Thus, the PUSCH transmission UE cannot transmit the PUSCH while avoiding the semi-persistent SRS and the aperiodic SRS to be transmitted by another UE. Consequently, the semi-persistent SRS and the aperiodic SRS to be transmitted by another UE may interfere with the PUSCH to be transmitted by its own UE. This causes a problem of failing to perform an accurate sounding in the base station and a problem of reduction in the reliability of the PUSCH.

Furthermore, since the base station notifies the UE of the SRS configurations of all the UEs in the cell, a problem of increase in the amount of signaling occurs.

Moreover, since the PUSCH transmission UE stops transmitting the PUSCH during transmission of the SRS of another UE and retransmits the PUSCH after the other UE transmits the SRS, a phase and/or an amplitude may drift in the retransmission of the PUSCH. Furthermore, in an attempt to stop transmission of the PTRS associated with the PUSCH so that the other UE transmits the SRS, for example, phase noise of the PUSCHs in the symbols surrounding the symbol in which the other UE transmits the SRS cannot be compensated in a case where the PTRS is transmitted at a rate of one symbol every plurality of symbols. This results in a problem of degradation in the demodulating characteristics of the PUSCHs in the base station.

A solution to the problem is hereinafter disclosed.

The base station notifies, in advance, the UE of candidates for the SRS transmission resources which are configured for the UEs being served thereby. The base station may give the notification dedicatedly to each UE. The base station may semi-statically give the notification. The base station may give the notification, for example, via the RRC signaling or the MAC signaling. Examples of the candidates for the SRS transmission resources may include all the resource configurations for the aperiodic SRS, the resource configurations for the semi-persistent SRS, and the resource configurations for the periodic SRS. In response to the notification, the UE may stop transmitting the PUSCH with the candidates for the SRS transmission resources of the other UEs. For example, the UE may stop transmitting the PUSCH every slot with all the resources configured for the aperiodic SRS. As another example, the UE may stop transmitting the PUSCH with the resources configured for the SRS, irrespective of whether to activate transmission of the semi-persistent SRS. This can, for example, prevent the interference in transmission between the aperiodic SRS and the semi-persistent SRS of another UE and the PUSCH of its own UE.

The following (1) to (12) are disclosed as pieces of information on the candidates for the SRS transmission resources to be semi-statically notified from the base station to the UE.

(1) Information for identifying a configuration of an SRS
(2) A type of the configuration of the SRS
(3) Information on an SRS transmission symbol
(4) Information on an SRS transmission frequency
(5) Information on a sequence of the SRSs
(6) Information on a configuration of an SRS comb
(7) An antenna port of the SRS
(8) A numerology of the SRS
(9) Information on a transmission period and an offset of the SRS
(10) information on whether the PUSCH can be transmitted. The following (10-1) to (10-6) are disclosed as examples of the information.
  (10-1) Information on whether the PUSCH can be transmitted before the earliest symbol among a group of SRS transmission symbols in a slot
  (10-2) Information on whether the PUSCH can be transmitted after the latest symbol among the group of SRS transmission symbols in the slot
  (10-3) Information on whether the PUSCH can be transmitted in a range from the earliest symbol to the latest symbol among the group of SRS transmission symbols in the slot
  (10-4) Information on whether the PUSCH can be transmitted in a configured SRS transmission symbol
  (10-5) Information on whether the PUSCH can be transmitted with configured SRS transmission frequency resources in the configured SRS transmission symbol
  (10-6) Combinations of (10-1) to (10-5) above
(11) Information on a beam to be used for transmitting the SRS
(12) Combinations of (1) to (11) above The information on (1) may include, for example, information on the UE (e.g., an identifier of the UE) and/or information on a resource configuration number for the aperiodic SRS. The information on (1) may be uniquely given to one UE or a plurality of UEs, for example, all the UEs in a cell.

With (1), for example, the base station can notify the UE of information on change in the configuration of the SRS for the UEs in the cell with less amount of information. This can, for example, reduce the amount of signaling from the base station to the UE.

(2) may be, for example, information indicating whether the SRS is the periodic SRS, the semi-persistent SRS, or the aperiodic SRS. As another example, (2) may be information indicating a use case of the SRS. (2) may be combined information of the two. This can, for example, flexibly configure whether the PUSCH can be transmitted according to whether the SRS is the periodic SRS, the semi-persistent SRS, or the aperiodic SRS or according to a use case of the SRS.

(3) may be, for example, an SRS transmission start symbol, the number of SRS transmission symbols, or an SRS transmission end symbol, or combined information of some of these.

As another example, (3) may be information on the group of SRS transmission symbols. (3) may be, for example, information indicating a range from the earliest symbol to the latest symbol among the group of SRS transmission symbols, e.g., one of the earliest symbol, the latest symbol, and the number of symbols from the earliest symbol to the latest symbol, or combined information of some of these. As another example, a bitmap may be used. In the bitmap, symbols in a slot may be associated with bits included in the bitmap. This enables, for example, notification of information on a plurality of SRS configurations with less amount of information. The plurality of SRS configurations may be, for example, on the SRSs to be transmitted from one UE or on the SRSs to be transmitted from a plurality of UEs.

(4) may be, for example, information indicating a range of the PRB numbers of the SRS to be transmitted. The information may include, for example, the first PRB number, the last PRB number, and the number of PRBs from the first PRB to the last PRB of the SRS to be transmitted, in a carrier of the cell to be used by the UE. As another example, the information may include information indicating a range of the PRB numbers in a bandwidth part (BWP) in the PUSCH transmission UE, for example, the first PRB number, the last PRB number, and the number of PRBs from the first PRB to the last PRB of the transmission SRS in the BWP. This can, for example, reduce the amount of processing in the PUSCH transmission UE.

(4) may include information on the frequency hopping of the SRS. This enables, for example, the PUSCH transmission UE to transmit the PUSCH while avoiding the time and/or frequency resources for the SRS even in the presence of the frequency hopping of the SRS. This can result in, for example, reduction in the interference between the PUSCH and the SRS.

In (4), the information indicating a range of the PRB numbers may be information in units of the number of PRBs which is a configuration resolution of the SRS, for example, information per 4 PRBs. This can, for example, reduce the amount of signaling in the notification from the base station to the UE.

(5) may be, for example, information on a cyclic shift (CS) or information on a root sequence. The information on the CS may be, for example, on the CS of the SRS per se, or may include information on the CS hopping. This enables, for example, the base station to notify the UE that transmits the PUSCH of the signaling indicating the same configuration details of the SRS transmission for the SRS transmission UE. This can, for example, reduce the amount of processing in the base station.

(6) may include, for example, information on a comb spacing of the SRS, and/or information on an offset of the SRS comb, i.e., the offset of an resource element (RE) to which the SRS is allocated. The UE may allocate the PUSCH with the information in the same symbol as that of the SRS while avoiding the RE to which the SRS is allocated. This can, for example, improve the transmission capacity for the PUSCH.

(7) may include, for example, information on an antenna port number to which the SRS is to be transmitted. The UE may, for example, transmit the PUSCH with the time and/or frequency resources identical to those for the SRS, in an antenna port other than the antenna port. This can, for example, improve the transmission capacity for the PUSCH.

(8) may include, for example, information on the numerology of the SRS. The PUSCH transmission UE may calculate in which symbol number of its own UE the SRS is transmitted, using the information on the numerology. This enables, for example, the PUSCH transmission UE to transmit the PUSCH while avoiding the SRS even when the PUSCH differs in numerology from the SRS of another UE.

(9) may be, for example, combined information of the transmission period and the offset of the SRS. The information may be, for example, identical to information included in the notification from the base station to the SRS transmission UE. This enables, for example, the base station to notify the UE that transmits the PUSCH of the signaling indicating the same configuration details as those for the SRS transmission for the SRS transmission UE. This can, for example, reduce the amount of processing in the base station.

In (10-1), for example, the UE may stop transmitting the PUSCH in a symbol before the earliest symbol among the group of SRS transmission symbols in the slot, using a negative indication in (10-1). The stop operation may be performed, for example, in the case where the DMRS and/or the PTRS which are associated with the PUSCH are not allocated to the symbol before the earliest symbol. The aforementioned case may be, for example, a case where the subcarrier spacing in the SRS transmission UE is larger than that in the PUSCH transmission UE and the symbol to which the SRS is allocated is near the beginning of a slot of the PUSCH transmission UE. This enables, for example, the PUSCH transmission UE to stop transmitting, in the PUSCH, a symbol in which the base station cannot maintain the demodulating characteristics. Consequently, the power consumption of the PUSCH transmission UE can be reduced.

In (10-2), for example, the UE may stop transmitting the PUSCH in a symbol after the latest symbol among the group of SRS transmission symbols, using a negative indication in (10-2). The stop operation may be performed, for example, when the DMRS and/or the PTRS which are associated with the PUSCH are not allocated to the symbol before the latest symbol. This enables, for example, the PUSCH transmission UE to stop transmitting, in the PUSCH, the symbol in which the base station cannot maintain the demodulating characteristics. Consequently, the power consumption of the PUSCH transmission UE can be reduced.

In (10-3), for example, the UE may stop transmitting the PUSCH in the range from the earliest symbol to the latest symbol among the group of SRS transmission symbols in the slot, using a negative indication in information of (10-3). This enables, for example, the UE to easily perform processing for avoiding the SRS symbols in a plurality of SRS configurations. Moreover, the UE can reduce the number of stops and resumptions of transmitting the PUSCH with the plurality of SRS configurations. This can avoid the complexity of control over transmission of the PUSCH in the UE.

As another example in (10-3), the UE may transmit the PUSCH in the range from the earliest symbol to the latest symbol among the group of SRS transmission symbols in the slot, using an affirmative indication in the information of (10-3). The UE may transmit the PUSCH, for example, while avoiding only the symbol in which the PUSCH is actually transmitted. This can, for example, increase the transmission rate of the PUSCH from the UE.

In (10-4), for example, the UE may transmit the PUSCH while avoiding the configured SRS transmission symbol, using a negative indication in information of (10-4). This can, for example, facilitate the avoidance from the SRS transmission resources in the UE.

As another example in (10-4), the UE may transmit the PUSCH in the configured SRS transmission symbol, using an affirmative indication in information of (10-4). The UE may transmit the PUSCH, for example, with a subcarrier different from that of the frequency resources with which the SRS is transmitted. This can, for example, increase the transmission rate of the PUSCH from the UE.

In (10-5), for example, the UE may transmit the PUSCH while avoiding a range from a start PRB to an end PRB of the SRS in a symbol configured for the SRS, using a negative indication in information of (10-5). This can, for example, facilitate the avoidance from s symbol and/or s subcarrier for transmitting the SRS in the UE.

As another example in (10-5), the UE may transmit the PUSCH in the range from the start PRB to the end PRB of the SRS in the symbol configured for the SRS, using an affirmative indication in the information of (10-5). The UE may transmit the PUSCH, for example, while avoiding a subcarrier allocated as the SRS comb. This can, for example, increase the transmission rate of the PUSCH from the UE.

In (11), for example, the UE may stop transmitting the PUSCH only when the beam used by the SRS transmission UE is the same as the beam used by its own UE. This can, for example, maintain the transmission rate of the PUSCH while the interference between the PUSCH and the SRS can be avoided.

The UE may stop transmitting the PUSCH, the DMRS associated with transmission of the PUSCH, or the PTRS associated with transmission of the PUSCH, in the SRS transmission symbol included in the notification from the base station. The SRS transmission symbol may be a candidate for the SRS transmission symbol. This can, for example, avoid a collision in the time and frequency resources with the SRSs including the semi-persistent SRS and the aperiodic SRS. The signals and/or channels with which the UE stops the transmission may be defined in a standard, or determined and notified or broadcast to the UE by the base station. The base station may give the notification, for example, via the RRC signaling.

The UE may stop transmitting the PUSCH, for example, in a range from the earliest symbol to the latest symbol among a group of SRS transmission symbols in a slot. This enables, for example, the UE to easily perform processing for avoiding the SRS symbols in a plurality of SRS configurations. Moreover, the UE can reduce the number of stops and resumptions of transmitting the PUSCH with the plurality of SRS configurations. This can avoid the complexity of control over transmission of the PUSCH in the UE.

The range from the earliest symbol to the latest symbol among the group of SRS transmission symbols may be derived, for example, per slot. For example, when the transmission symbol of the SRS to be transmitted at a periodicity of a plurality of slots is the latest symbol, the latest symbol in the group of SRS transmission symbols only in a slot corresponding to the periodicity may be regarded as the transmission symbol of the SRS to be transmitted at the periodicity of the plurality of slots. The latest symbol in the group of SRS transmission symbols in each of the other slots may be regarded as the latest symbol excluding the SRS to be transmitted at the periodicity of the plurality of slots. This can, for example, prevent unnecessary stop of transmitting the PUSCH, and consequently increase the transmission rate of the PUSCH.

Figure 9:
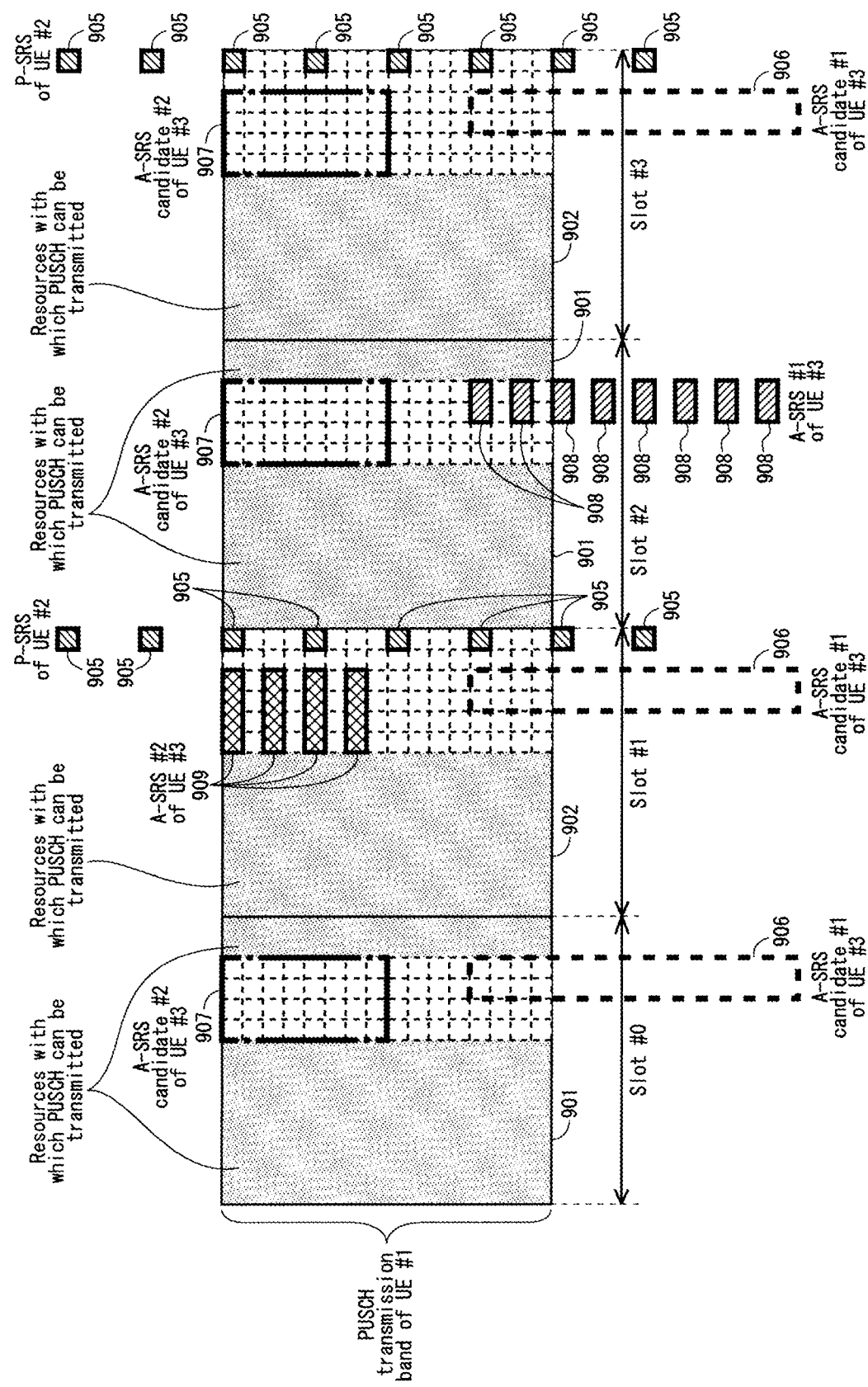
FIG. 9 illustrates an example where transmission of the PUSCH is stopped in a range from the earliest symbol to the latest symbol among a group of SRS transmission symbols according to the first embodiment.

FIG. 9 illustrates an example where the UE stops transmitting the PUSCH in a range from the earliest symbol to the latest symbol among a group of SRS transmission symbols in a slot. FIG. 9 illustrates the example where the UE #1 transmits PUSCHs 901 and 902, the UE #2 transmits periodic SRSs 905 in odd slot numbers at a periodicity of two slots, and aperiodic SRS (abbreviated as A-SRS in FIG. 9) configurations #1 906 and #2 907 are made for the UE #3.

In the example of FIG. 9, the periodic SRSs of the UE #2 are transmitted in the 13-th symbol, and transmitted at a rate of one RE every four REs in the frequency direction. In the example of FIG. 9, the aperiodic SRS configuration #1 made for the UE #3 is a configuration of transmitting the aperiodic SRS in the 10-th and 11-th symbols on the time axis and transmitting the aperiodic SRS at a rate of 1 RE every 2 REs on the frequency axis. Furthermore, in the example of FIG. 9, the aperiodic SRS configuration #2 made for the UE #3 is a configuration of transmitting the aperiodic SRS in the 8-th to 11-th symbols on the time axis and transmitting the aperiodic SRS at a rate of 1 RE every 2 REs on the frequency axis. In the example of FIG. 9, the aperiodic SRSs #1 configured for the UE #3 are transmitted as aperiodic SRSs 908 in the slot number 2, and the aperiodic SRSs #2 are transmitted as aperiodic SRSs 909 in the slot number 1.

In the slot number 0 of FIG. 9, the earliest SRS transmission symbol is the 8-th symbol, and the latest SRS transmission symbol is the 11-th symbol. The earliest SRS transmission symbol and/or the latest SRS transmission symbol are configured for SRSs that are not actually transmitted, for example, the aperiodic SRSs, and may be for the SRSs that are not actually transmitted. In the slot number 0 of FIG. 9, the UE #1 can transmit the PUSCH in the 0-th to 7-th, 12-th, and 13-th symbols. The UE transmits the PUSCH 901 in the symbols, in response to the notification on the SRS configuration from the base station.

In the slot number 1 of FIG. 9, the earliest SRS transmission symbol is the 8-th symbol, and the latest SRS transmission symbol is the 13-th symbol. The UE #1 can transmit the PUSCH in the 0-th to 7-th symbols. The UE transmits the PUSCH 902 in the symbols, in response to the notification on the SRS configuration from the base station.

Since the slot numbers 2 and 3 in FIG. 9 are configured in the same manner as the slot numbers 0 and 1, respectively, the description is omitted.

As another example of stopping transmission of the PUSCH, the transmission of the PUSCH may be stopped only in the SRS transmission symbols included in the notification from the base station. This can, for example, increase the transmission rate of the PUSCH from the UE.

Figure 10:
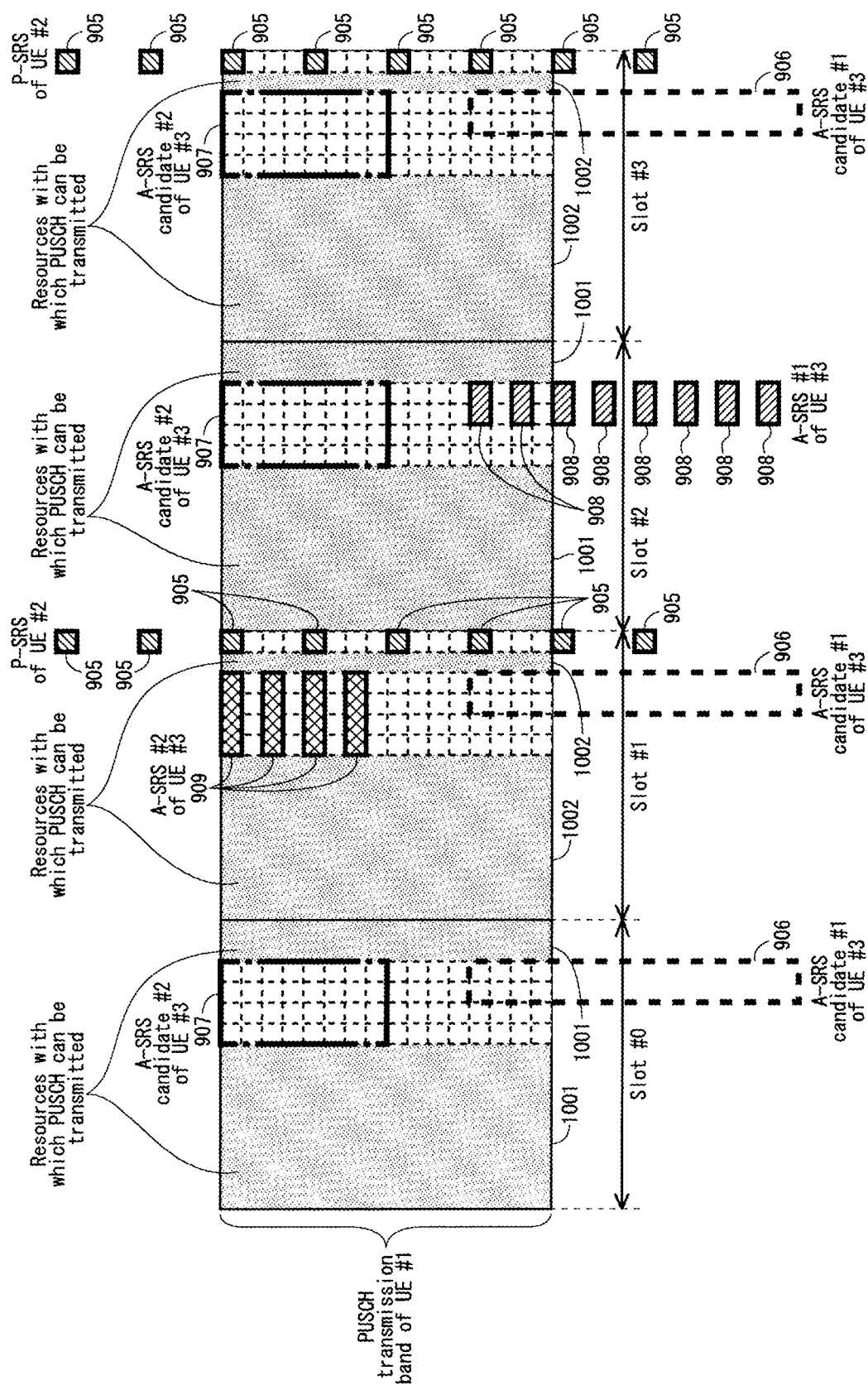
FIG. 10 illustrates an example where transmission of the PUSCH is stopped only in the SRS transmission symbols notified to the UE according to the first embodiment.

FIG. 10 illustrates an example where the UE stops transmitting the PUSCH only in the SRS transmission symbols notified to the UE. The SRS configuration of each UE in FIG. 10 is identical to that in FIG. 9. In FIG. 10, the same figure numbers are applied to the signals common to those in FIG. 9, and the common description thereof is omitted.

In FIG. 10, the SRS transmission symbols in the slot number 0 are configured in the 8-th to 11-th symbols. The SRS transmission symbols are configured for SRSs that are not actually transmitted, for example, the aperiodic SRSs, and may be symbols for the SRSs that are not actually transmitted or symbols configured for the deactivated semi-persistent SRSs. In the slot number 0 of FIG. 10, the UE #1 can transmit the PUSCH in the 0-th to 7-th, 12-th, and 13-th symbols. The UE transmits a PUSCH 1001 in the symbols, in response to the notification on the SRS configuration from the base station.

In FIG. 10, the SRS transmission symbols in the slot number 1 are configured in the 8-th to 11-th and 13-th symbols. The UE #1 can transmit the PUSCH in the 0-th to 7-th and 12-th symbols. The UE transmits a PUSCH 1002 in the symbols, in response to the notification on the SRS configuration from the base station.

Since the slot numbers 2 and 3 of FIG. 10 are configured in the same manner as the slot numbers 0 and 1, respectively, the description is omitted.

As another example of the operations of the UE in the SRS transmission symbols included in the notification from the base station, the UE may transmit, in the symbols, the PUSCH, the DMRS associated with transmission of the PUSCH, or the PTRS associated with transmission of the PUSCH. The UE may transmit the PUSCH, the DMRS, and/or the PTRS, for example, outside the range of PRBs of the SRS that are included in the SRS configuration notified from the base station to the UE. This can increase the transmission rate of the PUSCH in the UE. The signals and/or channels transmitted by the UE may be defined in a standard, or determined and notified or broadcast to the UE by the base station. The base station may give the notification, for example, via the RRC signaling.

Figure 11:
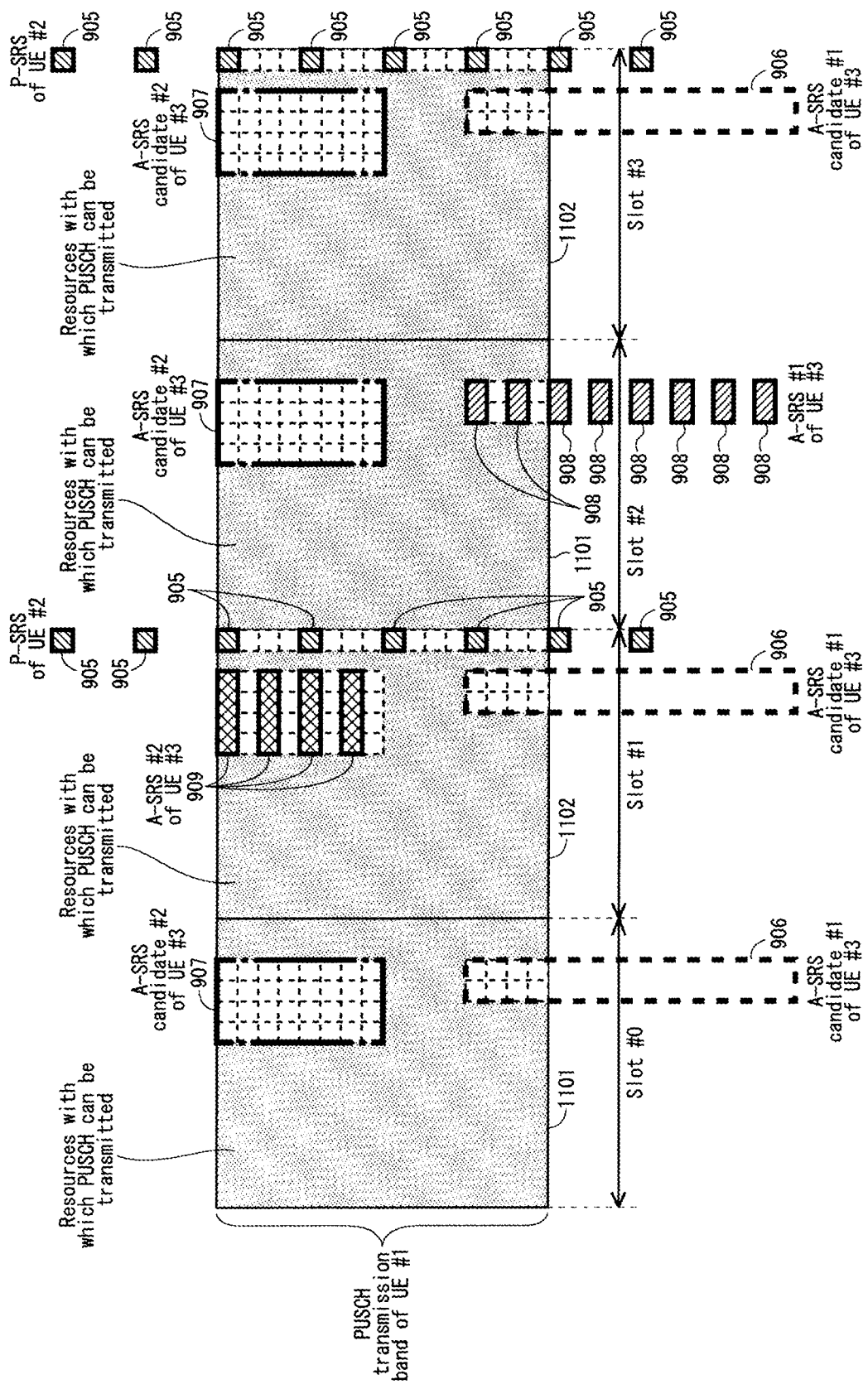
FIG. 11 illustrates an example where the PUSCH is transmitted outside the range of PRBs of the SRS according to the first embodiment.

FIG. 11 illustrates an example where the PUSCH is transmitted outside the range of PRBs of the SRS in the SRS transmission symbols notified to the UE. The SRS configuration of each UE in FIG. 11 is identical to that in FIG. 9. In FIG. 11, the same figure numbers are applied to the signals common to those in FIG. 9, and the common description thereof is omitted.

In the slot number 0 of FIG. 11, the UE #1 can transmit the PUSCH in the 0-th to 7-th, 12-th, and 13-th symbols across the entire PUSCH transmission band. Furthermore, the UE #1 can transmit the PUSCH in a range excluding the aperiodic SRS configurations #1 906 and #2 907 of the UE #3, in the 8-th to 11-th symbols of the slot number 0. The UE transmits a PUSCH 1101 with the time and frequency resources, in response to the notification on the SRS configuration from the base station.

In the slot number 1 of FIG. 11, the UE #1 can transmit the PUSCH in the 0-th to 7-th and 12-th symbols across the entire PUSCH transmission band. Furthermore, the UE #1 can transmit the PUSCH in a range excluding the aperiodic SRS configurations #1 906 and #2 907 of the UE #3, in the 8-th to 11-th symbols of the slot number 1. The UE transmits a PUSCH 1102 with the time and frequency resources, in response to the notification on the SRS configuration from the base station.

Since the slot numbers 2 and 3 of FIG. 11 are configured in the same manner as the slot numbers 0 and 1, respectively, the description is omitted.

As another example where the UE transmits the PUSCH in the SRS transmission symbols included in the notification from the base station, the UE may transmit the PUSCH within the range of PRBs of the SRS that are included in the SRS configuration notified from the base station to the UE. The UE may transmit the PUSCH, for example, while avoiding REs to which the SRS is actually allocated, that is, a comb configuration. This can, for example, increase the transmission rate of the PUSCH in the UE.

The UE may transmit the PUSCH both outside and within the range of the PRBs of the SRS in the SRS transmission symbols included in the notification from the base station. This can, for example, further increase the transmission rate of the PUSCH in the UE.

Figure 12:
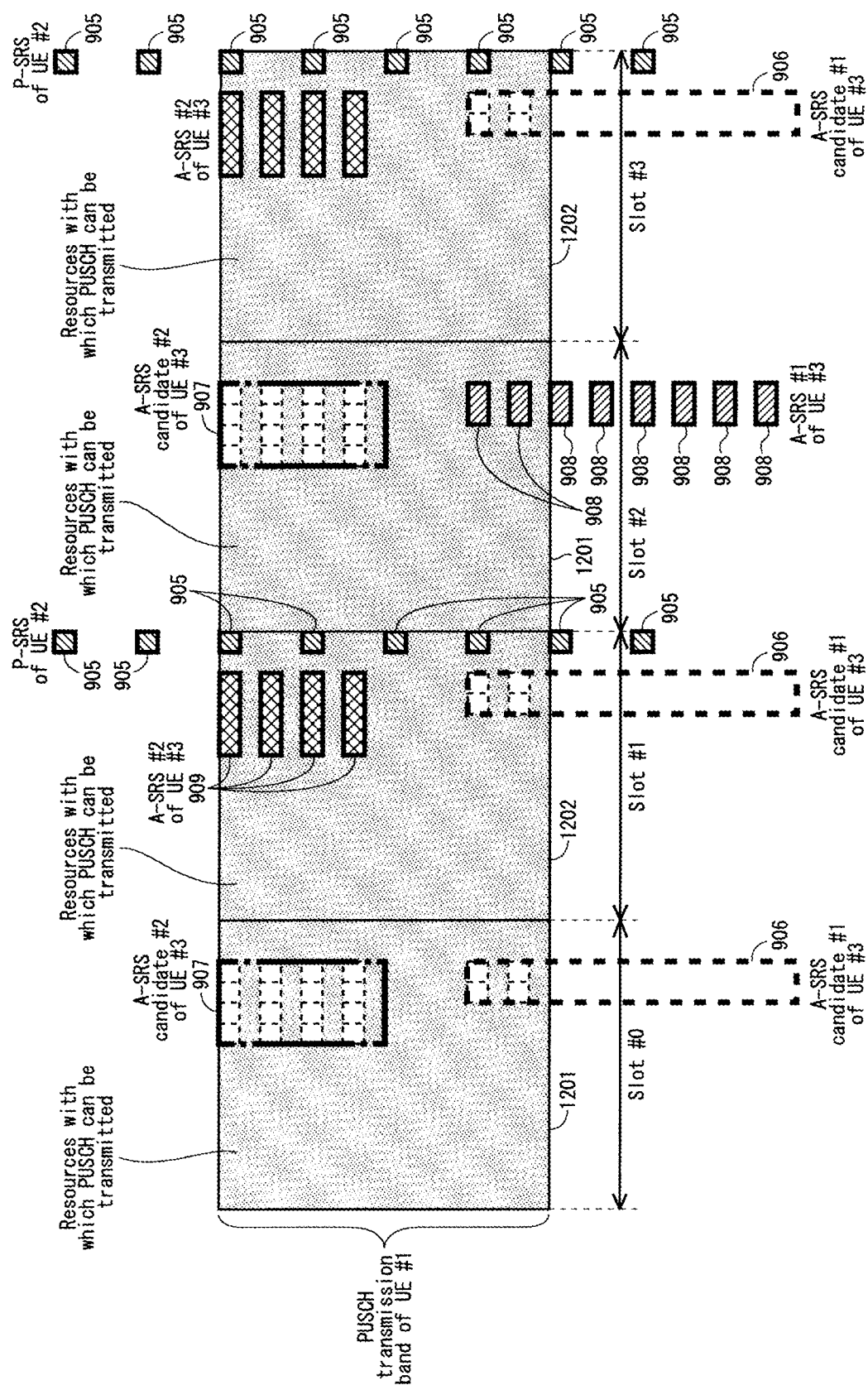
FIG. 12 illustrates an example where the PUSCH is transmitted both outside and within the range of the PRBs of the SRS according to the first embodiment.

FIG. 12 illustrates an example where the PUSCH is transmitted both outside and within the range of the PRBs of the SRS in the SRS transmission symbols notified to the UE. The SRS configuration of each UE in FIG. 12 is identical to that in FIG. 9. In FIG. 12, the same figure numbers are applied to the signals common to those in FIG. 9, and the common description thereof is omitted.

In the slot number 0 of FIG. 12, the UE #1 can transmit the PUSCH in the 0-th to 7-th, 12-th, and 13-th symbols across the entire PUSCH transmission band. Furthermore, the UE #1 can transmit the PUSCH in a range excluding the aperiodic SRS configurations #1 906 and #2 907 of the UE #3 and in the REs to which the SRS is not allocated, in the 8-th to 11-th symbols of the slot number 0. The UE transmits a PUSCH 1201 with the time and frequency resources, in response to the notification on the SRS configuration from the base station.

In the slot number 1 of FIG. 12, the UE #1 can transmit the PUSCH in the 0-th to 7-th and 12-th symbols across the entire PUSCH transmission band. Furthermore, the UE #1 can transmit the PUSCH in a range excluding the aperiodic SRS configurations #1 906 and #2 909 of the UE #3 and in the REs to which the SRS is not allocated, in the 8-th to 11-th symbols of the slot number 1. Furthermore, the UE #1 can transmit the PUSCH in the REs to which the periodic SRS configuration 905 of the UE #2 is not allocated, in the 13-th symbols of the slot number 1. The UE transmits a PUSCH 1202 with the time and frequency resources, in response to the notification on the SRS configuration from the base station.

Since the slot numbers 2 and 3 of FIG. 12 are configured in the same manner as the slot numbers 0 and 1, respectively, the description is omitted.

The base station may notify the UE of information on change in the SRS configurations of the other UEs. In response to the notification, the UE may change the time and/or frequency resources with which the PUSCH is transmitted. This can, for example, reduce the interference between the PUSCH and the SRSs of the other UEs after change in the SRS configurations of the other UEs.

The base station may give the notification to the UE each time the SRS configurations of the other UEs are changed. Since this can, for example, immediately reflect change in the SRS configurations of the other UEs on transmission of the PUSCH, the interference between the PUSCH and the SRSs of the other UEs can be reduced. The base station may notify the UE of only information on a difference between before and after change in the configuration. This can, for example, reduce the amount of signaling from the base station to the UE.

The base station may give the notification to the UE in every predetermined period. This can reduce the amount of signaling from the base station to the UE, for example, when the SRS configurations of the other UEs are frequently changed. The base station need not always give the notification to the UE. The base station need not give the notification to the UE, for example, when the SRS configurations of the other UEs are not changed during the period. This can, for example, reduce the amount of signaling from the base station to the UE. The base station may notify the UE of only the information on the difference between before and after change in the configuration. This can, for example, reduce the amount of signaling from the base station to the UE.

Another solution is disclosed. The base station may broadcast, to the UEs being served thereby, information on the SRS configurations of the UEs being served thereby. This can, for example, reduce the amount of signaling on the information from the base station. The base station may perform the broadcast using, for example, the Other SI in the system information (SI) (see Non-Patent Document 16 (TS38.300 v15.0.0)) or Remaining Minimum SI (RMSI) (see Non-Patent Document 16 (TS38.300 v15.0.0)). A dedicated SIB may be provided. The details included in the broadcast may be (1) to (11) disclosed as the information on the candidates for the SRS transmission resources to be notified from the base station to the UE in the aforementioned solution.

Another solution is disclosed. The base station may dynamically notify the PUSCH transmission UE of the information on the SRS transmissions of the other UEs. The base station may give the notification, for example, per slot. The base station may give the notification, for example, via the L1/L2 signaling. This enables, for example, a prompt notification to the UE. In addition, for example, transmission of the PUSCH can be stopped only in the symbols in which the SRS is actually transmitted. Consequently, the transmission rate of the PUSCH can be increased.

As another example, the DCI of the group common signalling (see Non-Patent Document 14 (TS38.213 v15.0.0)) may be used in the notification. This enables, for example, the base station to simultaneously notify a plurality of UEs of information on the SRS transmissions of the other UEs.

The group common signaling may be, for example, a group common signaling for a part or all of the UEs in a beam. Consequently, the information can be notified to a batch of the UEs that communicate via the same beam. Consequently, the amount of signaling can be reduced.

The UE may receive the group common signaling every slot. This enables, for example, the UE to avoid the SRS transmissions of the other UEs every slot.

The information on the SRS transmissions of the other UEs may be included in the DCI of the uplink grant for the PUSCH transmission UE, or may be DCI different from that of the uplink grant.

As another example, the information may be included in the PDCCH different from that of the uplink grant and notified. For example, when the SRSs of the other UEs need to be transmitted after notification of the uplink grant to the PUSCH transmission UE, the information may be included in the PDCCH different from that of the uplink grant and notified. This enables, for example, the PUSCH transmission UE to avoid a collision in the time and frequency resources with the SRS transmissions of the other UEs, even when the waiting time from receipt of the uplink grant to transmission of the PUSCH is long.

As another example, the information may be notified using a notification indicating that preemption will be performed, for example, a preemption indication. This enables the prompt notification from the base station to the PUSCH transmission UE.

As another example, the base station may notify the information via the MAC signaling. A large amount of information with multi-level modulation can be notified, and the reliability with HARQ retransmission can be enhanced.

The following (1) to (12) are disclosed as pieces of information on the SRS transmissions of the other UEs to be dynamically notified from the base station to the PUSCH transmission UE.

(1) Information for identifying the SRS configurations
(2) A type of each of the SRS configurations
(3) Information on SRS transmission symbols
(4) Information on an SRS transmission frequency
(5) Information on a sequence of the SRSs
(6) Information on a configuration of the SRS comb
(7) Antenna ports of the SRSs
(8) Numerologies of the SRSs
(9) Information on a slot in which the SRSs are transmitted
(10) Information on whether the PUSCH can be transmitted. The following (10-1) to (10-6) are disclosed as examples of the information.
  (10-1) Information on whether the PUSCH can be transmitted before the earliest symbol among the group of SRS transmission symbols in a slot
  (10-2) Information on whether the PUSCH can be transmitted after the latest symbol among the group of SRS transmission symbols in the slot
  (10-3) Information on whether the PUSCH can be transmitted in a range from the earliest symbol to the latest symbol among the group of SRS transmission symbols in the slot
  (10-4) Information on whether the PUSCH can be transmitted in a configured SRS transmission symbol
  (10-5) Information on whether the PUSCH can be transmitted with configured SRS transmission frequency resources in the configured SRS transmission symbol
  (10-6) Combinations of (10-1) to (10-5) above
(11) Information on a beam to be used for transmitting the SRSs
(12) Combinations of (1) to (11) above (1) to (8), (10), and (11) may be the same as the disclosed pieces of information on the candidates for the SRS transmission resources to be semi-statically notified from the base station to the UE.

(9) may be, for example, a slot number in which the SRSs are transmitted or a slot duration from transmission of the notification from the base station to the UE to transmission of the SRSs. This enables, for example, the UE to understand the slot number in which the SRSs are transmitted, which can consequently prevent unnecessary stop of transmitting the PUSCH in the UE.

In response to the notification from the base station, the UE may stop transmitting the PUSCH. The operation of stopping transmission of the PUSCH in the UE may be the same as the operation to be performed in response to the semi-static notification.

Figure 13:
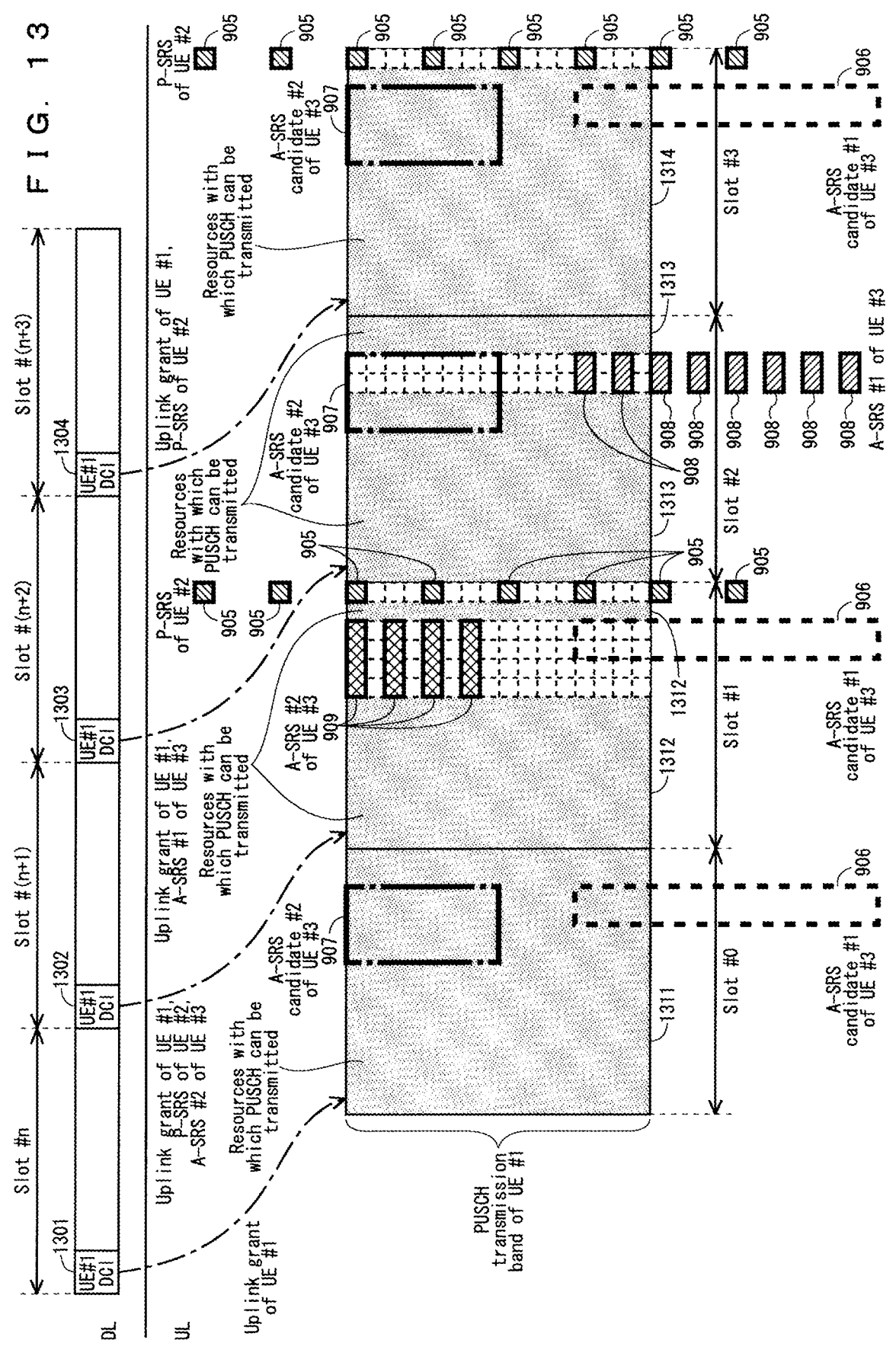

FIG. 13 illustrates an example where the base station notifies, for each slot, the UE of the information on the SRS transmissions of the other UEs. FIG. 13 illustrates a case where the UE does not transmit the PUSCH only in the notified SRS transmission symbols. The SRS configuration of each UE in FIG. 13 is identical to that in FIG. 9. In FIG. 13, the same figure numbers are applied to the signals common to those in FIG. 9, and the common description thereof is omitted.

The base station includes the uplink grant in a DCI 1301 to notify the UE #1 of the uplink grant, in a slot number n in the downlink of FIG. 13. The DCI 1301 does not include the SRS configurations of the other UEs. The UE #1 transmits a PUSCH 1311 in the 0-th to 13-th symbols in the slot number 0 in the uplink.

The base station includes the uplink grant in a DCI 1302 to notify the UE #1 of the uplink grant, in a slot number (n+1) in the downlink of FIG. 13. The DCI 1302 includes information on the periodic SRSs 905 of the UE #2 and the aperiodic SRSs #2 909 of the UE #3. The UE #1 transmits, with the DCI 1302, a PUSCH 1312 in the 0-th to 7-th and 12-th symbols in the slot number 1 in the uplink.

The base station includes the uplink grant in a DCI 1303 to notify the UE #1 of the uplink grant, in a slot number (n+2) in the downlink of FIG. 13. The DCI 1303 includes information on the aperiodic SRSs #2 908 of the UE #3. The UE #1 transmits, with the DCI 1303, a PUSCH 1313 in the 0-th to 9-th, 12-th, and 13-th symbols in the slot number 2 in the uplink.

The base station includes the uplink grant in a DCI 1304 to notify the UE #1 of the uplink grant, in a slot number (n+3) in the downlink of FIG. 13. The DCI 1304 includes information on the periodic SRSs 905 of the UE #2. The UE #1 transmits, with the DCI 1304, a PUSCH 1314 in the 0-th to 12-th symbols in the slot number 3 in the uplink.

Another solution is disclosed. The base station notifies the UE of the candidates for the SRS transmission resources which are configured for the UEs being served thereby, semi-statically in advance. The base station may give the notification via the RRC dedicated signaling, or perform the broadcast to the UEs being served thereby instead of the notification. Examples of the candidates for the SRS transmission resources may include all the resource configurations for the aperiodic SRS, the resource configurations for the semi-persistent SRS, and the resource configurations for the periodic SRS. The details of the semi-static notification may be a part or all of (1) to (12) which are disclosed as the information on the candidates for the SRS transmission resources to be semi-statically notified from the base station to the UE. The base station may dynamically notify the UE of information on the SRSs that are actually transmitted from the other UEs. (1) to (12) which are disclosed as the information on the candidates for the SRS transmission resources to be dynamically semi-statically notified from the base station to the UE may be applied to the details of the dynamic notification. All of (1) to (12) or a part thereof, for example, only the information in (1) may be applied. This enables, for example, the UE to use a symbol to which the SRS that is not actually transmitted is allocated when transmitting the PUSCH, which can consequently increase the transmission rate of the PUSCH.

Examples of the dynamic notification from the base station to the UE may include an identifier of a configuration of the aperiodic SRS, information indicating that the semi-persistent SRS has been activated or deactivated, an identifier of a configuration of the semi-persistent SRS, information on a slot in which the semi-persistent is activated or deactivated, or a combination of some of these. This can, for example, reduce the amount of signaling in the dynamic notification.

The base station may notify the PUSCH transmission UE of information on the time and/or frequency resources with which transmission of the PUSCH is stopped, instead of the information on the candidates for the SRS transmission resources disclosed in the first embodiment. With the information, the PUSCH transmission UE may stop transmitting the PUSCH. Since, for example, this limits the details of the notification from the base station to the UE to information on the resources for stopping transmission of the PUSCH, the amount of signaling can be reduced.

As another example, in the uplink grant to be notified from the base station to the PUSCH transmission UE, the discrete time and/or frequency allocation may be performed. Information on the discrete allocation may be included in the uplink grant. A bitmap may be used as an example of the information. The UE may discretely transmit the PUSCH on the time and/or frequency axes using the information on the allocation. This enables flexible scheduling from the base station to the UE.

The discrete allocation of the PUSCH may be applied in the absence of a collision in the time and/or frequency resources between the PUSCH and the SRS. This may be applied, for example, when part of the time and/or frequency resources are shared between the PUSCH scheduling for the PUSCH transmission UE and the PUSCH scheduled for the UE using a different numerology. In such a state, for example, the discrete allocation of the PUSCH may be performed after or simultaneously with the allocation of the PUSCH to the UE using the different numerology. The discrete allocation is different from the preemption in this point. This can, for example, increase the flexibility in the scheduling from the base station to each of the UEs being served thereby.

The method for operating the PUSCH transmission UE which is disclosed in the first embodiment may be statically defined, or determined and notified or broadcast to the UE by the base station.

As an example where the method is statically defined, the operation of the PUSCH transmission UE may be determined according to information on a symbol in which the DMRS is placed. For example, the PUSCH transmission UE may stop transmitting the PUSCH when no DMRS is allocated to a symbol before the earliest symbol among the group of SRS transmission symbols in a slot. This may be applied to a symbol after the latest symbol among the group of SRS transmission symbols, or a symbol to which no SRS transmission is allocated in the range from the earliest symbol to the latest symbol. Assuming that one symbol group consists of consecutive symbols to which no SRS is allocated for the symbols to which no SRS transmission is allocated in the range from the earliest symbol to the latest symbol among the group of SRS transmission symbols, whether the PUSCH can be transmitted may be determined depending on the presence or absence of the DMRS in the symbol group. This enables, for example, the PUSCH transmission UE to stop transmitting, in the PUSCH, the symbol in which the base station cannot maintain the demodulating characteristics. Consequently, the power consumption of the PUSCH transmission UE can be reduced.

A modulation scheme of the PUSCH of the PUSCH transmission UE may be used as another example of defining the operation of the PUSCH transmission UE in a standard. For example, when the OFDM is used for modulating the PUSCH, the PUSCH may be transmitted in an RE to which no SRS is allocated in an SRS transmission symbol. This can, for example, maintain the transmission rate of the PUSCH. As another example, when the DFT-Spread-OFDM (DFT-s-OFDM) is used for modulating the PUSCH, the PUSCH need not be transmitted in the SRS transmission symbol. This can, for example, prevent degradation in the PAPR in the PUSCH transmission UE.

As an example where the base station determines the operation of the PUSCH transmission UE and notifies it to the UE which is disclosed in the first embodiment, the base station may give the notification semi-statically, e.g., via the RRC dedicated signaling, or dynamically, e.g., via the MAC signaling and/or the L1/L2 signaling. Examples of the details in the semi-static notification may include (10) disclosed as the information on the SRS transmissions of the other UEs which is semi-statically notified from the base station to the PUSCH transmission UE. Examples of the details in the dynamic notification may include (10) disclosed as the information on the SRS transmissions of the other UEs which is dynamically notified from the base station to the PUSCH transmission UE.

The PUSCH transmission UE need not transmit the uplink data mapped to a symbol or an RE whose transmission is stopped in response to the notification of the SRS configurations of the other UEs from the base station. This can, for example, avoid the complexity in a process for transmitting the PUSCH in the UE.

As another example, the PUSCH transmission UE may transmit the uplink data mapped to a symbol or an RE whose transmission is stopped in response to the notification of the SRS configurations of the other UEs from the base station, in the subsequent symbol. This can, for example, maintain the continuity of codes when the base station performs demodulation and/or decoding. Consequently, for example, the decoding characteristics can be maintained.

The coding rate of the PUSCH need not be changed. The UE need not transmit the uplink data mapped to the last PUSCH by transmitting the uplink data in the subsequent symbol or the other REs. This can, for example, avoid the complexity in a process for transmitting the PUSCH in the UE.

As another example, the coding rate of the PUSCH may be changed. For example, the coding rate may be increased. This enables, for example, the UE to transmit the uplink data mapped to the last PUSCH to the base station. Information on change in the coding rate may be defined in a standard, or determined and notified to the UE in advance by the base station. The base station may give the notification, for example, via the RRC signaling, the MAC signaling, or the L1/L2 signaling. The information on change in the coding rate may be, for example, notified from the base station to the UE together with the information on the SRS transmissions of the other UEs dynamically notified from the base station to the PUSCH transmission UE.

As another example in the presence of a symbol or an RE in which the UE stops transmitting the PUSCH in response to the notification of the SRS configurations of the other UEs from the base station, the UE need not allocate the uplink data in the symbol or the RE. The process of not allocating the uplink data may be performed, for example, in a coding process and/or a modulating process in the UE. This enables, for example, the UE to easily perform a process of mapping the uplink data to the PUSCH. In the process of not allocating the uplink data, the coding rate need not be changed or may be changed. Information on change in the coding rate may be defined in a standard, or determined and notified to the UE in advance by the base station. The base station may give the notification, for example, via the RRC signaling, the MAC signaling, or the L1/L2 signaling. The information on change in the coding rate may be, for example, notified from the base station to the UE together with the information on the SRS transmissions of the other UEs dynamically notified from the base station to the PUSCH transmission UE.

Information on whether the base station allocates the uplink data to the UE in the symbol or the RE may be defined in advance in a standard, or determined and notified or broadcast to the UE by the base station. The base station may give the notification, for example, via the RRC signaling. This can, for example, easily control the uplink transmission in the communication system.

According to the first embodiment, the base station may notify the SRS configuration to the UEs in any states of RRC_IDLE, RRC_INACTIVE, and RRC_CONNECTED (see Non-Patent Document 16). The notification may be included in, for example, the signaling for the RRC connection reconfiguration (RRCConnectionReconfiguration). For example, since the UE can obtain the SRS configuration upon the RRC connection establishment with the base station, the interference between the SRSs of the other UEs and the PUSCH of its own UE can be avoided from the start of communication between the UE and the base station. As another example, the base station may notify the SRS configuration only to the UEs in the RRC_CONNECTED state. This can, for example, reduce the amount of signaling in the notification from the base station to the UEs being served thereby. The two examples may be combined. For example, the base station may initially notify the SRS configuration to the UEs in any states of RRC_IDLE, RRC_INACTIVE, and RRC_CONNECTED, and may notify change in the SRS configuration only to the UEs in the RRC_CONNECTED state. This can, for example, reduce the amount of signaling from the base station to the UE while the interference between the SRSs of the other UEs and the PUSCH of its own UE can be avoided from the start of communication between the UE and the base station.

The SRS configuration included in the notification from the base station to the UE according to the first embodiment may differ for each UE. As an example where the base station notifies the SRS configuration which is different for each UE, the SRS configuration may be limited to the SRS configuration to be transmitted to the beam to which the UE belongs. This can reduce the size of the signaling of the SRS configuration.

As another example, the SRS configuration may be limited to the SRS configuration to be transmitted to a plurality of beams including the beam to which the UE belongs. Even upon occurrence of the inter-beam mobility in the UE, redoing the signaling from the base station to the UE is unnecessary. The plurality of beams may include beams surrounding the beam to which the UE belongs, or may be beams distant from the beam to which the UE belongs, for example, beams which enable communication via a reflected wave of the beam to which the UE belongs.

As another example, the SRS configuration may be limited to the SRS configuration including the frequency resources of a bandwidth part (BWP: see Non-Patent Document 14 (TS38.213 v15.0.0)) that is activated in the UE. This can, for example, reduce the size of the signaling of the SRS configuration.

As another example, the SRS configuration may be limited to the SRS configuration including the frequency resources of the BWP configured for the UE. Even upon occurrence of switching of the BWP in the UE, redoing the signaling from the base station to the UE is unnecessary.

As another example, the SRS configuration may be limited to the SRS configuration including the time and/or frequency resources which the base station schedules for the UE. For example, when the time and/or frequency resources which the base station allocates to the UE are predetermined, the example may be applied. This can, for example, reduce the amount of signaling from the base station to the UE.

The aforementioned examples may be combined. In other words, the SRS configuration included in the notification from the base station to the UE according to the first embodiment may be limited to the SRS configuration to be transmitted to the beam to which the UE belongs and the SRS configuration including the frequency resources of the bandwidth part (BWP) that is activated in the UE. This can, for example, further reduce the amount of signaling from the base station to the UE.

The DMRS may be additionally transmitted in the first embodiment. For example, the DMRS may be transmitted when transmission of the PUSCH is resumed. The DMRS may be a configured DMRS (e.g., an additional DMRS), or a new DMRS may be configured.

The new DMRS may be placed after the SRS. For example, when transmission of the PUSCH in 14 symbols is configured, the new DMRS may be placed in the 12-th and/or 13-th symbols. For example, when the SRS of another UE is transmitted in the 11-th symbol, the demodulating characteristics of the base station can be improved upon resumption of the PUSCH in the 12-th and 13-th symbols.

As another example, the new DMRS may be placed before the SRS. This can, for example, improve the demodulating characteristics in a symbol immediately before the SRS.

As another example, the new DMRSs may be placed both before and after the SRS. This can, for example, produce the combined advantages previously described.

Information on transmission of the new DMRS may be determined in a standard, or determined and notified or broadcast to the UE by the base station. The base station may give the notification via the RRC signaling, the MAC signaling, the L1/L2 signaling, or a combination of these.

The following (1) to (5) are disclosed as pieces of the information on transmission of the new DMRS.
  (1) Information indicating whether the new DMRS is placed before the SRS, for example, an identifier
  (2) Information indicating whether the new DMRS is placed after the SRS, for example, an identifier
  (3) Information on a transmission symbol of the new DMRS, for example, a symbol number or the number of symbols
  (4) Information on intervals and the offset of REs at which the new DMRS is transmitted
  (5) Combinations of (1) to (4) above (1) and/or (2) can, for example, improve the demodulating characteristics of the PUSCHs before and/or after transmission of the SRS in the base station.

(3) can, for example, flexibly place the DMRS in the communication system.

In (4), the UE may place the PUSCH in the REs where no DMRS is placed. This can, for example, maintain the transmission rate of the PUSCH.

FIG. 14 illustrates an example of adding the DMRSs before and after transmission of the SRS from another UE. In the example of FIG. 14, the UE transmits additional DMRSs 1401 in the 10-th and 12-th symbols.

The PTRS may be additionally transmitted in the first embodiment. For example, when the PTRS is transmitted at intervals of two symbols or more, a new PTRS may be placed.

The new PTRS may be placed after the SRS. For example, the base station can compensate for the phase noise in the PUSCH symbol immediately after transmitting the SRS. Consequently, the demodulating characteristics of the PUSCH in the base station can be improved.

As another example, the new PTRS may be placed before the SRS. This can, for example, produce the aforementioned advantages in the PUSCH symbol immediately before the SRS.

As another example, the new DMRSs may be placed both before and after the SRS. This can, for example, produce the aforementioned advantages immediately before and immediately after the SRS.

Information on transmission of the new PTRS may be determined in a standard, or determined and notified or broadcast to the UE by the base station. The base station may give the notification via the RRC signaling, the MAC signaling, the L1/L2 signaling, or a combination of these.

The following (1) to (4) are disclosed as pieces of the information on transmission of the new PTRS.
  (1) Information indicating whether the new PTRS is placed before the SRS, for example, an identifier
  (2) Information indicating whether the new PTRS is placed after the SRS, for example, an identifier
  (3) Information on a transmission symbol of the new PTRS, for example, a symbol number
  (4) Combinations of (1) to (3) above (1) and/or (2) can, for example, improve the demodulating characteristics of the PUSCHs before and/or after transmission of the SRS in the base station.

(3) can, for example, increase the flexibility in placing the PTRS.

The information on transmission of the new PTRS may be determined for each UE or for each SRS. Such a configuration for each UE can, for example, reduce the signaling on the configuration. Such a configuration for each SRS can, for example, increase the flexibility in the configuration on transmission of the PTRS.

FIG. 15 illustrates an example of adding the PTRS after transmission of the SRS from another UE. The example of FIG. 15 illustrates that a PTRS 1501 is transmitted at a rate of one RE every four symbols and the third PTRS is allocated to the same symbol as that of the SRS 1502 transmitted by the UE #2. In FIG. 15, an additional PTRS 1503 is transmitted in a symbol next to that of the SRS 1502.

The additional PTRS may be transmitted when the PUSCH transmission UE itself transmits the SRS. For example, the transmission of the SRS of the UE #2 in FIG. 15 may be performed by the PUSCH transmission UE itself. This can, for example, improve the demodulating characteristics in the base station when its own UE transmits the PUSCH after transmitting the SRS.

The method disclosed in the first embodiment may be applied when the UE places the PUSCH before or after an SRS symbol or a group of SRS symbols. For example, the base station may notify, in advance, the UE of the candidates for the SRS transmission resources that are configured for the UEs being served thereby. The UE may strop transmitting the PUSCH with the SRS transmission resources. Furthermore, the base station may notify the UE of a range of PRBs in the notification of the SRS configuration, per number of the PRBs that is a configuration resolution of the SRS. Furthermore, the base station may notify the UE only of the SRS configuration including a frequency range of an active BWP of the UE. Furthermore, the base station may notify the UE only of the SRS configuration in the beam to which the UE belongs. Furthermore, the base station may broadcast the SRS configuration to the UE. Furthermore, the additional DMRS may be placed before or after transmission of the SRS. Similarly, the additional PTRS may be placed before or after transmission of the SRS. This produces the same advantages as previously described.

The first embodiment can maintain the transmission rate of the PUSCH even when the SRS of another UE is transmitted in a PUSCH transmission section.

The first modification of the first embodiment

The first modification discloses a solution for allocating the PUSCH of its own UE and the SRSs of the other UEs, which is different from that disclosed in the first embodiment.

The SRS transmission UE need not transmit the SRS in symbols and a frequency band to which the PUSCH to be transmitted by the PUSCH transmission UE is allocated. The SRS transmission UE may transmit the SRS outside the symbols and the frequency band. The PUSCH transmission UE may continue to transmit the PUSCH in a symbol to which the SRS is allocated. This enables, for example, a sounding by the SRS transmission UE while the transmission rate of the PUSCH is maintained. The SRS transmission UE may transmit the SRS when the SRS has a numerology identical to or different from that of the PUSCH.

The SRS transmission UE need not transmit the SRS in a frequency band of the PUSCH, in a symbol to which the DMRS associated with the PUSCH is allocated. This can, for example, improve the demodulating characteristics of the PUSCH in the base station. This may be applied to the PTRS associated with the PUSCH. This produces the same advantages as previously described. As another example, the SRS transmission UE need not transmit the SRS in the frequency band of the PUSCH when the PUSCH to be transmitted by the PUSCH transmission UE includes information on the aperiodic CSI report. This can enhance the reliability in the aperiodic CSI report.

Figure 16:
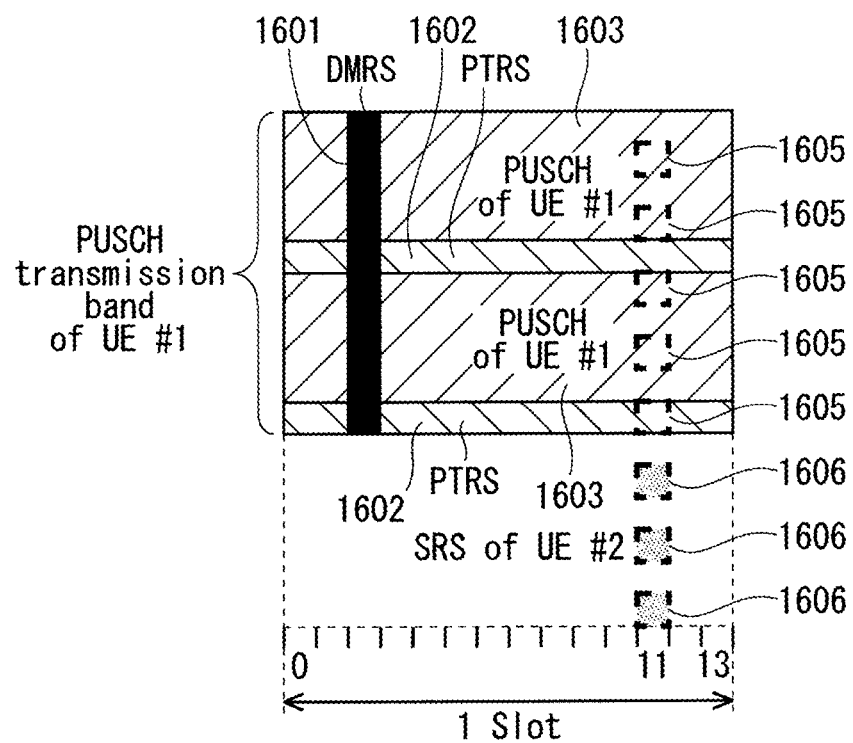
FIG. 16 illustrates an example where the SRS transmission UE transmits the SRS outside symbols and a frequency band to which the PUSCH to be transmitted by the PUSCH transmission UE is allocated according to the first modification of the first embodiment.

FIG. 16 illustrates an example where the SRS transmission UE does not transmit the SRS in the symbols and the frequency band to which the PUSCH to be transmitted by the PUSCH transmission UE is allocated, and transmits the SRS outside the symbols or the frequency band. In the example of FIG. 16, the PUSCH and the SRS are identical in subcarrier spacing. In the example of FIG. 16, the PUSCH transmission UE transmits, in the second symbol, a DMRS 1601 associated with the PUSCH, and transmits, every symbol in two subcarriers, a PTRS 1602 associated with the PUSCH. In the example of FIG. 16, the SRS transmission UE is configured to transmit the SRS in the 11-th symbol at one subcarrier spacing.

In FIG. 16, the SRS transmission UE does not transmit the SRS in REs 1605 included in a frequency band occupied by PUSCHs 1603 and the PTRSs 1602 of the PUSCH transmission UE. The SRS transmission UE transmits the SRS in REs 1606 outside the frequency band.

Another solution is disclosed. The SRS transmission UE may transmit the SRS in the symbols and the frequency band to which the PUSCH to be transmitted by the PUSCH transmission UE is allocated. The PUSCH transmission UE need not transmit the PUSCH in REs where the time and frequency resources overlap those of the SRS. The SRS transmission UE may change a density of SRS combs. The SRS transmission UE may, for example, reduce the density. This can, for example, maintain the PUSCH transmission rate. As another example, the SRS transmission UE may change the offset of the SRS combs. This enables, for example, the SRS transmission UE to transmit the SRS while avoiding the PTRS to be transmitted by the PUSCH transmission UE. The aforementioned examples may be combined. This produces, for example, both of the advantages.

The SRS transmission UE may transmit the SRS when the PUSCH is OFDM-modulated. When the PUSCH is DFT-Spread-OFDM (DFT-s-OFDM) modulated, the UE need not transmit the SRS. This can prevent degradation in a peak-to-average power ratio (PAPR) in transmission of the PUSCH from the PUSCH transmission UE. As another example, when the PUSCH is DFT-Spread-OFDM modulated, the UE may transmit the SRS. A sounding from the SRS transmission UE can be performed in a wide band.

Figure 17:
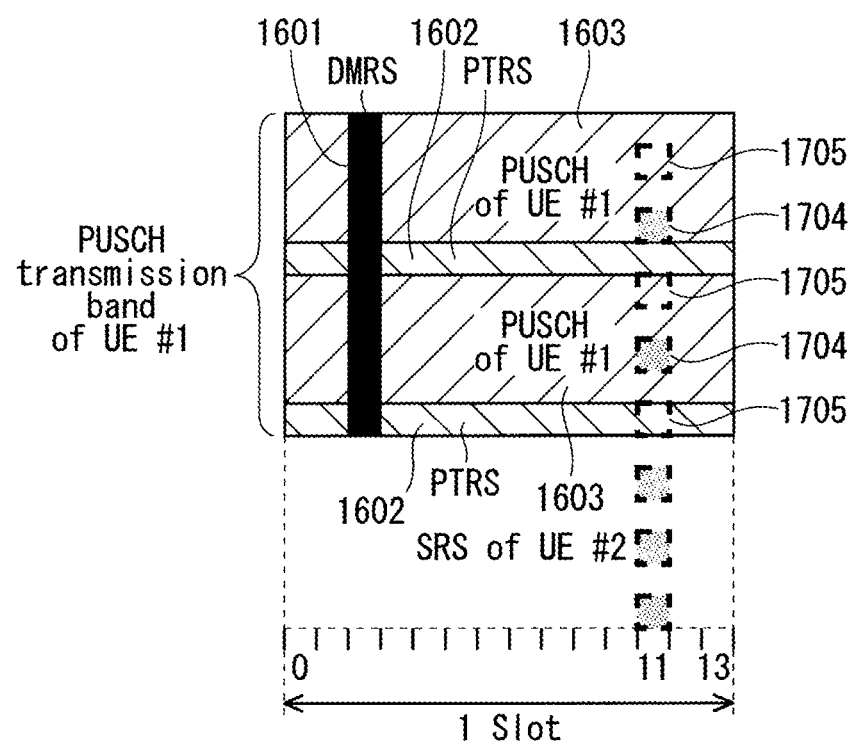
FIG. 17 illustrates an example where the SRS transmission UE transmits the SRS in the symbols and the frequency band to which the PUSCH to be transmitted by the PUSCH transmission UE is allocated, with a changed density of combs according to the first modification of the first embodiment.

FIG. 17 illustrates an example where the SRS transmission UE transmits the SRS in the symbols and the frequency band to which the PUSCH to be transmitted by the PUSCH transmission UE is allocated, with a changed density of the combs. The configuration of each UE in FIG. 17 is identical to that in FIG. 16. In FIG. 17, the same figure numbers are applied to the signals common to those in FIG. 16, and the common description thereof is omitted.

In FIG. 17, the SRS transmission UE transmits the SRS in REs 1704 included in the frequency band occupied by the PUSCHs 1603 and the PTRSs 1602 of the PUSCH transmission UE by changing a comb spacing of the SRS from 2REs to 4REs. In REs 1705, the SRS is not transmitted but the PUSCH 1603 or the PTRS 1602 is transmitted.

The base station may notify the PUSCH transmission UE of information on the SRS transmission. The information included in the notification may be identical to that according to the first embodiment.

Another solution is disclosed. The SRS transmission UE need not transmit the SRS in a symbol to which the PUSCH to be transmitted by the PUSCH transmission UE is allocated. The SRS transmission UE need not transmit the SRS outside the frequency band to which the PUSCH of the PUSCH transmission UE is allocated. This enables, for example, the base station to allocate the PUSCH to the other UEs outside the frequency band. Consequently, the communication capacity in the communication system can be increased.

The operation of not transmitting the SRS may be applied, for example, when the SRS differs in numerology from the PUSCH. The SRS transmission UE need not transmit the SRS, for example, when the subcarrier spacing of the SRS is larger than that of the PUSCH. This can, for example, prevent an interference with the PUSCH which is caused by a difference in subcarrier spacing upon transmission of the SRS outside the PUSCH band.

Figure 18:
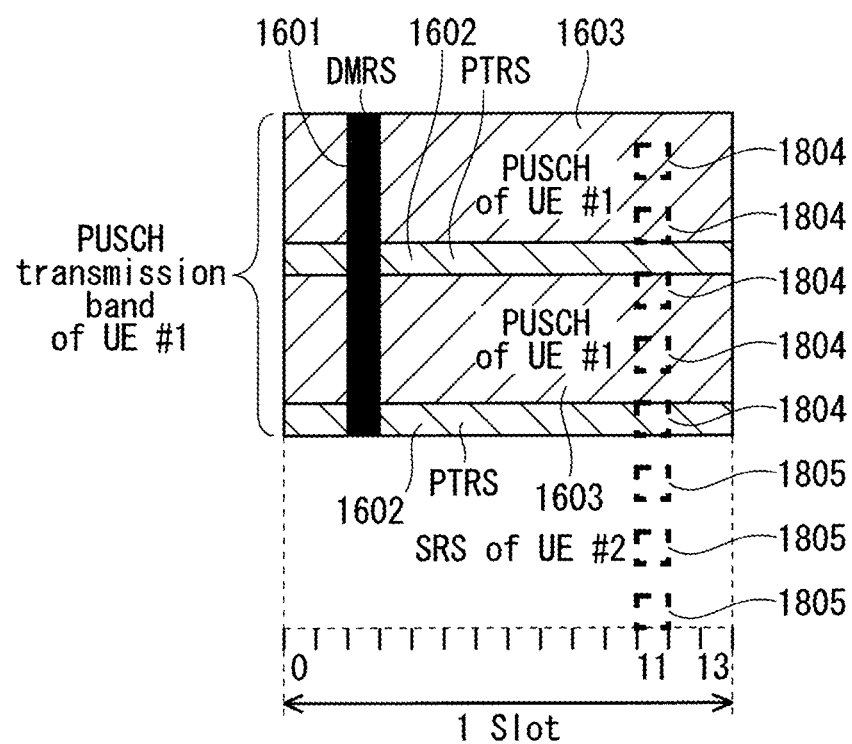
FIG. 18 illustrates an example where the SRS transmission UE does not transmit the SRS in a symbol to which the PUSCH to be transmitted by the PUSCH transmission UE is allocated according to the first modification of the first embodiment.

FIG. 18 illustrates an example where the SRS transmission UE does not transmit the SRS in a symbol to which the PUSCH to be transmitted by the PUSCH transmission UE is allocated. The configuration of each UE in FIG. 18 is identical to that in FIG. 16. In FIG. 18, the same figure numbers are applied to the signals common to those in FIG. 16, and the common description thereof is omitted.

In FIG. 18, the SRS transmission UE does not transmit the SRS in REs 1804 included in the frequency band occupied by the PUSCHs 1603 and the PTRSs 1602 of the PUSCH transmission UE and in REs 1805 that are not included in the frequency band. In the REs 1804 and 1805, the PUSCH 1603 or the PTRS 1602 is transmitted.

Another solution is disclosed. The following cases may be combined or switched: (a) the SRS transmission UE does not transmit the SRS and transmits the SRS, in the symbols and the frequency band to which the PUSCH to be transmitted by the PUSCH transmission UE is allocated, which is previously disclosed; (b) the SRS transmission UE does not transmit the SRS both inside and outside the frequency band; and (c) the PUSCH transmission UE does not transmit the PUSCH in a symbol in which the SRS transmission UE transmits the SRS, or the PUSCH transmission UE transmits the PUSCH only in a part of the frequency resources, which is disclosed in the first embodiment.

As an example of the combinations, in a band to which the PUSCH transmission UE allocates the PUSCH, the PUSCH transmission UE may transmit the DMRS or the PTRS which are associated with the PUSCH in REs to which the DMRS and/or the PTRS are allocated, and the SRS transmission UE may transmit the SRS in the other REs. This enables, for example, a sounding from the SRS transmission UE in a wide band, and improvement in the demodulating characteristics of the PUSCH in the base station.

As an example of the switching, the SRS transmission UE need not transmit the SRS in a band to which the PUSCH is allocated, in symbols to which the DMRS and/or the PTRS which are associated with the PUSCH and are transmitted by the PUSCH transmission UE are allocated, and may transmit the SRS in the band, outside the symbols. This enables, for example, a sounding from the SRS transmission UE in a wide band, and improvement in the demodulating characteristics of the PUSCH in the base station.

The operations of the SRS transmission UE on transmission of the SRS in the symbols and the frequency band to which the PUSCH is allocated which are disclosed in the first modification may be defined in a standard, or determined and notified or broadcast to the UE by the base station. The base station may give the notification semi-statically via the RRC signaling, dynamically via the MAC signaling, dynamically via the L1/L2 signaling, and via a combination of these.

The base station may notify or broadcast information on the SRS transmission to the PUSCH transmission UE. The information included in the notification may be identical to that according to the first embodiment.

The following (1) to (11) are disclosed as pieces of information to be notified from the base station to the SRS transmission UE.
 (1) Information for identifying its own SRS configuration
 (2) A type of its own SRS configuration
 (3) Information on its own SRS transmission symbol
 (4) Information on its own SRS transmission frequency
 (5) Information on a sequence of its own SRSs
 (6) Information on a comb configuration of its own SRS
 (7) An antenna port of its own SRS
 (8) Information on a slot in which its own SRS is transmitted
 (9) Information on transmission operations of its own SRS
 (10) Information on the PUSCH to be transmitted by the PUSCH transmission UE. The following (10-1) to (10-7) are disclosed as examples of the information.
 (10-1) Information on frequency resources of the PUSCH
 (10-2) Information on time resources of the PUSCH, for example, a transmission symbol of the PUSCH
 (10-3) Information on the DMRS associated with the PUSCH
 (10-4) Information on the PTRS associated with the PUSCH
 (10-5) Information on a method for modulating the PUSCH
 (10-6) Information on the uplink data to be transmitted with the PUSCH
 (10-7) Combinations of (10-1) to (10-6) above
 (11) Combinations of (1) to (10) above (1) to (7) above may be information identical to (1) to (7) which are disclosed as the information on the candidates for the SRS transmission resources to be semi-statically notified from the base station to the UE according to the first embodiment, respectively.

(8) above may be information identical to (9) which is disclosed as the information on the candidates for the SRS transmission resources to be dynamically notified from the base station to the UE according to the first embodiment.

(9) above may be, for example, information indicating that the SRS is not transmitted in a frequency band of the PUSCH, information indicating that the SRS is transmitted in the frequency band of the PUSCH, or information indicating that the SRS is not transmitted in a symbol overlapping that of the PUSCH. The SRS transmission UE should perform the operation disclosed in the first embodiment or the first modification, using the aforementioned information. This can, for example, flexibly control transmission of the PUSCH and the SRS in the communication system.

(10-1) may be, for example, the first PRB or the last PRB of the PUSCH, the number of PRBs, or a combination of these, which are allocated from the base station to the PUSCH transmission UE. The SRS transmission UE may, for example, transmit the SRS while avoiding the frequency resources allocated to the PUSCH, using the information in (10-1). This enables, for example, a sounding between the SRS transmission UE and the base station while the transmission rate of the PUSCH in the communication system is maintained.

(10-2) may be, for example, the first symbol or the last symbol of the PUSCH, the number of symbols, or a combination of these, which are allocated from the base station to the PUSCH transmission UE. The SRS transmission UE may, for example, transmit the SRS in symbols other than those allocated to the PUSCH, using the information in (10-2). This enables, for example, a sounding between the SRS transmission UE and the base station in a wide band while the transmission rate of the PUSCH in the communication system is maintained.

(10-3) may be, for example, information on symbols to be allocated to the DMRS associated with the PUSCH. The information may be, for example, a symbol number of the DMRS, or may include information on the number of symbols (e.g., the number of symbols of a series of DMRSs). As another example, the information may be information on a bitmap in which each symbol is associated with a corresponding bit. The SRS transmission UE may, for example, transmit the SRS while avoiding symbols allocated to the DMRS, using the information in (10-3). This enables, for example, a sounding between the SRS transmission UE and the base station in a wide band while the demodulating performance of the PUSCH in the base station is maintained.

Another example of (10-3) may be information on the frequency resources to be allocated to the DMRS associated with the PUSCH. The SRS transmission UE may, for example, transmit the SRS while avoiding REs allocated to the DMRS, using the information in (10-3). This can, for example, enhance the reliability in the sounding between the SRS transmission UE and the base station while the demodulating performance of the PUSCH in the base station is maintained.

(10-4) may be, for example, information obtained by replacing the DMRS in (10-3) with the PTRS. This produces, for example, the same advantages as those in (10-3).

(10-5) may be, for example, information indicating that the PUSCH is OFDM-modulated or DFT-Spread-OFDM modulated. The SRS transmission UE may, for example, transmit the SRS in the time and frequency resources that collide with those of the PUSCH, using the information indicating that the PUSCH is OFDM-modulated. This enables, for example, a sounding between the SRS transmission UE and the base station in a wide band. As another example, the SRS transmission UE may, for example, stop transmitting the SRS in the time and frequency resources that collide with those of the PUSCH, using the information indicating that the PUSCH is DFT-Spread-OFDM modulated. This can, for example, prevent degradation in the PAPR in the PUSCH.

(10-6) may be, for example, information indicating whether the PUSCH is a PUSCH in which the aperiodic CSI report is transmitted. The SRS transmission UE, for example, need not transmit the SRS in the time and/or frequency resources that collide with those of the PUSCH, using the fact that the PUSCH is the PUSCH in which the aperiodic CSI report is transmitted. This can, for example, maintain the reliability of transmission of the aperiodic CSI report.

The information of (3) to (10) may be separately provided for the time and/or frequency resources that collide with those of the PUSCH and for the time and/or frequency resources that cause no collision. For example, the configuration of (6) may differ between the time and/or frequency resources that collide with those of the PUSCH and the time and/or frequency resources that cause no collision. For example, the time and/or frequency resources that collide with those of the PUSCH can make the density of the SRS combs lower than that with the time and/or frequency resources that cause no collision. Consequently, the sounding between the SRS transmission UE and the base station is possible while the transmission rate of the PUSCH is maintained.

The information of (3) to (10) may be provided for each allocation of the PUSCH. For example, in the presence of the frequency and/or time resources for the PUSCHs of a plurality of UEs in the SRS transmission band, allocation of the SRS to each of the PUSCHs can be flexibly configured.

(3) to (10) may be separately provided for the SRS to be transmitted by the SRS transmission UE and for the SRS that is not transmitted by the SRS transmission UE. (3) to (10) may include information indicating that the SRS is to be transmitted and information indicating that the SRS is not transmitted. (3) to (10) may include both pieces of the information. The SRS transmission UE may or need not transmit the SRS using the pieces of the information separately provided. This enables, for example, the base station to instruct whether the SRS can be transmitted. Consequently, the amount of processing in the SRS transmission UE can be reduced.

When the number of the SRS symbols is two or more, the methods for transmitting the SRS and the methods for transmitting the PUSCH that are previously disclosed may be applied. The methods may be combined and/or switched. For example, the SRS transmission UE need not transmit the SRS in the symbol to which the DMRS or the PTRS which is associated with the PUSCH is allocated, and may transmit the SRS in the symbol to which the PUSCH is allocated. This enables, for example, a sounding between the SRS transmission UE and the base station while the demodulating characteristics of the PUSCH in the base station are maintained. With the operations, the SRSs in a plurality of symbols need not be consecutive. For example, the SRS need not be transmitted in the second symbol among four symbols in which the SRS is transmitted. This can, for example, avoid the complexity in designing.

When a collision in the time and/or frequency resources between the SRSs in a plurality of symbols and the PUSCH from the PUSCH transmission UE occurs, the upper limit on the number of symbols in which the SRS is not transmitted may be set. The SRS transmission UE may stop the SRS transmission symbols in the collision resources as many as the number of the upper limit. For example, when the SRS is transmitted in 4 symbols, the upper limit on the number of symbols in which transmission of the SRS is stopped may be 3 in the time and/or frequency resources that collide with those of the PUSCH. The SRS transmission UE may transmit the SRS as long as one symbol in the resources. The SRS transmission UE may transmit the SRS as long as four symbols outside the resources. This enables, for example, a sounding between the SRS transmission UE and the base station in a wide band while the transmission rate of the PUSCH is maintained.

As another example, the upper limit on the number of symbols in which the SRS is to be transmitted may be set in the collision. The SRS transmission UE may transmit the SRS transmission symbols in the collision resources as many as the number of the upper limit. For example, when the SRS is transmitted in 4 symbols, the upper limit on the number of symbols in which transmission of the SRS is stopped may be 1 in the time and/or frequency resources that collide with those of the PUSCH. In the resources, the SRS transmission UE may transmit the SRS as long as 1 symbol, and may stop transmitting the SRS as long as 3 symbols. The SRS transmission UE may transmit the SRS as long as 4 symbols outside the resources. This can, for example, maintain the transmission rate of the PUSCH while a sounding between the SRS transmission UE and the base station in a wide band is possible.

As another example, the number of SRS transmission symbols per se may be limited. For example, when a parameter (DL-DMRS-add-pos) described in Non-Patent Document 13 (TS38.211 v15.0.0) represents 2 or more as the number of additional DMRSs in a slot of the PUSCH transmission UE, the number of configurable SRS symbols may be 1 or 2. The base station may notify the SRS transmission UE of a value of the parameter. The SRS transmission UE may recognize the limit on the number of SRS transmission symbols from the parameter. The SRS transmission UE may notify the base station of information indicating occurrence of irregularities, with a notification of the number of SRS transmission symbols that have violated the limit.

As another example, a limit may be imposed on the parameter representing the number of additional DMRSs in the slot of the PUSCH transmission UE. For example, when the number of SRS symbols in the SRS transmission UE is 4, the parameter value in the PUSCH transmission UE may be 0 or 1. The base station may notify the PUSCH transmission UE of the number of SRS transmission symbols in the SRS transmission UE. The PUSCH transmission UE may recognize the limit on the parameter value from the notification of the number of SRS transmission symbols. The PUSCH transmission UE may notify the base station of the information indicating occurrence of irregularities with a notification of the parameter that has violated the limit.

The operations on transmission of the SRS in a plurality of symbols may be defined in a standard, or determined and notified or broadcast to the UE by the base station. The upper limit on the number of symbols in which the SRS is not transmitted may be determined in a standard, or determined and notified or broadcast to the UE by the base station. This may be applied to the upper limit on the number of symbols in which the SRS is to be transmitted and the number of SRS transmission symbols per se. For example, the base station may reduce the upper limit on the number of symbols in which the SRS is not transmitted, using the fact that a channel state with the UE is inferior. This enables, for example, a prompt sounding when the channel state is inferior, while the transmission rate of the PUSCH in the communication system is maintained.

The notification method and/or information to be notified may be identical to the notification method and the information to be notified on the operation of the SRS transmission UE for transmitting the SRS in the symbols and the frequency band to which the PUSCH is allocated.

Another solution is disclosed. The SRS transmission symbol in the SRS transmission UE may be shifted to another timing. A part or the entire SRS transmission symbol may be shifted. This enables, for example, flexible scheduling in the base station.

The SRS transmission symbol may be shifted in a slot. The symbol of the SRS to be transmitted by the SRS transmission UE in symbols to which the DMRS and/or the PTRS that are reference signals associated with the PUSCH are allocated may be shifted. This enables, for example, a sounding from the SRS transmission UE in a wide band, and improvement in the demodulating characteristics of the PUSCH in the base station. As another example, the symbol of the SRS to be transmitted by the SRS transmission UE may be shifted to a symbol allocated to the SRS to be transmitted by the UE different from the SRS transmission UE. This can, for example, aggregate the number of symbols of the SRSs to be transmitted from the SRS transmission UE and the different UE, and consequently increase the transmission rate of the PUSCH from the PUSCH transmission UE.

The SRS transmission symbol may be shifted only in a band to which the PUSCH is allocated. This can expedite the transmission of the SRS outside the band to which the PUSCH is allocated.

As another example, the entire SRS transmission symbol may be shifted. This, for example, facilitates the control over transmission and reception of the SRS in the communication system.

Figure 19:
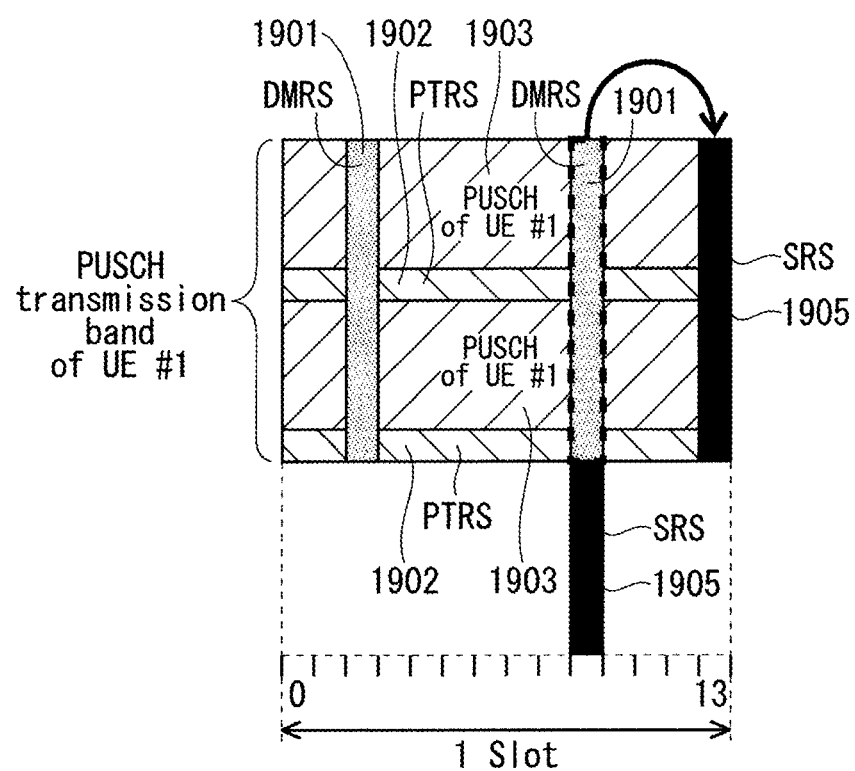
FIG. 19 illustrates an example of shifting an SRS transmission symbol only in a band to which the PUSCH is allocated according to the first modification of the first embodiment.

FIG. 19 illustrates an example of shifting an SRS transmission symbol only in a band to which the PUSCH is allocated. In the example of FIG. 19, the PUSCH and the SRS are identical in subcarrier spacing. In the example of FIG. 19, the PUSCH transmission UE transmits, in the second and ninth symbols, a DMRS 1901 associated with the PUSCH, and transmits, every symbol in two subcarriers, a PTRS 1902 associated with the PUSCH. In the example of FIG. 19, the SRS transmission UE is configured to transmit the SRS in the ninth symbol.

In FIG. 19, the SRS transmission UE does not transmit the SRS in the 9-th symbol in the frequency band occupied by the PUSCHs 1903 and the PTRSs 1902 of the PUSCH transmission UE, and shifts transmission of an SRS 1905 in the 9-th symbol to the 13-th symbol to transmit the SRS 1905. The SRS transmission UE transmits the SRS 1905 in the 9-th symbol outside the frequency band.

Figure 20:
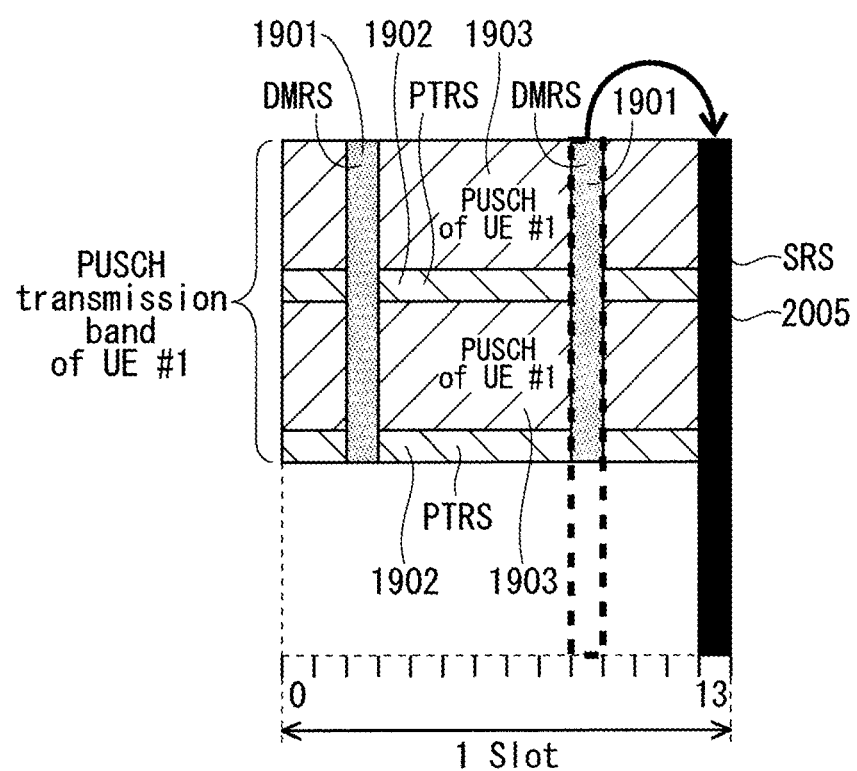
FIG. 20 illustrates an example of shifting the entire SRS transmission symbol according to the first modification of the first embodiment.

FIG. 20 illustrates an example of shifting the entire SRS transmission symbol. The configuration of each UE in FIG. 20 is identical to that in FIG. 19. In FIG. 20, the same figure numbers are applied to the signals common to those in FIG. 19, and the common description thereof is omitted.

In FIG. 20, the SRS transmission UE shifts transmission of the SRS in the 9-th symbol to the 13-th symbol to transmit an SRS 2005. The SRS outside the frequency band occupied by the PUSCHs 1903 and the PTRSs 1902 of the PUSCH transmission UE is also shifted.

As another example, the SRS transmission symbol may be shifted to a different slot. The different slot may or need not be adjacent to a slot from which the SRS transmission symbol is shifted. For example, the symbol of the SRS to be transmitted by the SRS transmission UE may be shifted to a slot to which the SRS to be transmitted by the UE different from the SRS transmission UE is allocated. This can, for example, aggregate the number of symbols of the SRSs to be transmitted from the SRS transmission UE and the different UE, and consequently increase the transmission rate of the PUSCH from the PUSCH transmission UE.

The SRS transmission symbol may be shifted to a different slot only in the band to which the PUSCH is allocated. This can expedite the transmission of the SRS outside the band to which the PUSCH is allocated.

As another example, the entire SRS transmission symbol may be shifted. This, for example, facilitates the control over transmission and reception of the SRS in the communication system.

Figure 21:
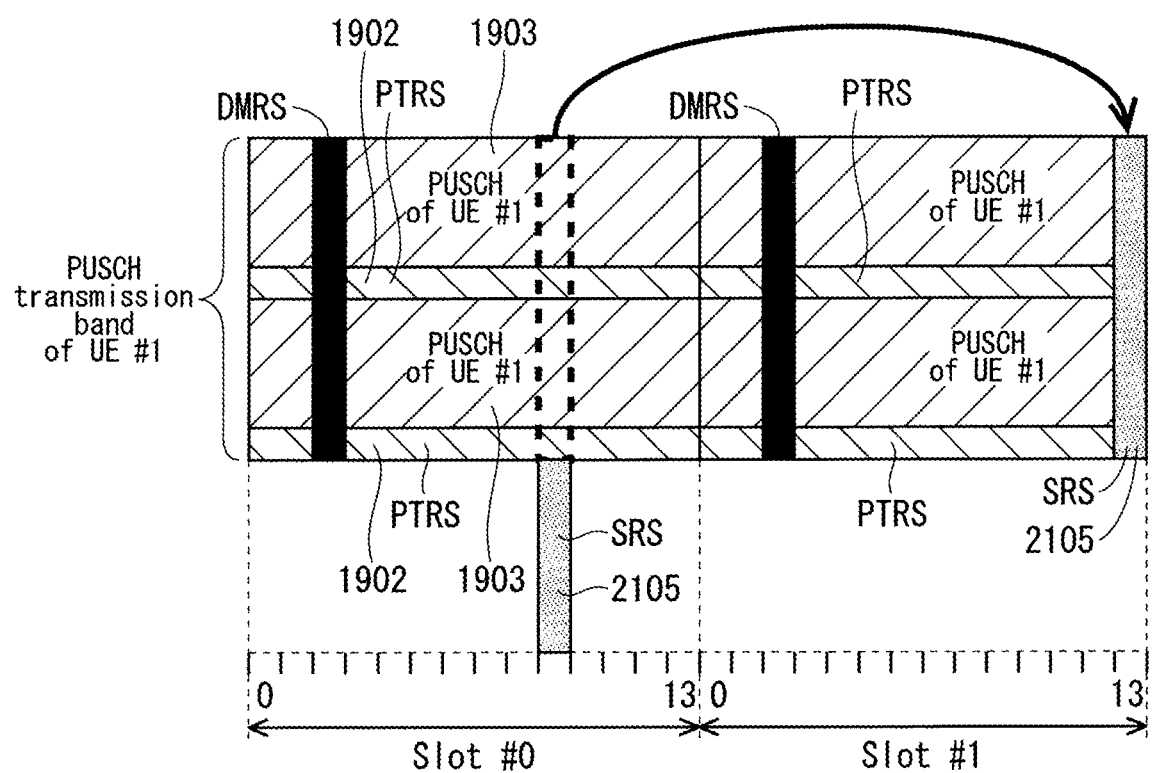
FIG. 21 illustrates an example of shifting the SRS transmission symbol to a different slot only in the band to which the PUSCH is allocated according to the first modification of the first embodiment.

FIG. 21 illustrates an example of shifting an SRS transmission symbol to a different slot only in the band to which the PUSCH is allocated. In the example of FIG. 21, the SRS transmission UE is configured to transmit the SRS in the 9-th symbol in a slot number 0. The configuration of the PUSCH transmission UE in FIG. 21 is identical to that in FIG. 19. In FIG. 21, the same figure numbers are applied to the signals common to those in FIG. 19, and the common description thereof is omitted.

In FIG. 21, the SRS transmission UE does not transmit the SRS in the 9-th symbol in the slot number 0, in the frequency band occupied by the PUSCHs 1903 and the PTRSs 1902 of the PUSCH transmission UE, and shifts transmission of an SRS in the 9-th symbol in the slot number 0 to the 13-th symbol in a slot number 1 to transmit the SRS 2105. The SRS transmission UE transmits the SRS 2105 in the 9-th symbol in the slot number 0 outside the frequency band.

Figure 22:
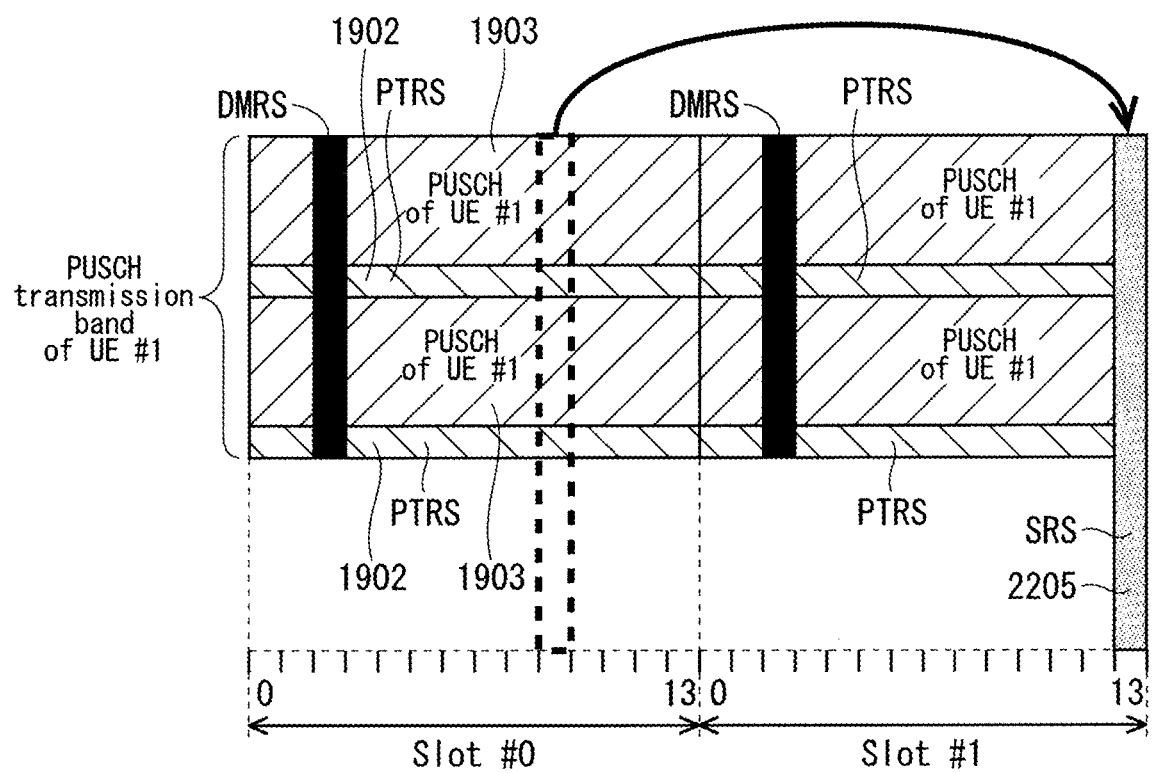
FIG. 22 illustrates an example of shifting the entire SRS transmission symbol to a different slot according to the first modification of the first embodiment.

FIG. 22 illustrates an example of shifting the entire SRS transmission symbol to a different slot. The configuration of each UE in FIG. 22 is identical to that in FIG. 21. In FIG. 22, the same figure numbers are applied to the signals common to those in FIG. 21, and the common description thereof is omitted.

In FIG. 22, the SRS transmission UE shifts transmission of an SRS in the 9-th symbol in the slot number 0 to the 13-th symbol in the slot number 1 to transmit the SRS 2205. The SRS outside the frequency band occupied by the PUSCHs 1903 and the PTRSs 1902 of the PUSCH transmission UE is also shifted to the slot number 1 in the similar manner.

The shifting of the SRS transmission symbol may be defined in a standard, or determined and notified or broadcast to the UE by the base station. The notification method may be identical to the notification method on the operation of the SRS transmission UE for transmitting the SRS in the symbols and the frequency band to which the PUSCH is allocated.

The information in (1) to (11) disclosed as the pieces of information to be notified on the operation of the SRS transmission UE for transmitting the SRS in the symbols and the frequency band to which the PUSCH is allocated may be used as information on the shifting of the SRS transmission symbol which is notified from the base station to the UE.

The information on the shifting of the SRS transmission symbols which is notified from the base station to the UE, for example, the information (3) to (10) disclosed as the pieces of information to be notified on the operations of the SRS transmission UE for transmitting the SRS may include information on the SRS to be shifted and information on the shifted SRS.

The information on the shifting of the SRS transmission symbol which is notified from the base station to the UE may include information on whether to shift the SRS transmission symbol. This enables, for example, the SRS transmission UE to easily understand whether to shift the SRS transmission symbol and consequently expedite a process on the SRS transmission symbol.

The SRS transmission symbol may be shifted for the aperiodic SRS, the semi-persistent SRS, or the periodic SRS. The SRS transmission symbol may be shifted when the PUSCH transmission UE is identical to or different from the SRS transmission UE. The aforementioned combinations may be applied. For example, when the PUSCH transmission UE is different from the SRS transmission UE, a symbol of an aperiodic SRS may be shifted. This can, for example, flexibly place the SRS in the communication system.

The method disclosed in the first embodiment and the method disclosed in the first modification may be separately used. This enables, for example, flexible scheduling in the communication system.

As an example of the separate use, in symbols to which the DMRS and/or the PTRS associated with the PUSCH and transmitted from the PUSCH transmission UE are allocated, the DMRS and/or the PTRS may be transmitted, or the SRS may be transmitted from the SRS transmission UE. For example, when a collision in frequency and time resources occurs between the aperiodic SRS to be transmitted by the SRS transmission UE and the DMRS or the PTRS which is associated with the PUSCH and transmitted by the PUSCH transmission UE, the DMRS or the PTRS need not be transmitted but the aperiodic SRS may be transmitted. As another example, the PUSCH may be placed only before an SRS symbol or a group of SRS symbols when the DMRS and/or the PTRS which are associated with the PUSCH and allocated to the PUSCH transmission UE cannot be allocated in symbols after the aperiodic SRS to be transmitted by the SRS transmission UE. As another example, when a collision in frequency and time resources occurs between the semi-persistent SRS to be transmitted by the SRS transmission UE and the DMRS or the PTRS which is associated with the PUSCH and transmitted by the PUSCH transmission UE, a transmission symbol of the semi-persistent SRS from the SRS transmission UE may be shifted. The operations may be determined with the use case of the SRS.

The separate use may be defined in a standard or determined by the base station. The base station may broadcast information on the separate use, or notify the information dedicatedly to each UE. The base station may give the notification semi-statically via the RRC signaling, dynamically via the MAC signaling, or dynamically using the DCI.

As another example, which method the base station and the UE use may be separately determined. Information for the determination may be defined in a standard or determined by the base station. The base station may broadcast information on the separate use, or notify the information dedicatedly to each UE. The base station may give the notification semi-statically via the RRC signaling, dynamically via the MAC signaling, or dynamically using the DCI.

The transmission rate of the PUSCH can be maintained according to the first modification, even when a collision in time and/or frequency resources occurs between the SRS to be transmitted by the SRS transmission UE and the PUSCH to be transmitted by the PUSCH transmission UE. Furthermore, flexible scheduling in the base station is possible, and the interference between the SRS and the PUSCH can be avoided.

The second modification of the first embodiment

A duration from reception of the PDCCH including the uplink grant to transmission of the PUSCH when a UE transmits the PUSCH may differ from a duration from reception of the PDCCH including an instruction for transmitting the SRS to transmission of the SRS when a UE transmits the SRS. This may cause a collision in time and frequency resources in transmission of the PUSCH and the SRS from the UEs, with the PDCCH including the uplink grant and the PDCCH including the instruction for transmitting the SRS which are transmitted from the base station in different slots. This collision occurs when the PUSCH transmission UE is both identical to and different from the SRS transmission UE.

The scheduling using the PDCCH that has been transmitted later may be prioritized over the instruction for transmitting the SRS using the PDCCH that has been transmitted earlier. The PUSCH transmission UE may be identical to or different from the SRS transmission UE.

Figure 23:
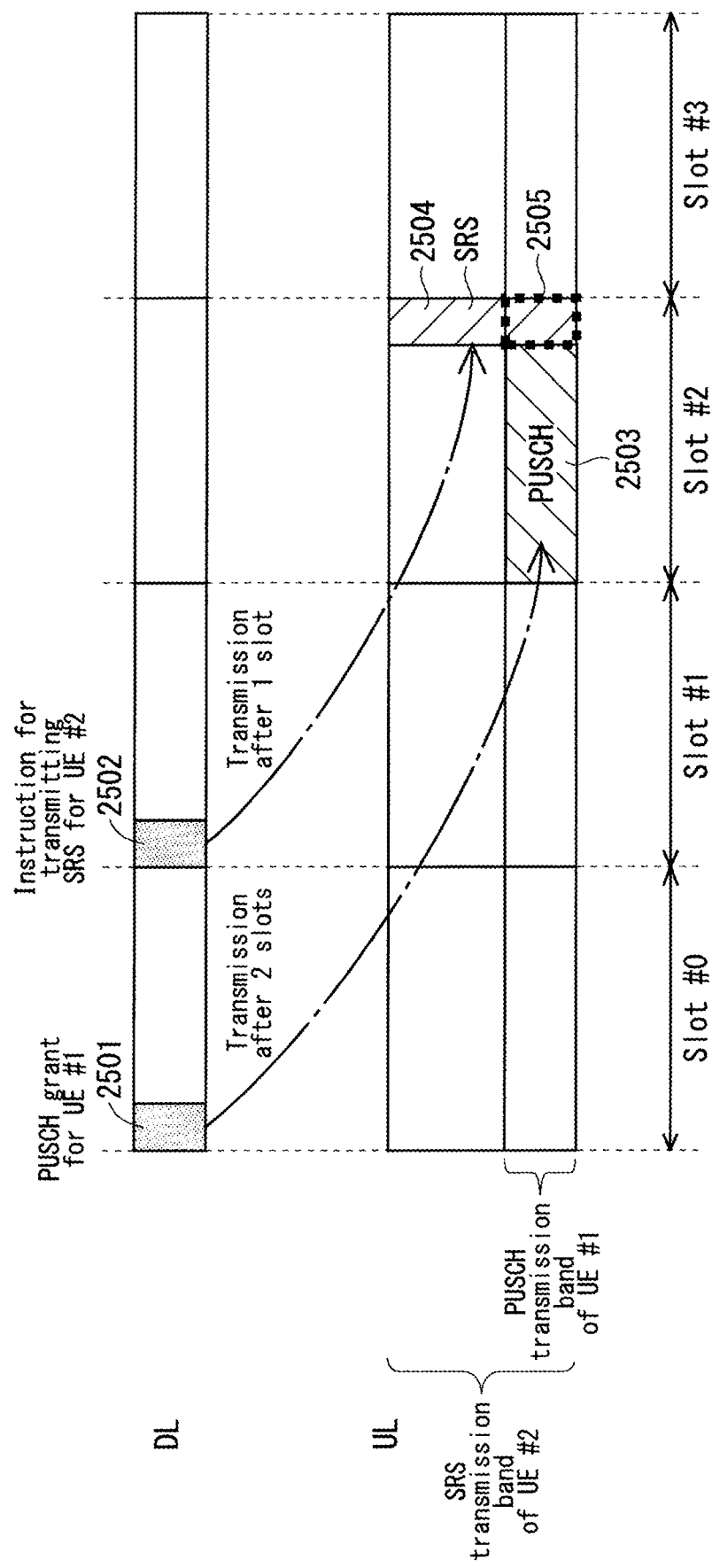
FIG. 23 illustrates operations when transmission of the PUSCH and transmission of the SRS from the UEs are allocated to the same slot according to the second modification of the first embodiment.

FIG. 23 illustrates operations when transmission of the PUSCH and transmission of the SRS from the UEs are allocated to the same slot. In an example of FIG. 23, the PUSCH transmission UE is different from the SRS transmission UE. In FIG. 23, the PUSCH transmission UE is referred to as the UE #1, and the SRS transmission UE is referred to as the UE #2.

In the slot #0 of FIG. 23, the base station transmits, to the UE #1, a PDCCH 2501 including an uplink grant indicating that a PUSCH 2503 is transmitted in a slot #2. The PDCCH 2501 includes information indicating that transmission of the PUSCH 2503 is allocated after 2 slots. In a slot #1 of FIG. 23, the base station transmits, to the UE #2, a PDCCH 2502 including an instruction for transmitting an SRS 2504 in the slot #2. The PDCCH 2502 includes information indicating that transmission of the SRS is allocated after 1 slot.

In the slot #2 of FIG. 23, the UE #1 transmits the PUSCH 2503, and the UE #2 transmits the SRS 2504. In time and frequency resources 2505 enclosed by a black dotted line in the slot #2,transmission of the PUSCH by the UE #1 collides with transmission of the SRS by the UE #2.The transmission of the SRS 2504 by the UE #2 that is included in the PDCCH that has been transmitted later is prioritized. The UE #1 stops transmitting the PUSCH 2503 in the time and frequency resources 2505.

The example of FIG. 23 illustrates a case where the PDCCH including the uplink grant of the PUSCH is transmitted from the base station earlier than the PDCCH including the instruction for transmitting the SRS. In addition to this, the aforementioned method may be applied to a case where the PDCCH including the instruction for transmitting the SRS is transmitted earlier than the PDCCH including the uplink grant of the PUSCH. In other words, the UE #1 may transmit the PUSCH in the time and frequency resources 2505 in the slot #2, when the base station transmits, in the slot #0, the PDCCH including an instruction that the UE #2 transmits the SRS after 2 slots and then transmits, in the slot #1, the PDCCH including the uplink grant indicating that the UE #1 transmits the PUSCH after 1 slot. The UE #2 may stop transmitting the SRS in the time and frequency resources 2505.

Although FIG. 23 illustrates an example where the PUSCH transmission UE is different from the SRS transmission UE, they may be identical to each other.

The following problem occurs. Specifically, when the PUSCH and the SRS are transmitted from the different UEs, the PUSCH transmission UE that has received the PDCCH earlier cannot grasp that the PDCCH has been transmitted later to the other SRS transmission UE. Consequently, the PUSCH transmission UE cannot stop transmitting the PUSCH of its own UE in the time and/or frequency resources where the PUSCH collides with the SRS, and interferes with the SRS to be transmitted by the SRS transmission UE. Consequently, a sounding from the SRS transmission UE cannot be appropriately performed.

The second modification discloses a method for solving the problem.

The base station notifies the PUSCH transmission UE of information indicating that the instruction for transmitting the SRS has been transmitted to the SRS transmission UE.

The base station may give the notification using the PDCCH to be transmitted dedicatedly to the PUSCH transmission UE or using the PDCCH of the group common signaling. This can, for example, reduce the amount of signaling when the number of the PUSCH transmission UEs is two or more. As another example, a non-slot PDCCH (i.e., the PDCCH to be transmitted during a slot) may be used. This enables, for example, the base station to promptly notify the PUSCH transmission UE of the information. As another example, the DCI for a preemption indication (PI) may be used. This enables, for example, the UE to perform a process of receiving the information with less amount of processing.

The PUSCH transmission UE may receive information indicating that the instruction for transmitting the SRS has been transmitted to the SRS transmission UE. The PUSCH transmission UE may receive the information, for example, every slot or with the timing after the PUSCH transmission UE receives the PDCCH including the uplink grant of the PUSCH and then transmits the PUSCH. Receiving the information every slot may include receiving the non-slot PDCCH included in the slot. The same may apply to the timing after the PUSCH transmission UE receives the PDCCH including the uplink grant of the PUSCH and then transmits the PUSCH. For example, receiving, with the timing, the information indicating that the instruction for transmitting the SRS has been transmitted to the SRS transmission UE can reduce an unnecessary receiving operation in the PUSCH transmission UE and consequently reduce the power consumption.

The following (1) to (5) are disclosed as pieces of the information included in the notification to be transmitted from the base station to the PUSCH transmission UE.

(1) Information indicating that the SRS of another UE is transmitted in a slot in which transmission of the PUSCH has been granted (2) Information on whether to transmit the PUSCH and/or a method for transmitting the PUSCH (3) Information on the frequency and/or time resources which overlap between the PUSCH and the SRS (4) The pieces of information (1) to (12) disclosed in the first embodiment as the information on the candidates for the SRS transmission resources to be dynamically notified from the base station to the PUSCH transmission UE (5) Combinations of (1) to (4) above (1) may be information indicating that the SRS of another UE is transmitted in the time and/or frequency resources in which transmission of the PUSCH has been granted. This can, for example, prevent unnecessary stop of transmitting the PUSCH when the PUSCH and the SRS are allocated to the same slot and to different time and/or frequency resources. Consequently, efficient operations in the communication system are possible.

(2) may be, for example, an identifier indicating whether to transmit the PUSCH. The method for transmitting the PUSCH in (2) may be, for example, information indicating that the power of the PUSCH is reduced and the PUSCH is transmitted, information indicating that the PUSCH is transmitted only in the time and/or frequency resources different from those for the SRS, information indicating that the PUSCH is not transmitted, or information indicating that the PUSCH is transmitted as it is. Examples of the information on reduction in the power of the PUSCH may include an amount of reduced power. This enables, for example, flexible scheduling in the communication system.

(3) may be, for example, information on the time resources and/or the frequency resources which overlap, or information on the overlapping symbol number. With (3), for example, the PUSCH transmission UE can obtain information on the time and/or frequency resources in which transmission of the PUSCH should be avoided. Consequently, the interference between the PUSCH and the SRS can be reduced.

The PUSCH transmission UE need not transmit the PUSCH in the time and/or frequency resources which overlap those for the SRS. The UE may transmit the PUSCH in the time and/or frequency resources which do not overlap those for the SRS. This can, for example, maintain the transmission rate of the PUSCH while the interference between the PUSCH and the SRS can be avoided.

As another example, the PUSCH transmission UE need not transmit the PUSCH in a symbol that overlaps that for the SRS. The UE may transmit the PUSCH in a symbol that does not overlap that for the SRS. This can, for example, avoid the complexity in avoiding the interference between the PUSCH and the SRS.

As another example, the PUSCH transmission UE need not transmit the PUSCH in the entire time and/or frequency resources which have been notified in the uplink grant. This can, for example, further avoid the complexity in avoiding the interference between the PUSCH and the SRS.

Another solution is disclosed. The scheduling using the PDCCH that has been transmitted earlier may be prioritized in the communication system. The PUSCH transmission UE may be different from the SRS transmission UE. This can, for example, facilitate the scheduling in the base station.

The SRS transmission UE need not transmit the SRS. The base station need not transmit, to the SRS transmission UE, the PDCCH for instructing transmission of the SRS. As another example, the SRS transmission UE need not transmit the SRS in the time and/or frequency resources which overlap those for the PUSCH. The base station may notify the SRS transmission UE of an instruction indicating no transmission of the SRS in the resources. The notification may be, for example, included in the PDCCH including the instruction for transmitting the SRS, or given at a different timing. As another example, the SRS transmission UE may reduce the transmission power of the SRS and transmit the SRS.

The following (1) to (5) are disclosed as pieces of the information included in the notification to be transmitted from the base station to the SRS transmission UE.

(1) Information indicating that the PUSCH of another UE is transmitted in a slot in which the SRS is transmitted (2) Information on whether to transmit the SRS and/or a method for transmitting the SRS (3) Information on the frequency and/or time resources which overlap between the PUSCH and the SRS (4) The pieces of information (1) to (11) disclosed in the first modification of the first embodiment as the information to be notified from the base station to the SRS transmission UE (5) Combinations of (1) to (4) above (1) may be information indicating that the PUSCH of another UE is transmitted in the time and/or frequency resources in which transmission of the SRS has been instructed. This can, for example, prevent unnecessary stop of transmitting the SRS when the PUSCH and the SRS are allocated to the same slot and to different time and/or frequency resources. Consequently, efficient operations in the communication system are possible.

(2) may be, for example, an identifier indicating whether to transmit the SRS. The method for transmitting the SRS in (2) may be, for example, information indicating that the power of the SRS is reduced and the SRS is transmitted, information indicating that the SRS is transmitted only in the time and/or frequency resources different from those for the PUSCH, information indicating that the SRS is not transmitted, or information indicating that the SRS is transmitted as it is. Examples of the information on reduction in the power of the SRS may include an amount of reduced power. This enables, for example, a flexible sounding in the communication system.

(3) may be, for example, information on the time resources and/or the frequency resources which overlap, or information on the overlapping symbol number. With (3), for example, the SRS transmission UE can obtain information on the time and/or frequency resources in which transmission of the SRS should be avoided. Consequently, the interference between the PUSCH and the SRS can be reduced.

Another solution is disclosed. In the second modification, an operation of prioritizing the PDCCH to be transmitted later and an operation of prioritizing the PDCCH to be transmitted earlier may be combined.

For example, the base station may determine which PDCCH is prioritized. The base station may notify the UE of information indicating which PDCCH is prioritized. The UE may or need not transmit the PUSCH and/or the SRS, using the information. The base station may give the notification, for example, via the RRC signaling, the MAC signaling, or the L1/L2 signaling.

As another example, which PDCCH is prioritized may be determined in a standard. For example, the base station need not notify the UE of information indicating which PDCCH is prioritized. Consequently, the amount of signaling from the base station to the UE can be reduced.

A use case of the SRS or the type of the SRS (e.g., the periodic SRS, the semi-persistent SRS, or the aperiodic SRS) may be used as information for determining which PDCCH is prioritized.

One of or both of the use case of the SRS and the type of the SRS (e.g., the periodic SRS, the semi-persistent SRS, or the aperiodic SRS) may be used as the information for determining which PDCCH is prioritized.

Another example of the information may be information on the PUSCH. For example, information on a service (e.g., eMBB, URLLC, mMTC) of the user data to be transmitted with the PUSCH, or information on a priority of the user data, for example, a priority defined by a QoS Class Identifier (QCI) may be used. This enables, for example, flexible scheduling according to a priority of the user data.

The method for assigning a priority to the PDCCH which is disclosed in this second modification may be applied to the case where the PUSCH transmission UE is identical to the SRS transmission UE. The information to be notified from the base station to the UE may be the combined pieces of information disclosed in the second modification.

For example, when the PUSCH transmission UE is identical to the SRS transmission UE, the SRS resources collide with the PUSCH resources in the same slot. Here, the priorities defined in a standard may be applied. Several examples of the priorities are conceivable. For example, when the UE receives a plurality of PDCCHs for transmitting the SRS and the PUSCH at different timings, the PUSCH resources or the SRS resources which have been configured with the PDCCH last transmitted may be prioritized. The priorities may be determined according to the type of the SRS. For example, when the aperiodic SRS collides with the PUSCH resources, the aperiodic SRS may be prioritized. When the base station desires to obtain the channel information immediately, the base station requests the UE to transmit the aperiodic SRS. Prioritizing transmission of the aperiodic SRS over that of the PUSCH enables the base station to obtain the channel information within a desired duration. Furthermore, when the SRS resources partially overlap the PUSCH resources, the priorities may be applied only to the overlapping portion. In other words, a part of the SRS or the PUSCH is transmitted. As another example, assignment of a higher priority to the DMRS included in the PUSCH than to the SRS may be configured in a standard, irrespective of the type of the SRS.

For example, when the PUSCH transmission UE is identical to the SRS transmission UE and the SRS resources partially overlap the PUSCH resources, there is no limit in the position relationship between the SRS and the PUSCH. The SRS may be transmitted before or after the PUSCH. The forward or backward relationship of the SRS may be determined by the details of the PUSCH. When it takes some time to process transmission of the PUSCH, the SRS may be transmitted earlier. Conversely, when data included in the PUSCH needs to be transmitted immediately, the PUSCH may be transmitted in the beginning of a slot and transmission of the SRS may be delayed.

The method disclosed in the second modification may be applied when the PUSCH differs in numerology from the SRS. Consequently, for example, when the subcarrier spacing of the SRS is larger, the latency from reception of the PDCCH including the instruction for transmitting the SRS to transmission of the SRS can be shortened.

When the PI is used, the base station transmits the PI to the PUSCH transmission UE or the SRS transmission UE. A section designated for the UE that has received the PI is prioritized for transmission of the SRS or the PUSCH by the other UE. The designated section is defined by the time or frequency resources. Specifically, while the UE that has received the PI is in the designated section, the UE is powered down to prevent interference with a transmission signal of the other UE. The designated section may be defined per symbol in a standard or dynamically through the PI. Assuming that X is an integer, the last X symbol(s) in a slot may be defined as the section in a standard. Furthermore, when the slot type of the SRS transmission UE or the PUSCH transmission UE is mini-slot, the UE that has received the PI may reduce the transmission power of all the symbols in a mini-slot with a collision. The transmission power may be set to zero as an example of reducing the transmission power. The mini-slot in which the collision has been avoided is normally transmitted.

Whether transmission of the SRS or transmission of the PUSCH is prioritized may be determined in a standard. For example, the priorities may be determined based on the type of the SRS or the type of the RS included in the PUSCH. For example, transmission of the aperiodic SRS may always be prioritized over that of the PUSCH. In other words, when the aperiodic SRS collides with the PUSCH, the aperiodic SRS is always prioritized, and the base station transmits the PI to the PUSCH transmission UE. As another example, assignment of a higher priority to the DMRS included in the PUSCH than to the SRS may be configured in a standard, irrespective of the type of the SRS. Here, the PI may be transmitted to the SRS transmission UE, and the transmission power in a section with a collision with the DMRS or in a mini-slot in which the SRS is transmitted may be reduced. The transmission in the mini-slot in which the collision has been avoided may be normally performed. The resources need not be retransmitted as the transmission power is reduced.

The UE that has received the PI may reduce the transmission power from a slot or a mini-slot in which the PI has been received, to a slot or a mini-slot after Y slot(s) or Y mini-slot(s), where Y is an integer. Although the transmission power is adjusted after counting the slots or mini-slots in the aforementioned example, the adjustment may be performed after counting symbols. For example, assuming that a symbol after Y symbols with respect to a symbol including the PI is the first symbol and Z is an integer, transmission power of Z symbol(s) may be reduced.

The PI may be placed in a symbol and a frequency domain which are designated, in a standard, in a slot or a mini-slot. Since the PI is placed in the designated time and frequency positions, the UE that has received the PI can read the PI immediately.

The second modification discloses an example where the base station transmits the PDCCH including the uplink grant to the PUSCH transmission UE and then the PDCCH including the instruction for transmitting the SRS to the SRS transmission UE. The method disclosed in the second modification may also be applied to a case where the PDCCH including the instruction for transmitting the SRS is transmitted earlier than the PDCCH including the uplink grant of the PUSCH. The method disclosed in the second modification may be applied by replacing the SRS with the PUSCH and vice versa.

The second modification can reduce the interference between the PUSCH and the SRS. Furthermore, when the PUSCH and the SRS differ in subcarrier spacing, the PUSCH or the SRS can be transmitted with a low latency.

The third modification of the first embodiment

The PUCCH to be transmitted from the PUCCH transmission UE and the SRS to be transmitted from the SRS transmission UE have the same problems as those in the first embodiment to the second modification of the first embodiment. Specifically, when a collision in the time and/or frequency resources to be allocated to the PUCCH and the SRS occurs, the PUCCH and the SRS interfere with each other, and the base station cannot normally receive the PUCCH and the SRS.

The third modification discloses a solution to the problem.

A channel or a signal for avoiding the collision is provided. The base station determines whether a collision between the SRS and the PUCCH occurs. The base station may make the determination every slot, or need not make the determination in a slot without any scheduling.

The base station transmits, to UEs, a channel or a signal for avoiding a collision (may be hereinafter referred to as a collision avoidance instruction). The UEs may be UEs from which transmission of the PUCCH or the SRS is desirably avoided. The UEs may be the SRS transmission UEs, the PUSCH transmission UEs, or both of them.

Each of the UEs stops transmitting the PUSCH or the SRS using the collision avoidance instruction. The PUCCH may be a long PUCCH, that is, a PUCCH as long as four symbols or more, or a short PUCCH, that is, a PUCCH as long as two symbols or less. The UE may stop transmitting the PUSCH or the SRS partly or entirely in a target slot. Partly stopping the transmission may mean, for example, stopping the transmission in a symbol with a collision between the PUSCH and the SRS or stopping the transmission in the time and/or frequency resources with which the collision occurs. This enables, for example, efficient use of the time and/or frequency resources in the communication system.

The collision avoidance instruction may be, for example, included in the PDCCH to be transmitted dedicatedly to each UE as the DCI, or transmitted with the PDCCH of the group common signaling. As another example, the collision avoidance instruction may be transmitted with a preemption indication. As another example, the collision avoidance instruction may be transmitted via the RRC signaling or the MAC signaling.

Figure 24:
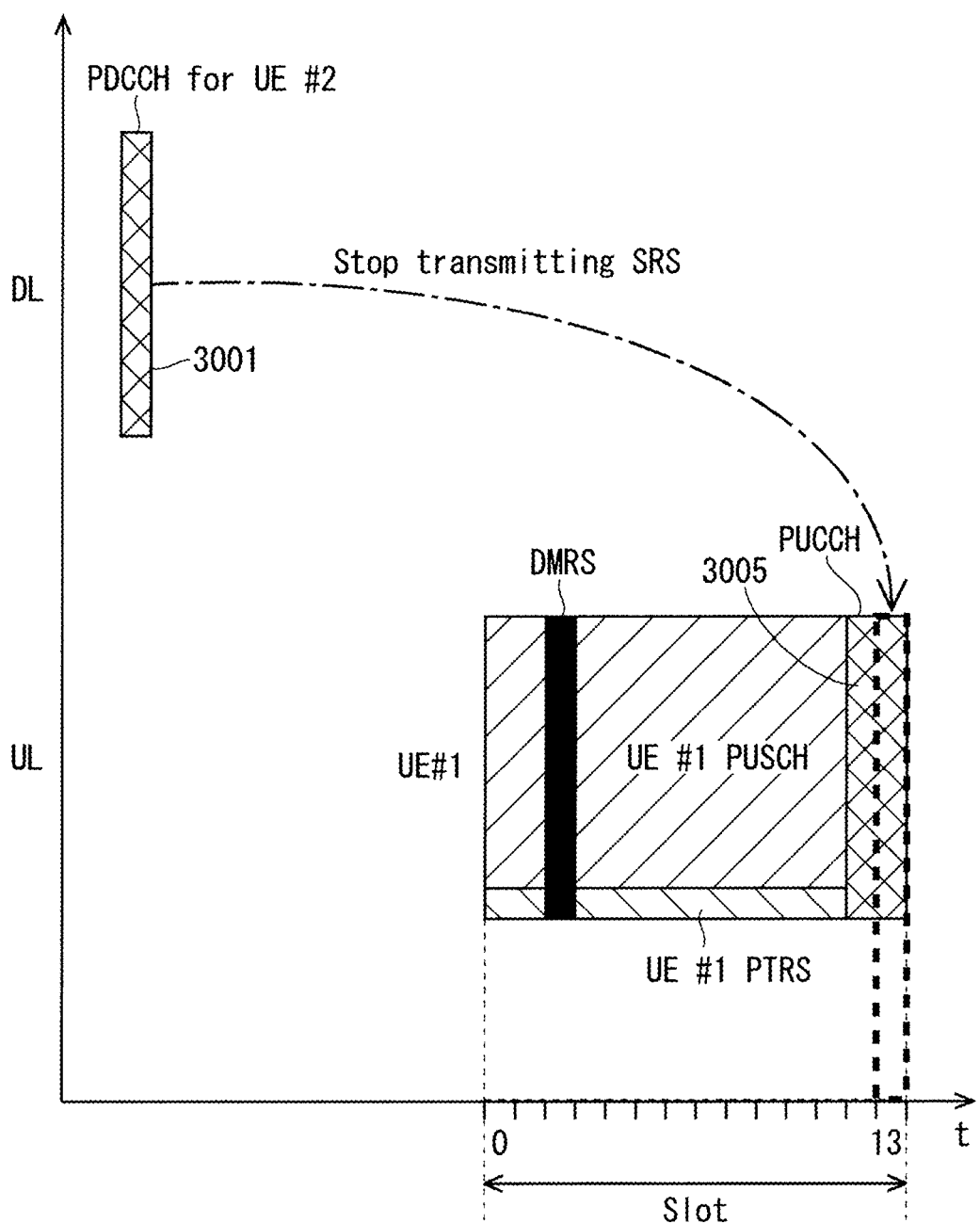
FIG. 24 illustrates an operation of avoiding a collision between the SRS and the PUCCH in response to a notification of a collision avoidance instruction from the base station according to the third modification of the first embodiment.

FIG. 24 illustrates an operation of avoiding a collision between the SRS and the PUCCH in response to a notification of a collision avoidance instruction from the base station. The example of FIG. 24 illustrates that the base station notifies the SRS transmission UE of the collision avoidance instruction and the SRS transmission UE does not transmit the SRS in a slot in FIG. 24. In FIG. 24, the PUCCH and the SRS are identical in subcarrier spacing. In the example of FIG. 24, the PUCCH transmission UE transmits a PUCCH 3005 in the 12-th and 13-th symbols. In the example of FIG. 24, the SRS transmission UE is configured to transmit the SRS in time and frequency resources in the 13-th symbol.

In FIG. 24, the base station notifies the SRS transmission UE of a collision avoidance instruction 3001. In response to the collision avoidance instruction 3001, the SRS transmission UE does not transmit the SRS in the 13-th symbol. Consequently, the PUCCH 3005 is not interfered by the SRS.

Figure 25:
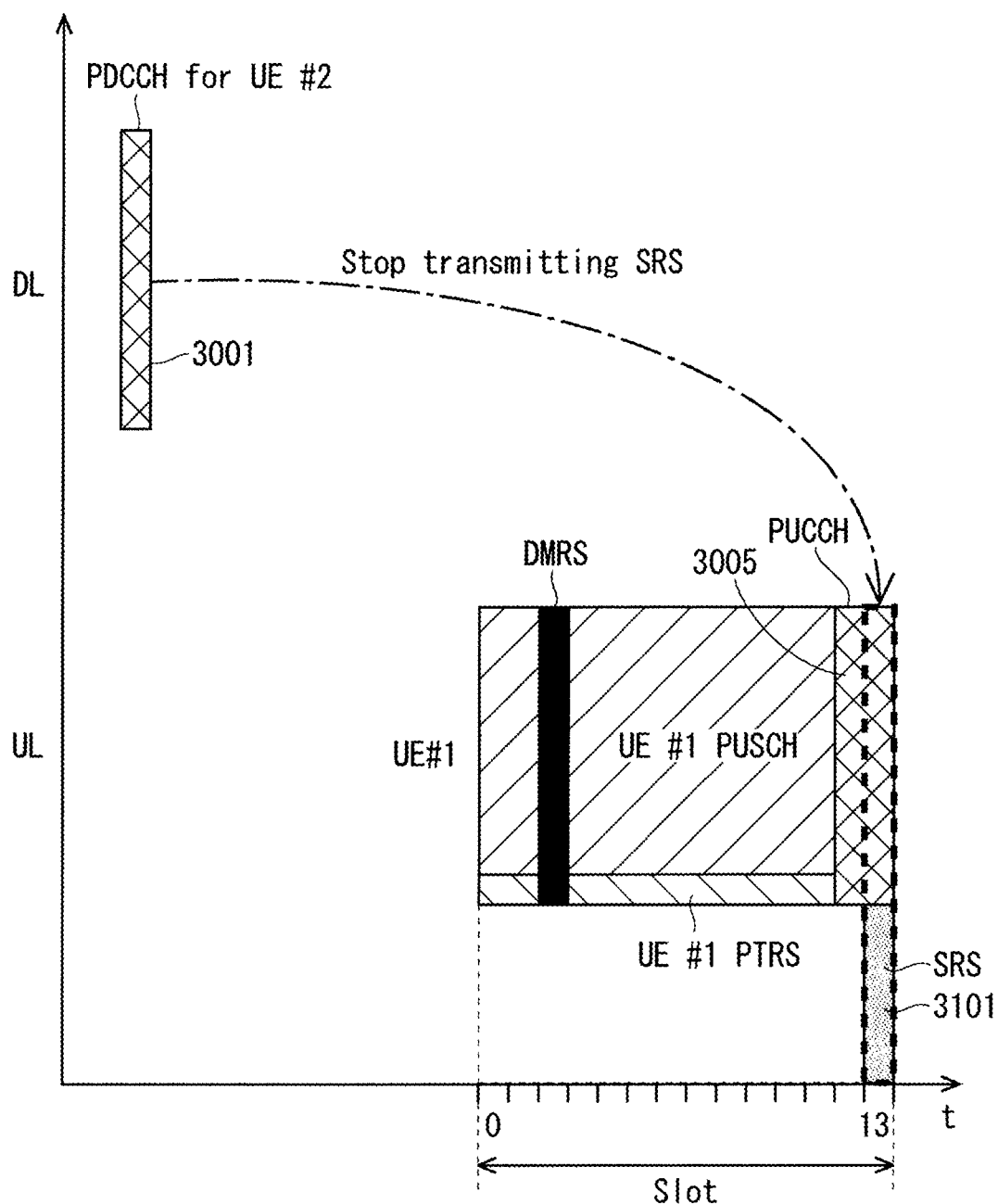
FIG. 25 illustrates an operation of avoiding a collision between the SRS and the PUCCH in response to a notification of the collision avoidance instruction from the base station according to the third modification of the first embodiment.

FIG. 25 illustrates an operation of avoiding a collision between the SRS and the PUCCH in response to a notification of a collision avoidance instruction from the base station. The example of FIG. 25 illustrates that the base station notifies the SRS transmission UE of the collision avoidance instruction and the SRS transmission UE does not transmit the SRS in the time and frequency resources that collide with those of the PUCCH in a slot in FIG. 25. The configuration of each UE in FIG. 25 is identical to that in FIG. 24. In FIG. 25, the same figure numbers are applied to the signals common to those in FIG. 24, and the common description thereof is omitted.

In FIG. 25, the SRS transmission UE transmits an SRS 3101, in response to the collision avoidance instruction 3001 transmitted from the base station. The SRS transmission UE does not transmit the SRS in the time and frequency resources that collide with those of the PUCCH. Consequently, the PUCCH 3005 is not interfered by the SRS. Moreover, a sounding between the base station and the SRS transmission UE is possible.

Figure 26:
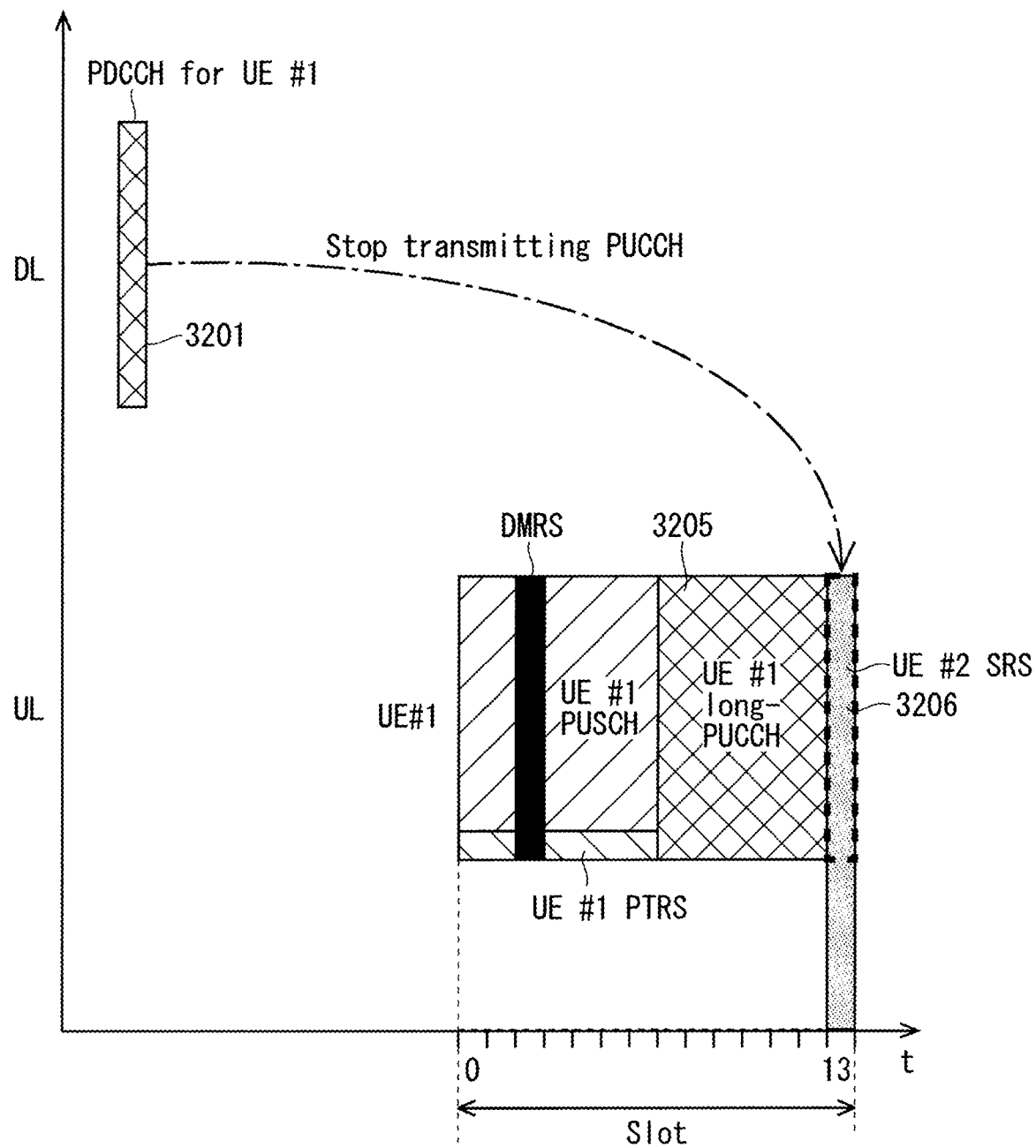
FIG. 26 illustrates another example operation of avoiding a collision between the SRS and the PUCCH in response to a notification of the collision avoidance instruction from the base station according to the third modification of the first embodiment.

FIG. 26 illustrates another example operation of avoiding a collision between the SRS and the PUCCH in response to a notification of a collision avoidance instruction from the base station. The example of FIG. 26 illustrates that the base station notifies the PUCCH transmission UE of the collision avoidance instruction and the PUCCH transmission UE does not transmit a long PUCCH in the 13-th symbol. In FIG. 26, the PUSCH and the SRS are identical in subcarrier spacing. In the example of FIG. 26, the PUCCH transmission UE is configured to transmit the long PUCCH in the 7-th to 13-th symbols. In the example of FIG. 26, the SRS transmission UE is configured to transmit an SRS in the 13-th symbol.

In FIG. 26, the base station notifies the PUCCH transmission UE of a collision avoidance instruction 3201. In response to the collision avoidance instruction 3201, the PUCCH transmission UE transmits a long PUCCH 3205 in the 7-th to 12-th symbols, and does not transmit the PUCCH in the 13-th symbol. The SRS transmission UE transmits an SRS 3206 in the 13-th symbol. Thus, there is no mutual interference between the long PUCCH 3205 and the SRS 3206.

The transmission priorities may be assigned in the collision avoidance according to the third modification. The priorities may be statically determined, for example, in a standard, or determined by the base station. The priorities may be determined using the qualities required for the PUCCH and the SRS, or according to the types of operations of the PUCCH and the SRS. The required qualities may be, for example, information on the QoS. Examples of the types of operations of the PUCCH and the SRS may include types of a periodic PUCCH, a semi-persistent PUCCH, and an aperiodic PUCCH, and types of a periodic SRS, a semi-persistent SRS, and an aperiodic SRS. Using the aforementioned examples, the aperiodic PUCCH may be prioritized over the periodic SRS or the semi-persistent SRS, or the aperiodic SRS may be prioritized over the periodic PUCCH or the semi-persistent PUCCH. As another example, the periodic PUCCH or the semi-persistent PUCCH may be prioritized over the periodic SRS or the semi-persistent SRS and vice versa. As another example, the aperiodic PUCCH may be prioritized over the aperiodic SRS and vice versa.

As another example of determining the priorities, the configuration timing from the base station may be used. The operation of determining the priorities using the configuration timing from the base station may be applied to, for example, the aperiodic PUCCH and/or the aperiodic SRS whose transmission is instructed by the PDCCH from the base station. For example, the PDCCH whose transmission is instructed by the PDCCH later transmitted from the base station may be prioritized over the SRS whose transmission is instructed by the PDCCH transmitted from the base station earlier. The PUCCH and the SRS may be reversed. This can, for example, avoid the complexity in designing the scheduling in the communication system.

As another example of determining the priorities, the transmission details included in the PUCCH may be used. For example, the PUCCH including a scheduling request (SR) may be prioritized over the SRS, the PUCCH including the HARQ feedback may be prioritized over the SRS, or the SRS may be prioritized over the periodic CSI report or the semi-persistent CSI report. The priorities may be reversed. This enables, for example, the base station to perform flexible scheduling based on the details included in the PUCCH.

As another example of determining the priorities, the use case of the SRS may be used. For example, the SRS for switching between antennas may be prioritized over the PUCCH. This enables, for example, the UE to promptly perform a process of switching between the antennas.

As another example of determining the priorities, information on the symbol length of the PUCCH may be used. For example, the SRS may be prioritized over a long PUCCH, that is, a PUCCH as long as four symbols or more, and a short PUCCH, that is, a PUCCH as long as two symbols or less may be prioritized over the SRS. The base station may reconstruct, with error correction, a symbol that is not transmitted in the long PUCCH. This enables, for example, a sounding by transmission of the SRS from the SRS transmission UE while the reliability of the PUSCH to be transmitted from the PUCCH transmission UE is maintained. Consequently, the communication system can be efficiently operated.

As another example of determining the priorities, whether the symbol of the PUCCH that collides with the SRS is the DMRS associated with the PUCCH may be used. For example, when the colliding symbol is the DMRS, the DMRS may be prioritized over the SRS. Otherwise, the SRS may be prioritized over the PUCCH. The PUCCH may be, for example, a long PUCCH. This can, for example, maintain the demodulating performance of the long PUCCH in the base station.

Information on whether the colliding symbol is an additional DMRS may be used. For example, when the colliding symbol is not the additional DMRS, the PUCCH may be prioritized over the SRS. When the colliding symbol is the additional DMRS, the SRS may be prioritized over the PUCCH. The PUCCH may be, for example, a long PUCCH. This enables, for example, a sounding by transmission of the SRS from the SRS transmission UE while the demodulating performance of the long PUCCH in the base station is maintained.

When the DMRS associated with the PUCCH collides with the symbol of the SRS, the symbol of the DMRS may be shifted. For example, the method disclosed in the first embodiment may be applied to the shift. As another example, the collision avoidance instruction may include information on the shift of the DMRS. The information may include information on the time and/or frequency resources after the DMRS is shifted or information on the time and/or frequency resources before the DMRS is shifted.

The base station notifies the collision avoidance instruction to the UE to which transmission of the PUCCH or the SRS is desirably avoided, using the determined priorities. The UE performs a process of transmitting the PUCCH or the SRS according to the instruction included in the notification. As another example, the UE stops transmitting the PUCCH or the SRS.

The following (1) to (7) are disclosed as details included in the collision avoidance instruction.

(1) Information on a method for avoiding the collision
(2) Information on the colliding resources
(3) Information on changing or reconfiguring the transmission timing
(4) Information on changing or reconfiguring the transmission frequency resources
(5) Information on the SRS whose transmission is stopped
(6) Information on the PUCCH whose transmission is stopped
(7) Combinations of (1) to (6) above (1) may be stop of transmission of the PUCCH or the SRS in a slot or stop of transmission only in a colliding symbol. (1) may be information on the rate matching, for example, information on the presence or absence of the rate matching, in the stop of transmission only in the colliding symbol.

As another example, (1) may be information indicating that the transmission timing is changed or reconfigured, information indicating that the transmission frequency is changed or reconfigured, or a combination of the two.

With (1), for example, the collision between the PUCCH and the SRS can be flexibly avoided in the communication system.

(2) may include, for example, information on a slot number. (2) may include information on colliding symbols, for example, a collision start symbol, the number of colliding symbols, a collision end symbol, or a combination of these. The information on colliding symbols may be, for example, information on a combination of symbol numbers. The symbol numbers may be absolute numbers from the beginning of a slot or relative numbers from a predetermined position. As another example, a bitmap may be provided, and each symbol may be associated with a corresponding bit in the bitmap. The bit-length included in the bitmap may be 14 or less. When the bit-length is less than 14, for example, the last bit may be associated with the last symbol in a slot.

As another example, (2) may be information on the RB number. Examples of the information on the RB number may include a collision start RB, the number of colliding RB, a collision end RB, or a combination of these. As another example, information on a combination of RB numbers may be used. The RB numbers may be absolute RB numbers from the first RB of the BWP used by the UE or relative numbers from a predetermined position. As another example, a bitmap may be provided, and each RB may be associated with a corresponding bit in the bitmap.

Information in (3) may include information on the changed or reconfigured transmission timing or information on the original transmission timing. The information on the transmission timing may be similar to that in (2).

Information in (4) may include information on the changed or reconfigured transmission frequency resources or information on the original transmission frequency resources. The information on the transmission frequency resources may be similar to that in (2).

(5) may be information indicating the number of slots from the collision avoidance instruction to the SRS whose transmission is stopped, or an identifier of the SRS configuration.

(6) may be information indicating the number of slots from the collision avoidance instruction to the PUCCH whose transmission is stopped, or an identifier of the PUCCH configuration.

Another solution is disclosed. The base station may notify in advance or broadcast, to the PUCCH transmission UE, information on the SRS configuration of the UEs being served thereby. The method disclosed in the first embodiment may be applied to the notification or the broadcast. This produces the same advantages as those in the first embodiment. The SRS and the PUCCH may be reversed. The method disclosed in the first embodiment may be applied by replacing the SRS with the PUCCH and vice versa. This produces the same advantages as previously described.

Another solution is disclosed. The base station performs advanced scheduling to avoid a collision in the time and/or frequency resources between the SRS to be transmitted from the SRS transmission UE and the PUCCH to be transmitted from the PUCCH transmission UE. The UE need not perform a particular operation in the resources in which the SRS and/or the PUCCH are scheduled. The UE need not receive the collision avoidance instruction disclosed in the third modification. This can, for example, avoid the complexity of designing in the UE.

For example, the base station may configure the SRS except for the frequency band in which the PUCCH may be transmitted. As another example, the base station may configure the transmission frequency of the PUCCH in the frequency resources at the end of the BWP.

When the SRS is stopped in avoiding the collision between the PUCCH and the SRS, the base station has problems of failing to measure the uplink channel and manage a beam.

A solution to the problems is disclosed. The base station can configure other SRSs for the SRS transmission UE in a slot in which the SRS is stopped due to the collision with the PUCCH. Examples of other SRSs may include the aperiodic SRS. Information on the configuration may be, for example, included in the downlink control information (DCI) similar to that of the collision avoidance instruction. The information on the configuration may be, for example, an identifier of the aperiodic SRS. The SRS transmission UE may, for example, transmit the aperiodic SRS using the configuration, instead of the SRS whose transmission has been stopped.

The third modification can avoid the collision between the PUCCH and the SRS. Consequently, the robustness in the communication system can be improved.

The Second Embodiment

The UE is configured by the upper layer so that the entirety or a part of the DL band and/or the entirety or a part of the UL band are used. These configured bands are referred to as bandwidth parts (BWPs). A BWP is configured every serving cell, and the communication is performed within the configured BWP. The BWP configured in the DL is referred to as a DL-BWP. The BWP configured in the UL is referred to as a UL-BWP.

The gNB configures, for the UE, one or more candidates for the BWP. The configuration is made via the upper layer signaling. The gNB notifies the UE of the BWP in which communication is actually performed among the candidates for the BWP. The BWP in which communication is actually performed is referred to as an active BWP. The configuration is made via the upper layer signaling, the L1/L2 signaling, or the MAC signaling.

Application of a measurement gap has been proposed as a method for the UE to transmit the SRS in a band outside an active UL-BWP (see Reference Document 22 (R1-1715277)). The measurement gap is a duration configured for measuring the received power or the reception quality in the DL at different frequencies. Thus, how to transmit, with the measurement gap, the SRS that is a signal in the UL is a problem. However, none discloses this method. Thus, the UE cannot transmit the SRS in a band outside the active BWP with the measurement gap.

The second embodiment discloses a method for solving such a problem.

The gNB notifies the UE of the configuration of the SRS to be transmitted during a measurement gap duration. The configuration of the SRS to be transmitted during the measurement gap duration may include the resources for transmitting the SRS on the frequency axis or on the time axis.

The transmission band of the SRS to be transmitted during the measurement gap duration should be configured not to include the active BWP. The SRS can be transmitted in a band outside the active BWP.

As another method for configuring the transmission band of the SRS to be transmitted during the measurement gap duration, the transmission band of the SRS may be configured to include the active BWP. By configuring the transmission band of the SRS to include the active BWP besides a range outside the active BWP, the transmission band of the SRS can be configured without excluding the band of the active BWP, irrespective of where the active BWP is configured. Thereby, the transmission band of the SRS can be easily configured.

The UE may be configured not to transmit the SRS in the active BWP during the measurement gap duration. The UE may be configured not to transmit the SRS in the active BWP within a transmission band of the SRS configured during the measurement gap duration. The UE is configured to transmit the SRS normally separately in the active BWP. Thus, saving the transmission of the SRS in the active BWP can reduce the transmission band of the SRS to be transmitted by the UE. The power consumption of the UE can be reduced.

The UE may be configured to transmit the SRS in the active BWP during the measurement gap duration. The UE may be configured to transmit the SRS in the active BWP within the transmission band of the SRS configured during the measurement gap duration. The transmission band of the SRS to be transmitted by the UE can be configured without excluding the band of the active BWP, irrespective of where the active BWP is configured. Thereby, the transmission band of the SRS can be easily configured.

A plurality of SRSs may be configured for one measurement gap. For example, transmission of the SRS with a plurality of timings may be configured in one measurement gap. The plurality of SRSs may have mutually different frequency bands. This enables, for example, a sounding in a wide band in one measurement gap. Thus, a sounding in a wide band can be promptly performed. The SRS may be configured with a plurality of measurement gaps. The configuration of the SRS in each of the measurement gaps may be different. For example, even when a measurement gap duration is short and the UL band is wide, application of a plurality of measurement gaps enables transmission of the SRS in the entire UL band.

In configuring the SRS to be transmitted during a measurement gap duration, the transmission band of the SRS may be arbitrarily configurable, irrespective of the DL band measured at the same timing when the UE transmits the SRS.

The measurement gap for configuring the SRS may be limited not to a measurement gap for DL measurement at a carrier frequency in a different band but to a measurement gap for DL measurement at a carrier frequency in the same band. The measurement gap for configuring the SRS may be limited to a measurement gap for measurement at a carrier frequency in the same band in the DL, with the carrier frequency or a band at the same carrier frequency being changed.

The measurement gap for configuring the SRS may be limited not to a measurement gap for DL measurement at different carrier frequencies but to a measurement gap for DL measurement at the same carrier frequency. The measurement gap for configuring the SRS may be limited to a measurement gap for measurement at the same carrier frequency in the DL, with a bandwidth or a frequency band being changed.

With these limitations, the reception frequency and the transmission frequency can be configured in association with each other in the UE. Thus, the UE can be easily produced at low cost.

A method for notifying information on the configuration of the SRS to be transmitted during a measurement gap duration is disclosed. The gNB semi-statically configures the SRS to be transmitted during the measurement gap duration for the UE. The gNB may, for example, configure the SRS according to a use case of the SRS. The gNB semi-statically notifies the UE of information on the configuration of the SRS to be transmitted during the measurement gap duration. The gNB may give the notification via the RRC signaling. Upon receipt of the notification, the UE transmits the SRS using the information on the configuration of the SRS during the measurement gap duration.

The gNB may notify the UE of start, change, or end of configuring the SRS to be transmitted during the measurement gap duration. Furthermore, the gNB may notify an offset duration until the configuration of the SRS is started. Furthermore, the gNB may notify a duration from the start to the end of configuring the SRS. The duration from the start to the end of configuring the SRS may be managed using a timer. The expiration of the timer may mean the end of configuring the SRS. The UE need not transmit the SRS during the measurement gap duration after the end of configuring the SRS. Furthermore, the start to the end of configuring the SRS may be configured by the number of measurement gaps. The gNB should notify the UE of the number of measurement gaps.

The gNB may notify the UE of stopping transmission of the SRS during a predetermined measurement gap duration. For example, the gNB notifies the UE of stopping the transmission of the SRS in a measurement gap in which transmission of the SRS is desirably stopped, prior to the measurement gap. The number of measurement gaps in which transmission of the SRS is stopped may be one or more. This can reduce unnecessary transmission of the SRS. Furthermore, the interference with transmission from the other UEs can be reduced.

Another notification method is disclosed. The gNB configures the SRS to be transmitted during the measurement gap duration every measurement gap for the UE. Since the SRS can be configured every measurement gap, the flexible and timely configuration is possible. The gNB notifies the UE of information on the configuration of the SRS to be transmitted during the measurement gap duration, prior to the measurement gap. The gNB may give the notification via the L1/L2 signaling. The gNB may include the notification in the DCI to give the notification with the PDCCH. This enable a prompt notification.

The gNB may give the notification via the MAC signaling. The gNB may include the notification in the MAC CE to give the notification. Since the transmission control is possible, the reliability can be enhanced. The gNB may give the notification via the RRC signaling. The gNB can notify a large amount of information. For example, a band of the SRS can be flexibly configured. Upon receipt of the notification, the UE transmits the SRS using the information on the configuration of the SRS during the measurement gap duration.

The UE may notify the base station of a response to the notification. The UE may give the notification via the RRC signaling. Notification of the response can further enhance the reliability. The UE may give the notification via the MAC signaling. Alternatively, the UE may give the notification via the L1/L2 signaling. This enables a prompt response.

The gNB need not transmit, to the UE, the configuration of the SRS to be transmitted during the measurement gap duration. Here, the UE need not transmit the SRS during the measurement gap duration. Consequently, the gNB can prevent the UE from transmitting the SRS in a measurement gap in which the SRS is not desirably transmitted by the UE.

The methods for configuring the SRS to be transmitted during the measurement gap duration may be combined. Transmission of the SRS can be flexibly configured.

The following (1) to (8) indicate examples of the information on the configuration of the SRS.

(1) Information on an SRS transmission band
(2) Information on an SRS transmission timing
(3) Information on the numerology of the SRS
(4) Information on a sequence of the SRSs
(5) Information indicating whether the SRS is transmitted in the active BWP
(6) An ID of the SRS configuration
(7) Information on a port number of the SRS
(8) Combinations of (1) to (7) above The information on an SRS transmission band in (1) is information for identifying a transmission band of the SRS. The following (1-1) to (1-5) indicate examples of the information.

(1-1) The first PRB number
(1-2) The end PRB number
(1-3) The number of PRBs
(1-4) Information indicating a frequency hopping band
(1-5) Combinations of (1-1) to (1-4) above The information on the SRS transmission timing in (2) is information for identifying the transmission timing of the SRS. The following (2-1) to (2-7) indicate examples of the information.

(2-1) The slot number
(2-2) The symbol number
(2-3) A start slot number or may be an offset
(2-4) A start symbol number or may be an offset
(2-5) The number of symbols
(2-6) A period
(2-7) Combinations of (2-1) to (2-6) above The information on the numerology of the SRS in (3) is information for identifying the numerology of the SRS. The following (3-1) to (3-5) indicate examples of the information.

(3-1) A subcarrier spacing (SCS)
(3-2) A symbol duration
(3-3) An ID for identifying the numerology
(3-4) Information indicating whether the numerology of the SRS is identical to the numerology of the active BWP
(3-5) Combinations of (3-1) to (3-4) above In (3-3), the ID for identifying the numerology may be, for example, a number allocated in advance to every numerology. The ID for identifying the numerology may be statically determined, for example, in a standard, or semi-statically notified from the gNB to the UE via the RRC signaling. The numerology of the SRS may be configured in the same manner as the numerology configured in a band for transmitting the SRS. Consequently, the gNB enables the UE to transmit the SRS in the same numerology as that for the actual uplink transmission. Thus, the precision of the uplink sounding can be increased.

When the information in (3-4) is configured so that the numerology of the SRS is identical to the numerology of the active BWP, the time for switching between the numerologies in the UE can be shortened. In this case, the ID for identifying the numerology in (3-3) can be omitted. The amount of information that needs to be notified can be reduced. When the information is configured so that the numerology of the SRS is different from the numerology of the active BWP, the numerology configured in the band for transmitting the SRS may be configured using the ID for identifying the numerology in (3-3). The numerology for the SRS can be flexibly configured.

The information on the sequence of the SRSs in (4) is information for identifying the sequence of the SRSs. The following (4-1) to (4-5) indicate examples of the information.

(4-1) An SRS sequence ID
(4-2) The cyclic shift
(4-3) A comb value
(4-3) A comb offset
(4-5) Combinations of (4-1) to (4-4) above The information indicating whether the SRS is transmitted in the active BWP in (5) is information for configuring whether the UE transmits the SRS in the active BWP during the measurement gap duration.

The ID of the SRS configuration in (6) is an identifier for identifying this SRS configuration. The identifier of the SRS configuration may be given as a number for each cell or a number for each UE or for each UE group. Furthermore, information indicating a transmission behavior in the time axis direction (a time domain behavior) of the SRS may be included as the ID of the SRS. Examples of the information include information indicating whether the SRS is the periodic SRS, the semi-persistent SRS, or the aperiodic SRS.

The information on a port number of the SRS in (7) is information for identifying the port number for transmitting the SRS.

Combinations of the pieces of the information on the configuration of the SRS may be configured. For example, a different transmission band may be configured for each SRS transmission symbol. As another example, transmission of the SRS in a plurality of symbols may be configured, and a different transmission band may be configured for each of the symbols. For example, the transmission of the SRS in a plurality of symbols may be configured as one set. As such, configuring the combinations of the pieces of the information on the configuration of the SRS enables various and flexible configurations of the transmission of the SRS.

The SRS transmission timing may be configured to be included in a measurement gap duration. The configuration appropriate for the DL measurement timing is possible. Moreover, matching the SRS transmission timing with the DL measurement timing can eliminate a difference in timing between the measurement in the DL and transmission of the SRS or reduce the difference as much as possible. The measurement in the DL and the UL sounding can be performed with a low latency. Since the measurement in the DL and the UL sounding can be performed at closer timings, the communication qualities in both of the DL and the UL at the timings can be obtained.

The timing of the measurement gap may be configured according to the configuration of the SRS transmission. The measurement gap may be configured to include the timing at which the transmission of the SRS has been configured. The configuration appropriate for the UL sounding is possible.

Figure 27:
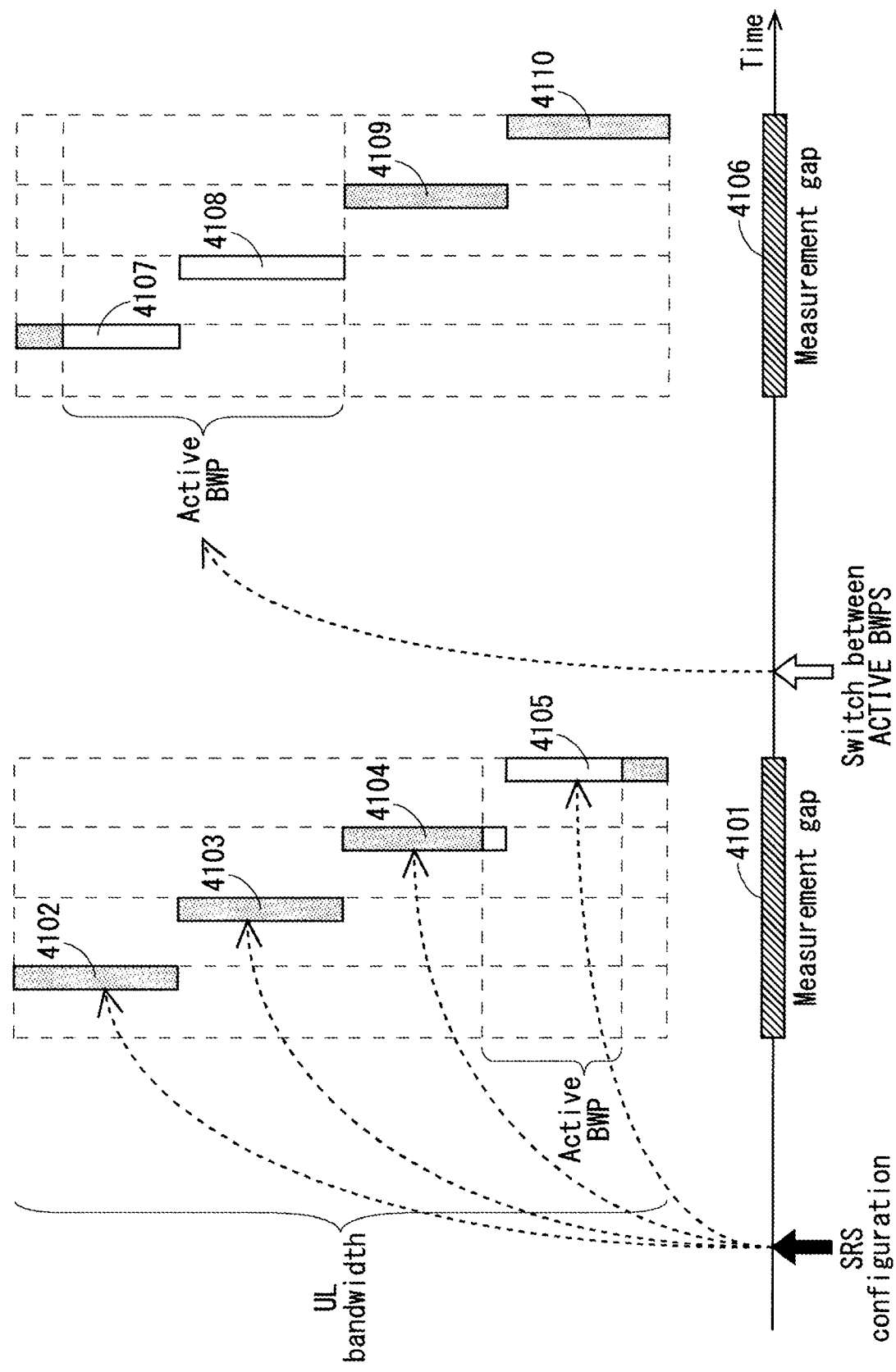
FIG. 27 illustrates an example of configuring the SRS transmission during measurement gaps via the semi-static signaling according to the second embodiment.

FIG. 27 illustrates an example of configuring the SRS transmission during the measurement gap duration according to the second embodiment. FIG. 27 illustrates a method for semi-statically notifying the configuration of the SRS transmission. FIG. 27 illustrates transmission of the SRS outside the active BWPs. The horizontal axis represents the time, and the vertical axis represents the frequency. The entire frequency band in the UL is indicated in the frequency axis direction. 4101 and 4106 denote measurement gap durations. 4102, 4103, 4104, 4105, 4107, 4108, 4109, and 4110 denote resources with which transmission of the SRS has been configured. The UE transmits the SRS with the shaded resources, and does not transmit the SRS with the white resources.

A black arrow on the time axis represents the configuration of the SRS to be made by the gNB for the UE. The gNB notifies the UE of information on the configuration of the SRS. The gNB gives the notification semi-statically via the RRC signaling. The information on the configuration of the SRS includes resource information of 4102, 4103, 4104, and 4105. The information on the configuration of the SRS may include periodic information. The example of FIG. 27 illustrates that the configuration of the SRS in 4102, 4103, 4104, and 4105 is periodically made with the periodic information. Thus, the SRS is configured with 4102, 4103, 4104, and 4105.

The information on the configuration of the SRS may include information indicating whether the SRS is transmitted in the active BWP. In the example of FIG. 27, the SRS is not transmitted in the active BWP. The UE does not transmit the SRS in the active BWP during the measurement gap duration.

The UE transmits the SRS with the configured resources 4102, 4103, 4104, and 4105 in the measurement gap 4101, using the received SRS configuration information. Since the UE is configured not to transmit the SRS in an active BWP, the UE does not transmit the SRS in an active BWP range including the resources 4104 and 4105 with which transmission of the SRS has been configured.

The active UL-BWP may be switched between the measurement gap 4101 and the next measurement gap 4106. As indicated by a white arrow, the gNB switches between the active UL-BWPs for the UE. The UE switches between the active BWPs.

The UE transmits the SRS with the configured resources 4107, 4108, 4109, and 4110 in the next measurement gap 4106, using the received SRS configuration information. Since the UE is configured not to transmit the SRS in an active BWP, the UE does not transmit the SRS in an active BWP range including the resources 4107 and 4108 with which transmission of the SRS has been configured.

As such, the UE can transmit the SRS outside the active BWPs.

Figure 28:
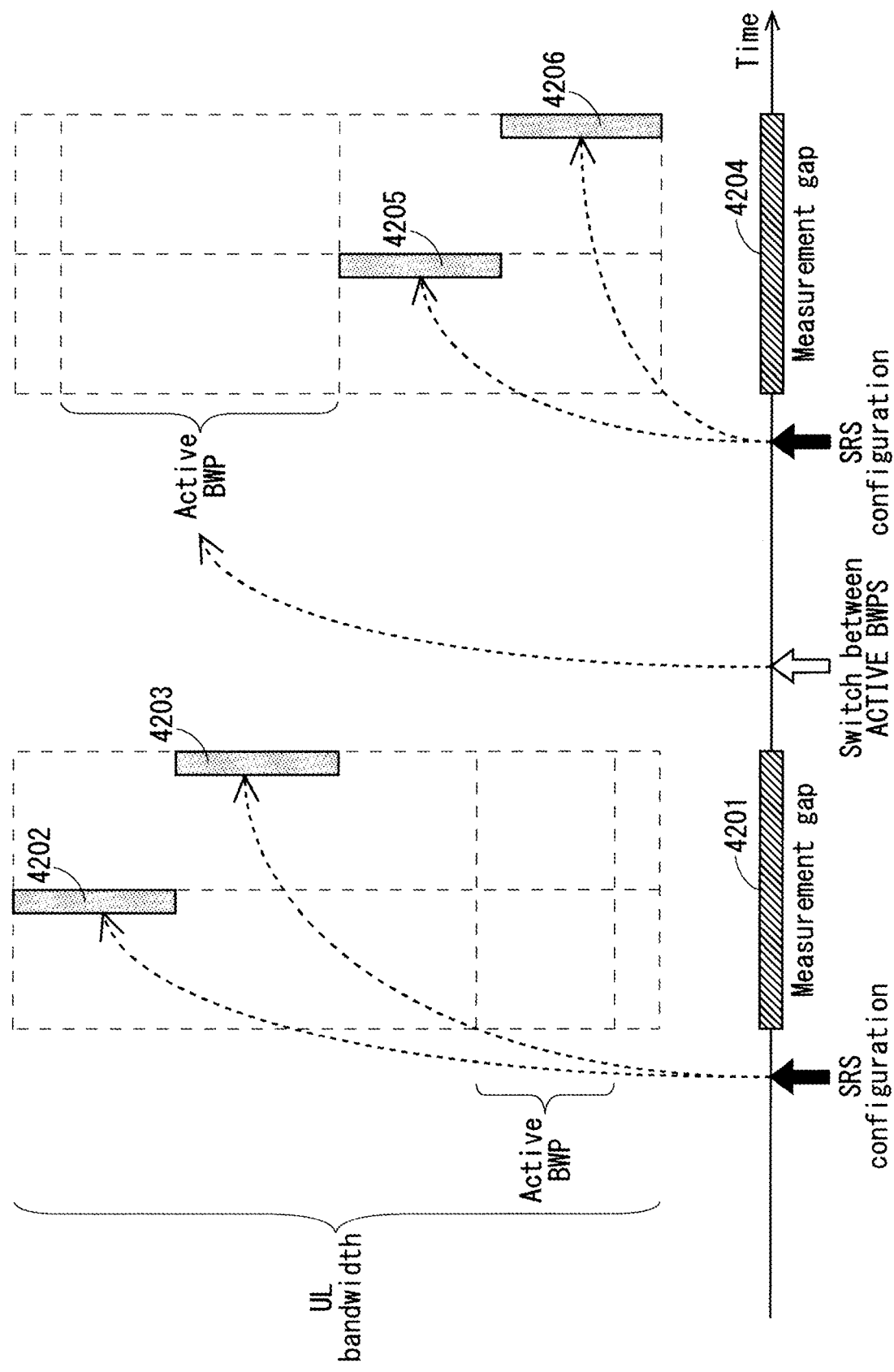
FIG. 28 illustrates an example of configuring the SRS transmission during measurement gaps via the dynamic signaling according to the second embodiment.

FIG. 28 illustrates an example of configuring the SRS transmission during the measurement gap duration according to the second embodiment. FIG. 28 illustrates a method for dynamically notifying the configuration of the SRS transmission. FIG. 28 illustrates transmission of the SRS outside the active BWPs. 4201 and 4204 denote measurement gap durations. 4202, 4203, 4205, and 4206 denote resources with which transmission of the SRS has been configured. The UE transmits the SRS with the shaded resources.

The black arrows on the time axis represent the configuration of the SRS to be made by the gNB for the UE. The gNB notifies the UE of information on the configuration of the SRS. The gNB, for example, dynamically gives the notification via the L1/L2 signaling. The gNB gives the notification for each measurement gap prior to the measurement gap. The configuration of the SRS for each measurement gap can be notified. This can change the configuration of the SRS for each measurement gap. Thus, transmission of the SRS can be configured according to the timing.

In the configuration of the SRS notified before the measurement gap 4201, the information on the SRS configuration includes resource information of 4202 and 4203. In the configuration of the SRS notified before the measurement gap 4204, the information on the SRS configuration includes resource information of 4205 and 4206.

The dynamic notification of the SRS configuration can configure the resources of the SRS according to the configuration of the active BWP. For example, for avoiding transmission of the SRS in the active BWP, the resources with which the SRS is transmitted should be configured outside the active BWP. With such a configuration, the UE does not transmit the SRS in the active BWP during the measurement gap duration.

The UE transmits the SRS in the measurement gap 4201 with the resources 4202 and 4203 configured before the measurement gap 4201. The active UL-BWP may be switched between the measurement gap 4201 and the next measurement gap 4204. As indicated by the white arrow, the gNB switches between the active UL-BWPs for the UE. The UE switches between the active BWPs.

The UE transmits the SRS in the measurement gap 4204 with the resources 4205 and 4206 configured before the measurement gap 4204. As such, the UE can transmit the SRS outside the active BWPs. Since the gNB dynamically notifies the UE of information on the configuration of the SRS, it can configure the SRS for each measurement gap. Consequently, the gNB can timely and flexibly configure, for the UE, transmission of the SRS at the timing requiring the sounding.

A method for semi-statically configuring the SRS transmission and a method for dynamically configuring the SRS transmission may be combined. The gNB semi-statically makes a part of the configuration of the SRS transmission, and dynamically makes the other parts thereof. The gNB semi-statically notifies the UE of a part of information on the configuration of the SRS transmission and dynamically notifies the UE of the other parts. This can reduce the information dynamically notified.

The gNB may notify the UE of candidates for the configuration of the SRS transmission using the measurement gap. The number of the candidates may be one or more. The gNB may notify the UE of which configuration of the SRS transmission among the candidates is used. The aforementioned method should be applied to these notification methods. For example, the gNB notifies the candidates for the configuration of the SRS transmission via the RRC signaling, and notifies which configuration of the SRS transmission among the candidates is used via the MAC signaling.

This enables a flexible configuration of the SRS transmission and reduction in the amount of information dynamically notified.

The method for transmitting the SRS in the UL with a measurement gap for DL measurement is disclosed above. Another method is disclosed. A duration for transmitting a UL signal or a UL channel is provided outside the active BWP. This is hereinafter referred to as a UL transmission gap. The measurement gap for DL measurement may differ from the UL transmission gap. During a UL transmission gap duration, the gNB does not schedule the UL transmission in the active UL-BWP for the UE. During the UL transmission gap duration, the UE need not perform transmission in the active UL-BWP.

The UL signal that the UE transmits outside the active BWP may be the SRS. The gNB may provide the UE with a UL transmission gap for transmitting the SRS outside the active BWP. During the UL transmission gap duration, the UE transmits the SRS outside the active BWP.

During the UL transmission gap duration, communication in the DL may be possible. During the UL transmission gap duration, measurement in the DL may be possible. During the UL transmission gap duration, the gNB may schedule the DL transmission for the UE. The UE may perform reception in the DL during the UL transmission gap duration. The DL transmission may be performed in the active DL-BWP. The UE performs reception in the active DL-BWP.

The gNB may notify the UE of the configuration of the SRS transmission in the active DL-BWP. The gNB may notify the UE of the configuration of the SRS transmission in the active DL-BWP during the UL transmission gap duration. As such, the gNB can notify the UE of the configuration of the SRS transmission during the UL transmission gap duration by making the UL transmission gap different from the measurement gap for DL measurement. The SRS transmission can be further dynamically configured.

The aforementioned methods may be applied to configure the SRS.

A method for configuring the UL transmission gap is disclosed. The gNB notifies the UE of information on the UL transmission gap. The following (1) to (5) indicate examples of the information on the UL transmission gap.

(1) A duration of a gap
(2) A period of a gap or may be a repetition duration
(3) An offset of a gap
(4) An identifier of a configuration of a gap
(5) Combinations of (1) to (4) above The duration, the period, and the offset of the gap may be configured per radio frame, per subframe, per slot, per mini-slot, or per symbol. Alternatively, the duration, the period, and the offset of the gap may be configured per time unit such as per millisecond.

The gNB may notify the UE of start, change, or end of configuring the UL transmission gap. Furthermore, the gNB may notify an offset duration until the configuration of the UL transmission gap is started. Furthermore, the gNB may notify a duration from the start to the end of configuring the UL transmission gap. The duration from the start to the end of configuring the UL transmission gap may be managed using a timer. The expiration of the timer may mean the end of configuring the UL transmission gap. Furthermore, the number of UL transmission gaps may be used from the start to the end of configuring the UL transmission gap. The gNB should notify the UE of the number of UL transmission gaps.

Figure 29:
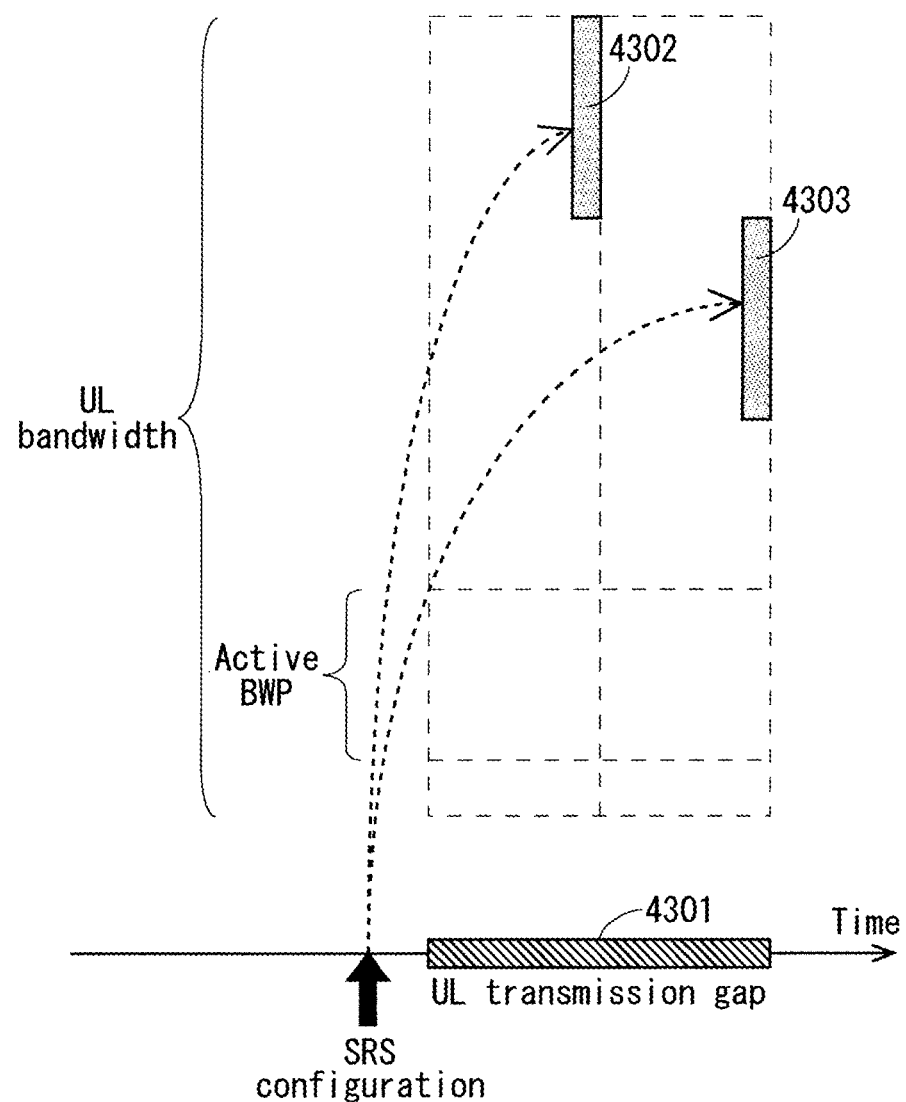
FIG. 29 illustrates an example of configuring the SRS transmission with provision of a UL transmission gap according to the second embodiment.

FIG. 29 illustrates an example of configuring the SRS transmission with provision of a UL transmission gap. 4301 denotes a transmission gap. The gNB notifies the UE of the configuration of the UL transmission gap in advance.

Furthermore, the gNB notifies the UE of the configuration of the SRS prior to the UL transmission gap. The black arrow on the time axis represents the configuration of the SRS to be made by the gNB for the UE. The gNB notifies the UE of information on the configuration of the SRS. The gNB, for example, dynamically gives the notification via the L1/L2 signaling. 4302 and 4303 represent resources with which transmission of the SRS has been configured. The UE transmits the SRS with the shaded resources.

As such, provision of the UL transmission gap enables the uplink transmission, irrespective of the measurement gap for DL measurement. For example, the uplink transmission is possible outside the active UL-BWP, irrespective of the timing for DL measurement. The SRS can be transmitted as the uplink transmission. Thus, the uplink transmission can be performed with the timing requiring the uplink transmission.

Figure 30:
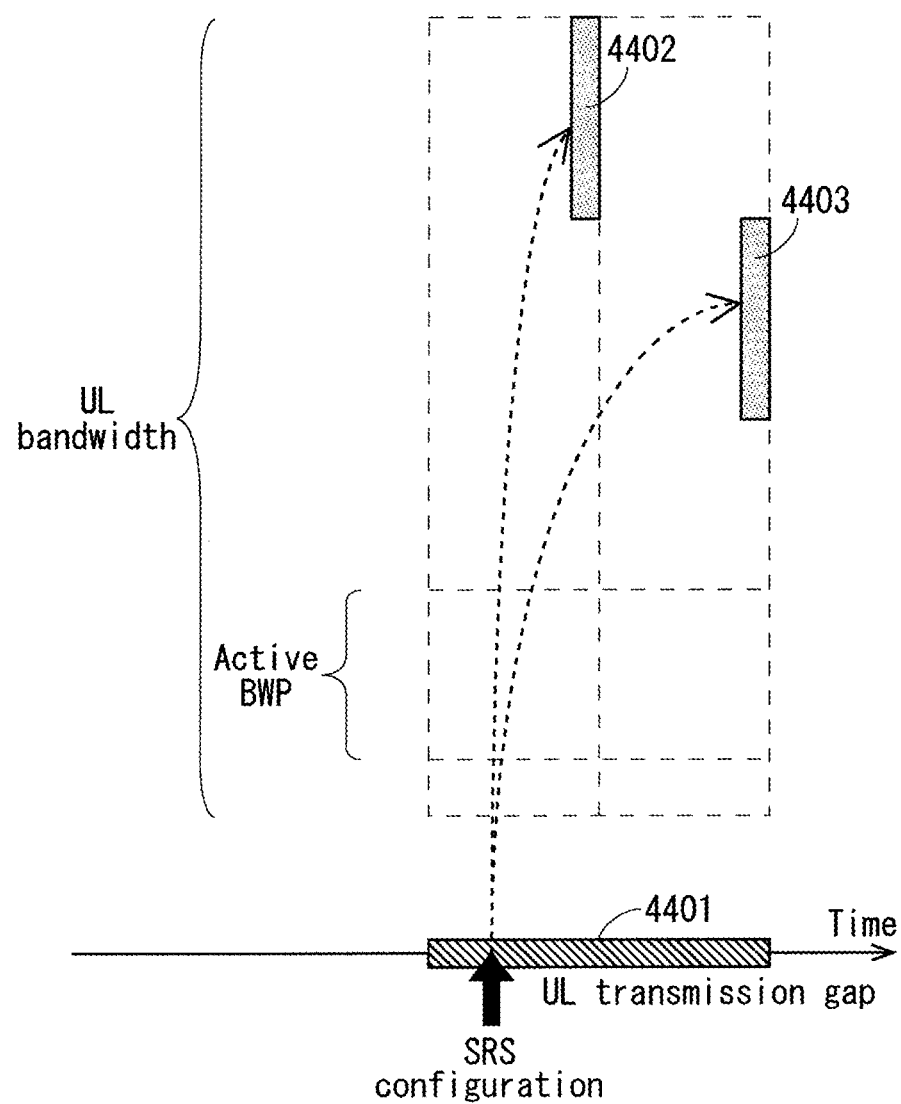
FIG. 30 illustrates another example of configuring the SRS transmission with provision of the UL transmission gap according to the second embodiment.

FIG. 30 illustrates another example of configuring the SRS transmission with provision of a UL transmission gap. FIG. 30 illustrates a method for the gNB to notify the UE of the SRS configuration during the UL transmission gap duration. 4401 denotes a UL transmission gap. The gNB notifies the UE of the configuration of the UL transmission gap in advance.

The gNB notifies the UE of the configuration of the SRS during the UL transmission gap duration. The black arrow on the time axis represents the configuration of the SRS to be made by the gNB for the UE. The gNB notifies the UE of information on the configuration of the SRS. The gNB, for example, dynamically gives the notification via the L1/L2 signaling. 4402 and 4403 represent the resources with which transmission of the SRS has been configured. The UE transmits the SRS with the shaded resources.

The SRS is configured in the DL. Thus, the gNB can notify the UE of the configuration of the SRS during the UL transmission gap duration by configuring the UL transmission gap in a duration different from the measurement gap for DL measurement. The gNB can more timely and flexibly configure, for the UE, transmission of the SRS at the timing requiring the sounding.

Figure 31:
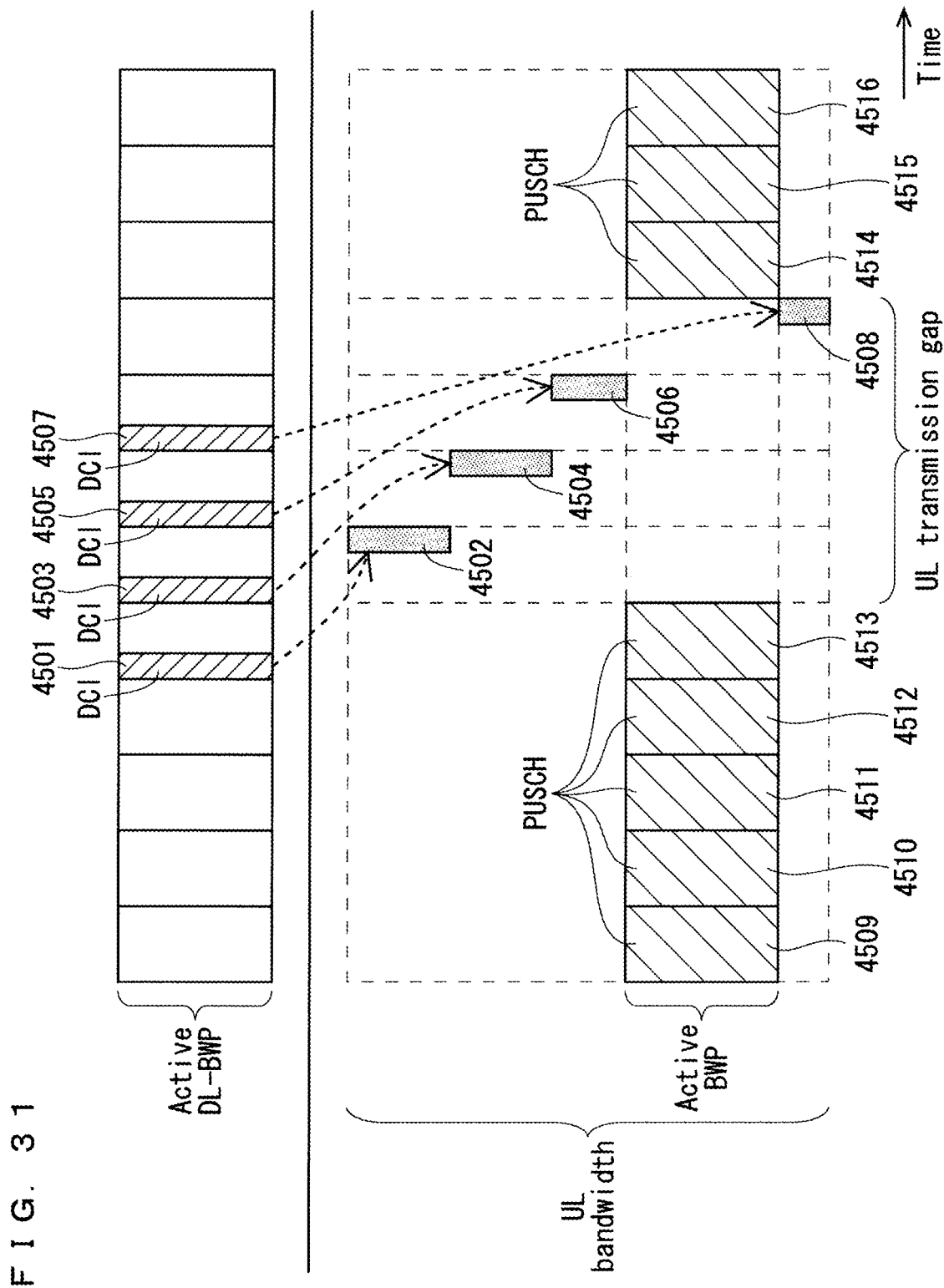
FIG. 31 illustrates a specific example of configuring the SRS transmission with provision of the UL transmission gap according to the second embodiment.

FIG. 31 illustrates a specific example of configuring the SRS transmission with provision of a UL transmission gap. FIG. 31 illustrates a method for notifying the SRS configuration during the UL transmission gap duration. The horizontal axis represents the time, and the vertical axis represents the frequency. The upper portion of the diagram represents the DL, and the lower portion of the diagram represents the UL. The active DL-BWP range is illustrated in the frequency axis direction in the upper portion of the diagram. The entire frequency band in the UL is illustrated in the frequency axis direction in the lower portion of the diagram.

The PUSCH is transmitted during a duration from 4509 to 4513 and a duration from 4514 to 4516 in the active UL-BWP in the UL. A UL transmission gap is formed between 4513 and 4514. The gNB notifies the UE of the configuration of the UL transmission gap in advance, so that the UL transmission gap is formed. The UE does not perform the UL transmission using the active UL-BWP in the UL transmission gap.

A method for transmitting the SRS is described. 4502, 4504, 4506, and 4508 denote resources with which transmission of the SRS has been configured. The transmission of the SRS is configured outside the active UL-BWP. The gNB notifies the UE of information on the configuration of the SRS transmission in the active DL-BWP in the DL. Here, the gNB gives the notification via the L1/L2 signaling. The gNB includes the information in the DCI to give the notification with the PDCCH.

The gNB includes information on the configuration of the SRS 4502 in the DCI 4501 to give the notification. The gNB includes information on the configuration of the SRS 4504 in the DCI 4503 to give the notification. The gNB includes information on the configuration of the SRS 4506 in the DCI 4505 to give the notification. The gNB includes information on the configuration of the SRS 4508 in the DCI 4507 to give the notification. The UE transmits each of the SRSs outside the active UL-BWP during the UL transmission gap duration, using the configuration of the SRS that has been received from the gNB.

The gNB can more timely and flexibly configure, for the UE, transmission of the SRS at the timing requiring the sounding by notifying the configuration of the SRS transmission in the active DL-BWP during the UL transmission gap duration. Furthermore, the gNB can schedule the configuration of the SRS transmission for the UE in consideration of transmission of the PUSCH of another UE.

A measurement gap dedicated to the DL may be provided. The UL signal and the UL channel can be transmitted during the measurement gap duration. The UL signal and the UL channel are transmitted in the active UL-BWP. When the measurement gap dedicated to the DL is provided, a problem of failing to schedule the PUSCH during the measurement gap duration occurs. A method for solving such a problem is disclosed.

The gNB schedules, for the UE, the PUSCH prior to the measurement gap duration dedicated to the DL. The gNB schedules, for the UE, the PUSCH prior to the measurement gap duration dedicated to the DL, instead of the scheduling of the PUSCH during the measurement gap duration dedicated to the DL. The UE transmits the PUSCH using the scheduling information of the PUSCH notified prior to the measurement gap duration dedicated to the DL.

The gNB may notify the UE of the scheduling information of the PUSCH with the DCI. The scheduling of the PUSCH can be dynamically configured prior to the measurement gap duration dedicated to the DL.

As another method, the gNB may notify the UE of the scheduling information of the PUSCH with the MAC. The gNB should notify the scheduling information of the PUSCH prior to the maximum number of retransmissions so that the retransmission control is not performed in a measurement gap. This can reduce reception errors in the UE and malfunctions.

As another method, the gNB may notify the UE of the scheduling information of the PUSCH via the RRC signaling. The gNB may give the notification separately from or together with configuring the measurement gap dedicated to the DL. The reception errors in the UE can be further reduced.

The gNB may schedule signals or channels including the PUCCH for transmitting the SR or the HARQ-Ack, the aperiodic SRS, and the semi-persistent PUCCH for the UE prior to the measurement gap duration dedicated to the DL in the same manner as the PUSCH. Consequently, the UE can transmit these signals or channels notified prior to the measurement gap duration dedicated to the DL, using the scheduling information of the signals or channels.

When the measurement gap dedicated to the downlink is configured, the UE may transmit the UL signal or the UL channel which is configured by periodic or semi-persistent scheduling or by transmission without uplink grant.

The method for configuring the UL transmission gap may be applied to a method for configuring the measurement gap dedicated to the DL. The configuration of the measurement gap dedicated to the DL may be different from the configuration of the UL transmission gap. These configurations may be dedicatedly made. With the dedicated configurations, there is no need to follow the measurement timing in the DL for the uplink transmission. The uplink transmission can be performed with the timing requiring the UL transmission.

Figure 32:
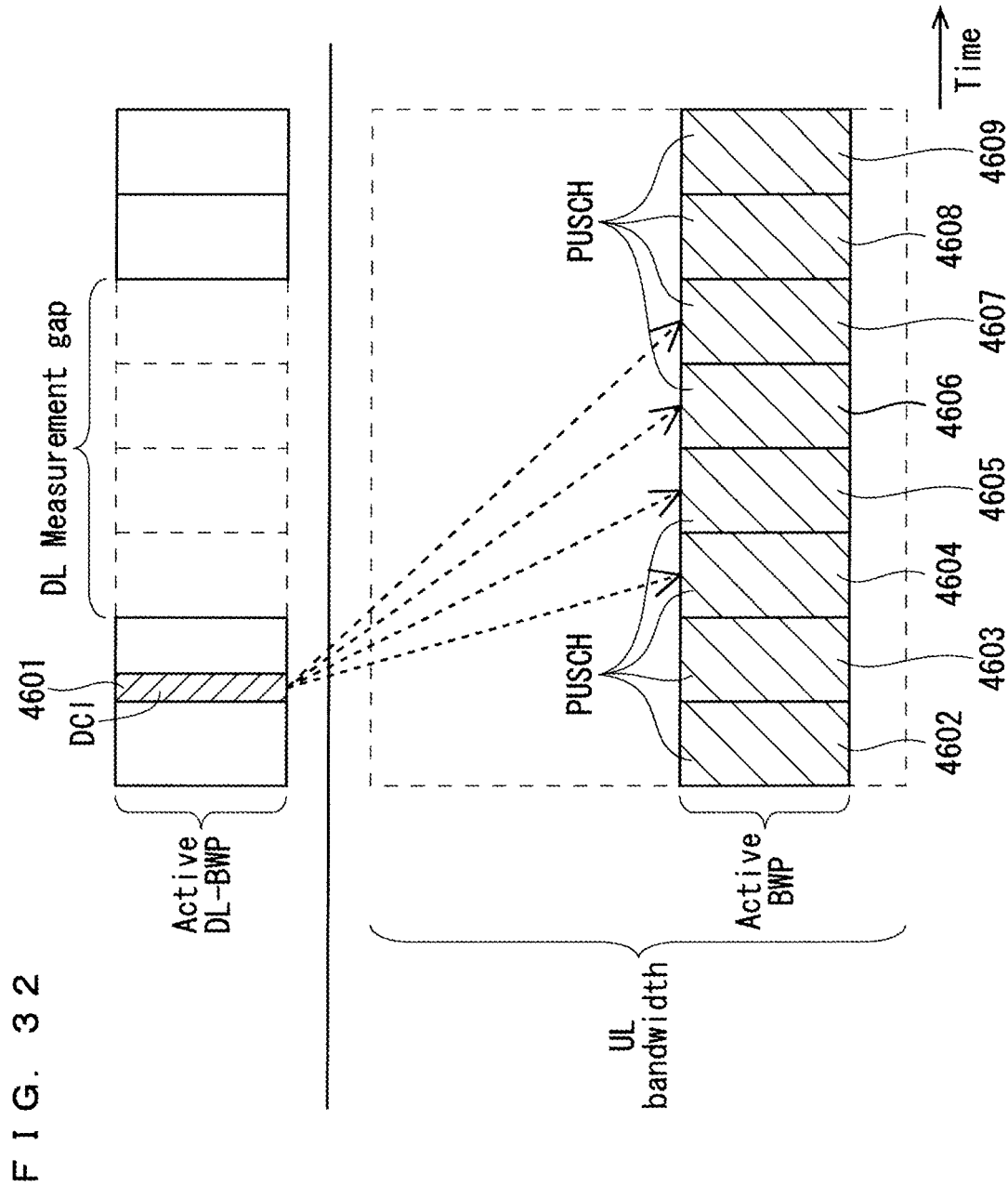
FIG. 32 illustrates a specific example of a measurement gap dedicated to the DL according to the second embodiment.

FIG. 32 illustrates a specific example of the measurement gap dedicated to the DL. The horizontal axis represents the time, and the vertical axis represents the frequency. The upper portion of the diagram represents the DL, and the lower portion of the diagram represents the UL. The active DL-BWP range is illustrated in the frequency axis direction in the upper portion of the diagram. The entire frequency band in the UL is illustrated in the frequency axis direction in the lower portion of the diagram. The measurement gap dedicated to the DL is configured in the active DL-BWP. The gNB notifies the UE of the configuration of the measurement gap dedicated to the DL in advance, so that the measurement gap dedicated to the DL is formed. The UE does not perform reception in the measurement gap dedicated to the DL using the active DL-BWP.

FIG. 32 illustrates the scheduling so that the UE consecutively transmits the PUSCH in the active UL-BWP. 4602 to 4609 denote the PUSCHs. The gNB cannot perform UL scheduling for the UE in the measurement gap dedicated to the DL. Thus, the gNB schedules, for the UE, the PUSCHs prior to the measurement gap duration dedicated to the DL.

For example, the gNB includes the scheduling information of the PUSCHs in DCI 4601 to notify the UE of the scheduling information. The gNB may include the UL scheduling information of a plurality of slots in the DCI. The UE transmits the PUSCH 4604, 4605, 4606, and 4607 during the measurement gap duration dedicated to the DL, using the scheduling information of the PUSCHs that has been received from the gNB.

Consequently, even when the measurement gap dedicated to the DL is provided, the PUSCHs can be scheduled during the measurement gap duration dedicated to the DL. Thus, the UE can transmit the PUSCHs during the measurement gap duration dedicated to the DL.

In the TDD, the active UL-BWP is switched simultaneously when the active DL-BWP is switched. Furthermore, the active DL-BWP is switched simultaneously when the active UL-BWP is switched. When the SRS is transmitted using a measurement gap outside the active BWP, the SRS may be transmitted in terms of a center frequency or a frequency band in the DL which is measured in the measurement gap.

Consequently, the UL sounding can be performed at the center frequency or in the frequency band which is expectedly used in the DL. The center frequency or the frequency band to be used in the communication can be configured according to both of the received power or the communication quality in the DL and the communication quality in the UL. The gNB can configure such a center frequency or a frequency band for the UE. The configuration with considerations given to both of the DL and the UL is possible.

When transmission of the SRS in the UL is configured with a center frequency or a frequency band which is different from the center frequency or the frequency band in the DL which is measured in the measurement gap in the DL, the aforementioned method cannot be performed. A method for solving such a problem is disclosed.

A plurality of measurement gaps are provided. The gNB provides the plurality of measurement gaps for the UE. A part of a plurality of measurement configurations should be applied to the DL measurement, and the others should be applied to the UL transmission. The SRS may be transmitted during a measurement gap duration for the UL transmission. The gNB configures, for the UE, a measurement gap for the UL transmission and then transmission of the SRS during a measurement gap duration for the UL transmission.

The configuration should be made for each of the measurement gaps. The method for configuring the UL transmission gap should be applied to a method for making the configuration for each of the measurement gaps. The method for configuring the UL transmission gap may also be applied to a measurement gap for the DL measurement or a measurement gap for the UL transmission.

The measurement gaps may be configured discretely in time or consecutively. Furthermore, each of the measurement gaps may be configured in synchronization with the timing of the DL measurement and/or the timing of the UL transmission. For example, when a slot in which the first 0-th to 8-th symbols are in the DL, the 9-th to 11-th symbols are unknown, and the 12-th and 13-th symbols are in the UL is configured as a format of the slot, the first 0-th to 8-th symbols may be configured as a measurement gap for DL measurement and the 12-th and 13-th symbols may be configured as a measurement gap for UL transmission according to the configuration.

Furthermore, one measurement gap may be formed from a series of the aforementioned slots. For example, the first 0-th to 8-th symbols in each of 10 consecutive slots may be configured as a measurement gap for DL measurement. Furthermore, the 12-th and 13-th symbols in each of the 10 consecutive slots may be configured as a measurement gap for UL transmission.

The symbols configured as unknown symbols in the slot may be configured as a measurement gap for DL measurement and/or a measurement gap for UL transmission.

The measurement gaps may be configured to avoid an overlap in time. The UE is operated so that the measurement gaps do not overlap in time. If the measurement gaps overlap in time, the UE may disable these measurement gaps.

As another method, if the UE receives overlapping configurations in measurement gap, the UE may prioritize the DL measurement in the overlapping portion. Alternatively, if the UE receives overlapping configurations in time, the UE may prioritize the UL transmission in the overlapping portion. These priorities may be statically predetermined, for example, in a standard, or semi-statically notified from the gNB to the UE via the RRC signaling.

When a plurality of measurement gaps are configured, the measurement gaps for DL measurement and the measurement gaps for UL transmission may be alternately configured.

Although configuring a plurality of measurement gaps is disclosed, one measurement gap may include a DL measurement section and a UL transmission section as another method. A duration of each of the sections should be configured. The method for configuring the UL transmission gap should be applied to configuring each of the sections.

When configuring, in advance, a DL transmission timing for the UE, for a UE group, or among cells in common, the gNB may provide the measurement gap for DL measurement with the DL transmission timing. Similarly, when configuring, in advance, a UL transmission timing for the UE, for a UE group, or among cells in common, the gNB may provide the measurement gap for UL transmission with the UL transmission timing. Furthermore, the gNB may provide the DL measurement section with the DL transmission timing. Furthermore, the gNB may provide the UL transmission section with the UL transmission timing.

The gNB should configure the DL measurement for the measurement gap duration for DL measurement, prior to the measurement gap duration for DL measurement. The gNB may notify, in advance, the UE of the measurement configuration to be used during the measurement gap duration for DL measurement. Consequently, the UE can perform the DL measurement in a measurement gap for DL measurement.

The methods for configuring the SRS should be applied to configuring the SRS to be transmitted during the measurement gap duration for UL transmission. Consequently, the UE can transmit the SRS during the measurement gap duration for UL transmission.

Figure 33:
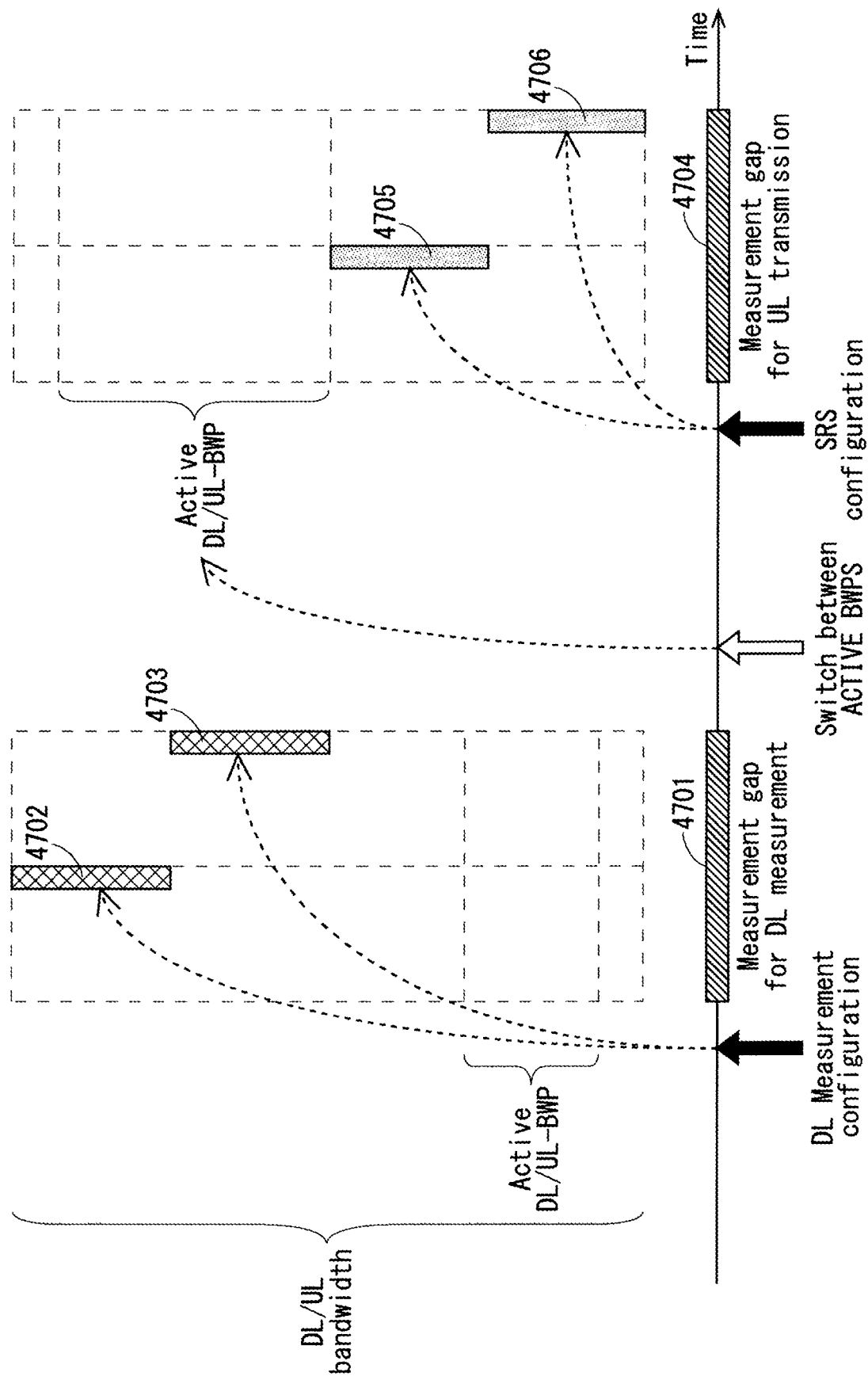
FIG. 33 illustrates an example of configuring a plurality of measurement gaps in the TDD according to the second embodiment.

FIG. 33 illustrates an example of configuring a plurality of measurement gaps in the TDD. The horizontal axis represents the time, and the vertical axis represents the frequency. The entire frequency band in the DL or the UL is illustrated in the frequency axis direction. The example herein illustrates a case where the active DL-BWP is identical to the active UL-BWP.

In FIG. 33, two measurement gaps are configured. One of them is a measurement gap for DL measurement, and the other is a measurement gap for UL transmission. FIG. 33 illustrates that the measurement gap for DL measurement is distant in time from the measurement gap for UL transmission.

4701 denotes the measurement gap for DL measurement, and 4704 denotes the measurement gap for UL transmission. The gNB configures these measurement gaps for the UE in advance. The measurement gap for DL measurement may differ in configuration from the measurement gap for UL transmission.

The DL measurement is performed in the measurement gap for DL measurement 4701. The black arrow prior to the measurement gap for DL measurement 4701 on the time axis represents a configuration of the DL measurement to be made by the gNB for the UE. The gNB notifies the UE of the configuration of the DL measurement prior to the measurement gap for DL measurement. The gNB may give the notification, for example, via the RRC signaling. 4702 and 4703 denote the resources for DL measurement that have been notified as the configuration for DL measurement. The UE performs the DL measurement with 4702 and 4703 outside the active DL-BWP.

The active DL-BWP and the active UL-BWP may be switched between the measurement gap for DL measurement 4701 and the measurement gap for UL transmission 4704. As indicated by the white arrow, the gNB switches between the active DL-BWP and the active UL-BWP for the UE. The UE switches between the active DL-BWP and the active UL-BWP.

The UL transmission is performed in the measurement gap for UL transmission 4704. The black arrow prior to the measurement gap for UL transmission 4704 on the time axis represents a configuration of the SRS to be made by the gNB for the UE. The gNB notifies the UE of the configuration of the SRS transmission prior to the measurement gap for UL transmission. The gNB may give the notification, for example, via the L1/L2 signaling. 4705 and 4706 denote the resources for SRS transmission that have been notified as the configuration for SRS transmission. The UE transmits the SRS with 4705 and 4706 outside the active UL-BWP.

As such, configuring the measurement gap for DL measurement and the measurement gap for UL transmission enables not only the DL measurement but also transmission of the SRS outside the active BWPs. Configuring the measurement gap for DL measurement remotely in time from the measurement gap for UL transmission can, for example, dynamically configure the SRS immediately prior to the measurement gap for UL transmission.

Figure 34:
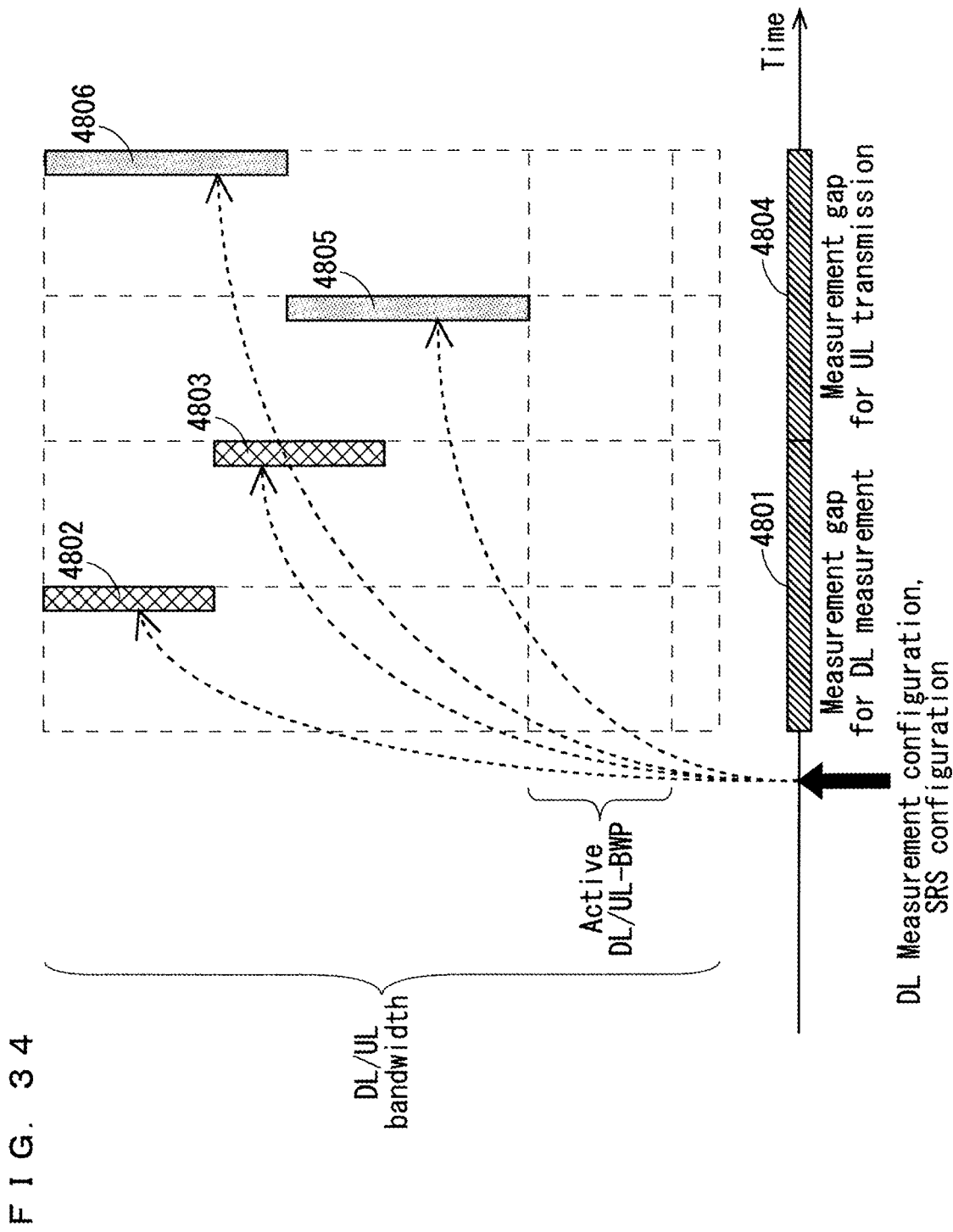
FIG. 34 illustrates another example of configuring a plurality of measurement gaps in the TDD according to the second embodiment.

FIG. 34 illustrates another example of configuring a plurality of measurement gaps in the TDD. Here, two measurement gaps are configured. One of them is a measurement gap for DL measurement, and the other is a measurement gap for UL transmission. FIG. 34 illustrates that the measurement gap for DL measurement and the measurement gap for UL transmission are continuous in time.

4801 denotes the measurement gap for DL measurement, and 4804 denotes the measurement gap for UL transmission. The gNB configures these measurement gaps for the UE in advance.

The DL measurement is performed in the measurement gap for DL measurement 4801. The black arrow prior to the measurement gap for DL measurement 4801 on the time axis represents configurations of the DL measurement and the SRS transmission to be made by the gNB for the UE. The gNB notifies the UE of the configurations of the DL measurement and the SRS transmission prior to the measurement gap for DL measurement. The gNB may give the notifications via different signalings. The gNB may configure, for example, the DL measurement via the RRC signaling and the SRS transmission via the L1/L2 signaling.

Furthermore, the gNB may configure the DL measurement and the SRS transmission via the same signaling. For example, the gNB may notify the UE of the configurations of the DL measurement and the SRS transmission via the same RRC signaling. This can reduce the amount of signaling.

4802 and 4803 denote the resources for DL measurement that have been notified as the configuration for DL measurement. The resources 4802 and 4803 are configured during the measurement gap duration for DL measurement. 4805 and 4806 denote the resources for SRS transmission that have been notified as the configuration for SRS transmission. The resources 4805 and 4806 are configured during the measurement gap duration for UL transmission. Upon receipt of the configuration for DL measurement, the UE performs DL measurement with 4802 and 4803 outside the active DL-BWP. Upon receipt of the configuration for SRS transmission, the UE transmits the SRS with 4805 and 4806 outside the active UL-BWP.

As such, the amount of signaling can be reduced by configuring the measurement gap for DL measurement and the measurement gap for UL transmission continuously in time and, for example, notifying the configuration for DL measurement and the configuration of the SRS via one signaling. Furthermore, reduction in time difference between the DL measurement and the UL transmission enables almost simultaneous execution of the DL measurement and the UL sounding.

The measurement gap, the UL transmission gap, the measurement gap for DL measurement, and the measurement gap for UL transmission may be used for DL communication or UL communication via a beam different from that for data communication. For example, a measurement gap may be used for DL measurement via a beam different from that for DL data communication. For example, a UL transmission gap may be used for UL transmission via a beam different from that for UL data communication. Since the DL measurement and the SRS transmission can be performed via the beam different from that for data communication, the inter-beam communication qualities in the DL and the UL can be obtained. The gNB can communicate with the UE via a more optimal beam.

According to the method on the measurement gap which is disclosed in the second embodiment, the UE can perform transmission outside the active BWP. Furthermore, the UE can transmit the SRS outside the active BWP. The transmission of the SRS outside the active BWP by the UE enables the gNB to evaluate the uplink communication quality outside the active BWP. Thus, the gNB can configure a more appropriate frequency band as a BWP for the UE.

The Third Embodiment

The BWP switching may be used as a method for transmitting the SRS outside the active BWP. The gNB performs the BWP switching for the UE. Consequently, the UE can transmit the SRS in the switched BWP.

However, the gNB can perform the conventional BWP switching only between four preconfigured BWPs at most for the UE. Thus, the UE has a problem of failing to transmit the SRS at a frequency outside the preconfigured BWPs, in the frequency band in the UL. This causes a problem of generating a frequency at which the UL sounding cannot be performed with the SRS. The third embodiment discloses a method for solving such a problem.

The gNB preconfigures a frequency at which the SRS is transmitted, as a BWP for the UE. The gNB notifies the UE of a configuration of the BWP. This means that the BWP is configured at the frequency at which the UE transmits the SRS. Thus, switching to the BWP enables the UE to transmit the SRS.

Another method is disclosed. The gNB preconfigures, for the UE, a BWP whose band is the entire frequency band in the UL. Consequently, the UE can transmit the SRS at any frequency in the UL by switching to the BWP.

However, since BWPs are configured for UL sounding in such a method, the method reduces the number of configurable BWPs that can be used, for example, for communication other than UL sounding (BWPs for communication other than those for UL sounding) such as the conventional BWPs. For example, when the entire frequency band in the UL is a wide band and a frequency band supported by the UE is a narrow band, the communication other than the UL sounding requires configuring many BWPs. However, reduction in the number of configurable BWPs reduces the frequency band where communication is possible, and leads to degradation in communication quality between the gNB and the UE.

Furthermore, when the UL frequency band includes a plurality of numerologies, the BWP is provided for each of the numerologies. Thus, the BWP whose band is the entire frequency band in the UL cannot be configured.

A method for solving such problems is disclosed. The maximum number of the BWPs to be configured is increased. The value four at most has been configured in consideration of the number of BWPs to be used for communication other than the UL sounding. Thus, considering that the BWPs are used for UL sounding, the maximum number of the BWPs should be increased. For example, a value necessary for sounding the entire frequency band in the UL may be calculated from the lowest frequency band supported by the UE and the entire frequency band in the UL. Then, a value obtained by adding 4 to the calculated value may be used as the maximum value.

The maximum number of the BWPs to be configured may be statically determined, for example, in a standard. Alternatively, the gNB may configure the maximum number of the BWPs to be configured for each UE or for each UE group. Furthermore, the UE may notify the gNB of the maximum number of supportable BWPs to be configured. The gNB may configure the BWPs for the UE, using the maximum number of supportable BWPs to be configured which has been notified from the UE.

This does not reduce the number of configurable BWPs to be used for the communication other than the UL sounding, even when the BWPs for UL sounding are configured. Thus, the flexibility of the BWP switching can be maintained, and the degradation in communication quality between the gNB and the UE can be reduced.

However, increase in the maximum number of BWPs to be configured may cause the following problem. Each time a frequency at which the SRS is transmitted is changed, a method for preconfiguring the frequency at which the SRS is transmitted as a BWP requires change in the configuration of the BWP according to the frequency at which the SRS is transmitted. Even in the absence of change in the configuration of the BWP to be used for the communication other than the UL sounding, the configuration of the BWP for the UE needs to be changed. This leads to increase in the amount of signaling information required to preconfigure the BWP between the gNB and the UE.

Furthermore, since the method for configuring the BWP whose band is the entire frequency band in the UL requires the UE to support the entire frequency band in the UL, the power consumption, complexity in the circuit structure, and the manufacturing cost increase in the UE.

A method for solving such problems is disclosed.

A BWP for UL sounding is provided. A BWP for transmitting the SRS may be provided. The BWP for UL sounding is hereinafter referred to as a sounding BWP. The sounding BWP may be configured separately from the BWP to be used for communication other than the UL sounding. Consequently, the gNB need not notify the UE of information on the configuration of the BWP to be used for the communication other than the UL sounding, each time the frequency at which the SRS is transmitted is changed. This can suppress increase in the amount of signaling information required for the gNB to configure the BWP for the UE.

One or more BWPs are configured as sounding BWPs. The gNB configures one or more BWPs for the UE. The gNB may configure one or more sounding BWPs as a group. For example, a part of the configured sounding BWPs may be included in the same group of sounding BWPs. In this case, a configuration common to the group of sounding BWPs may be made separately from the configuration for each of the sounding BWPs. The provision of the configuration common to the group of sounding BWPs can reduce the amount of information that needs to be signaled to the UE.

The configuration of the sounding BWP may be changed for each transmission of the SRS. An appropriate sounding BWP can be configured as necessary, and the SRS can be transmitted in the sounding BWP.

Configurations of a plurality of sounding BWPs may be switched and used. The gNB notifies the UE of which sounding BWP is used from among the configured sounding BWPs. Since the gNB need not notify the configuration of the sounding BWP for each transmission of the SRS, the amount of signaling can be reduced.

As such, the sounding BWP in which the UE can transmit the SRS may be defined as an active sounding BWP.

The sounding BWPs may have an overlap in frequency. The reliability of the sounding can be enhanced. Alternatively, the sounding BWPs may be configured without an overlap in frequency. For example, when the entire frequency band in the UL consists of sounding frequencies, fewer sounding BWPs need to be configured. Thus, the number of transmissions of the SRS from the UE can be reduced.

The sounding BWPs may have the same BWP frequency bandwidth. Since the UE need not change the bandwidth each time the sounding BWP is changed, the control can be simplified. Alternatively, the sounding BWPs may have the different BWP frequency bandwidths. The frequency bandwidth necessary for transmitting the SRS can be flexibly configured.

The SRS is transmitted within the sounding BWP. The gNB configures transmission of the SRS within the sounding BWP for the UE. The frequency band of the sounding BWP may be identical to the transmission band of the SRS. Furthermore, the frequency band of the sounding BWP may be configured by one transmission of the SRS. Consequently, the sounding BWP can be used for transmitting the SRS.

Although transmission of the SRS in the sounding BWP is disclosed, the sounding BWP may have the same functions or a part of the functions as those of the BWPs for communication other than those for sounding. For example, the UE may transmit not only the SRS but also a predetermined UL signal or a predetermined UL channel in the sounding BWP. For example, the UE can transmit, in the sounding BWP, an Ack/Nack response to the HARQ for the PDSCH. Since the UE can transmit the HARQ response early without waiting for the end of the sounding BWP duration, the lower latency characteristics can be obtained.

A method for configuring the sounding BWP is disclosed. The following (1) to (7) are disclosed as pieces of information on configuring the sounding BWP.
(1) A sounding BWP identifier
(2) A subcarrier spacing (SCS)
(3) A cyclic prefix (CP)
(4) The number of PRBs
(5) The PRB number
(6) A sounding BWP duration
(7) Combinations of (1) to (6) above (1) may be an identifier for identifying the configured sounding BWP.
(2) may be a symbol duration instead of the SCS. Alternatively, an identifier for identifying the numerology may be used.
(3) may be an identifier for identifying the CP, instead of a value of the CP.

The first PRB number of a BWP may be used instead of (5). The smallest PRB number may be used. The use of the first PRB number and the number of PRBs in (4) can identify a frequency band in which the BWP is configured.

(6) may be configured per radio frame, per subframe, per slot, per mini-slot, or per symbol. Alternatively, (6) may be configured per time unit such as per millisecond. Notification of the sounding BWP duration as information in configuring the sounding BWP saves, for example, notification of a duration each time the sounding BWP is switched. This can reduce the amount of signaling.

The gNB notifies the UE of information on the configuration of the sounding BWP to configure the sounding BWP. The UE configures the sounding BWP with the information on the sounding BWP notified from the gNB. The notification method may be the RRC signaling. The gNB may notify the information on the sounding BWP dedicatedly to each UE, for each UE group, or for each cell. When giving the notification for each cell, the gNB may include the information on the sounding BWP in the broadcast information to broadcast the information.

The configuration of the sounding BWP may be statically predetermined, for example, in a standard. This can reduce the amount of signaling.

The gNB notifies the UE of switching to the sounding BWP. The gNB may perform the switching by selecting a sounding BWP to be used next from among one or more sounding BWPs that have been configured for the UE. The gNB may switch from the BWP for communication other than those for sounding to the sounding BWP, or switch between the sounding BWPs. The gNB notifies the UE of information for the switching. Upon receipt of the information for the switching, the UE switches to the sounding BWP according to the information. The following (1) to (6) indicate examples of the information for the switching.
(1) Information indicating switching to the sounding BWP
(2) An identifier of the switched sounding BWP
(3) The start timing of the sounding BWP
(4) A sounding BWP duration
(5) The end timing of the sounding BWP
(6) Combinations of (1) to (5) above With the information in (1), the UE can explicitly recognize switching to the sounding BWP. The UE can recognize that the instruction is different from the instruction for switching between the BWPs for communication other than those for sounding. Thus, malfunctions can be reduced.

The identifier of the sounding BWP in (2) should be distinguished from an identifier of a BWP for communication other than those for sounding. In this case, the information in (2) can omit the information in (1). Furthermore, the identifier of the sounding BWP need not be distinguished from the identifier of the BWP for communication other than those for sounding. An identifier in the same sequence may be used. Consequently, the identifier can be used not only for the sounding BWP but also for the BWP for communication other than those for sounding. Thus, the number of the identifiers to be prepared can be reduced.

(3) to (5) are pieces of information on a sounding BWP configuration duration. These may be configured per radio frame, per subframe, per slot, per mini-slot (non-slot), or per symbol. Alternatively, (3) to (5) may be configured per time unit such as per millisecond.

The information for the switching may be notified dedicatedly to each UE, for each UE group, or for each cell. When giving the notification for each cell, the gNB may include the information for the switching in the broadcast information to broadcast the information. The method for notifying the information for the switching may be the RRC signaling. Another notification method may be the MAC signaling. The notification to the switching can be expedited.

Another notification method may be the L1/L2 signaling. The gNB may include the information for the switching in the DCI to notify the information with the PDCCH. For example, when giving the notification for each UE group, the gNB may give the notification with the group common PDCCH. With the L1/L2 signaling, the notification to the switching can be further expedited.

Disclosed is that the sounding BWP may be switched per mini-slot or per symbol. Consequently, the switching of the sounding BWP and transmission of the SRS in the BWP can be performed more timely and flexibly. The active DL-BWP and/or the active UL-BWP to be used for communication other than sounding may be switched per mini-slot or per symbol. Consequently, the frequency band in which the PDSCH or the PUSCH is transmitted can be switched more timely and flexibly. The frequency band with more favorable communication quality can be used per smaller time unit.

The gNB may notify the UE only of the switching to the sounding BWP. The gNB may notify the UE only of information for switching to the sounding BWP. A DCI format solely for switching to the sounding BWP may be provided. When such a DCI format is configured dedicatedly for each UE, the UE receives the PDCCH using the RNTI configured for each UE. When the DCI format is configured for each UE group, the UE receives the PDCCH using the RNTI configured for each UE group. When the DCI format is configured for each cell, the UE receives the PDCCH using the RNTI configured for each cell.

Disclosed is that the DCI format solely for switching to the sounding BWP may be provided. A DCI format solely for switching to the active BWP for communication other than sounding may be provided. For example, when only the SRS is desirably transmitted in the BWP for communication other than those for sounding, the scheduling information of the other channels is unnecessary.

Since this saves inclusion of the other information in the DCI, the amount of signaling information can be reduced.

The DCI format to be used for switching to the BWP for communication other than those for sounding may be used for switching to the sounding BWP. Information indicating switching between the BWPs should be applied to switching to the BWP for communication other than those for sounding and to the sounding BWP. In addition to the information indicating switching between the BWPs, information indicating an identifier of the sounding BWP or an identifier of the BWP for communication other than those for sounding may be added.

To switch from the sounding BWP to the BWP for communication other than those for sounding, the gNB should include the information for switching to the active BWP in the DCI to notify the information with the PDCCH. The DCI format to be used for switching to the BWP for communication other than those for sounding may be used.

As another method, restoring a configuration to the immediately preceding configuration of the BWP for communication other than those for sounding, after expiration of the sounding BWP configuration duration may be statically predetermined, for example, in a standard. Information on the sounding BWP configuration duration is configured as the information on the switching to the sounding BWP. Upon receipt of the information on the switching to the sounding BWP, the UE restores the configuration to the immediately preceding configuration of the BWP for communication other than those for sounding according to the information on the sounding BWP configuration duration, after expiration of the sounding BWP configuration duration.

The sounding BWP configuration duration may be managed using a timer. The UE restores the configuration to the immediately preceding configuration of the BWP for communication other than those for sounding, after expiration of the timer. The gNB enables the UE to reliably transmit the SRS outside the active BWP by managing a configuration duration appropriate for the sounding BWP using the timer.

The sounding BWP configuration duration may be statically predetermined, for example, in a standard. Since the gNB need not include information on the sounding BWP configuration duration in information on the switching to the sounding BWP to notify the UE of the information, the amount of information to be signaled can be reduced.

Since the gNB need not notify the UE to switch from the sounding BWP to the BWP for communication other than those for sounding, the amount of signaling can be reduced. Since the UE restores the configuration to the immediately preceding configuration of the BWP for communication other than those for sounding, the communication quality of the UE can be restored to its immediately preceding state even when the UE shifts to the sounding BWP configuration duration. Thus, a favorable communication quality can be maintained, and failures in a radio link can be reduced.

Figure 35:
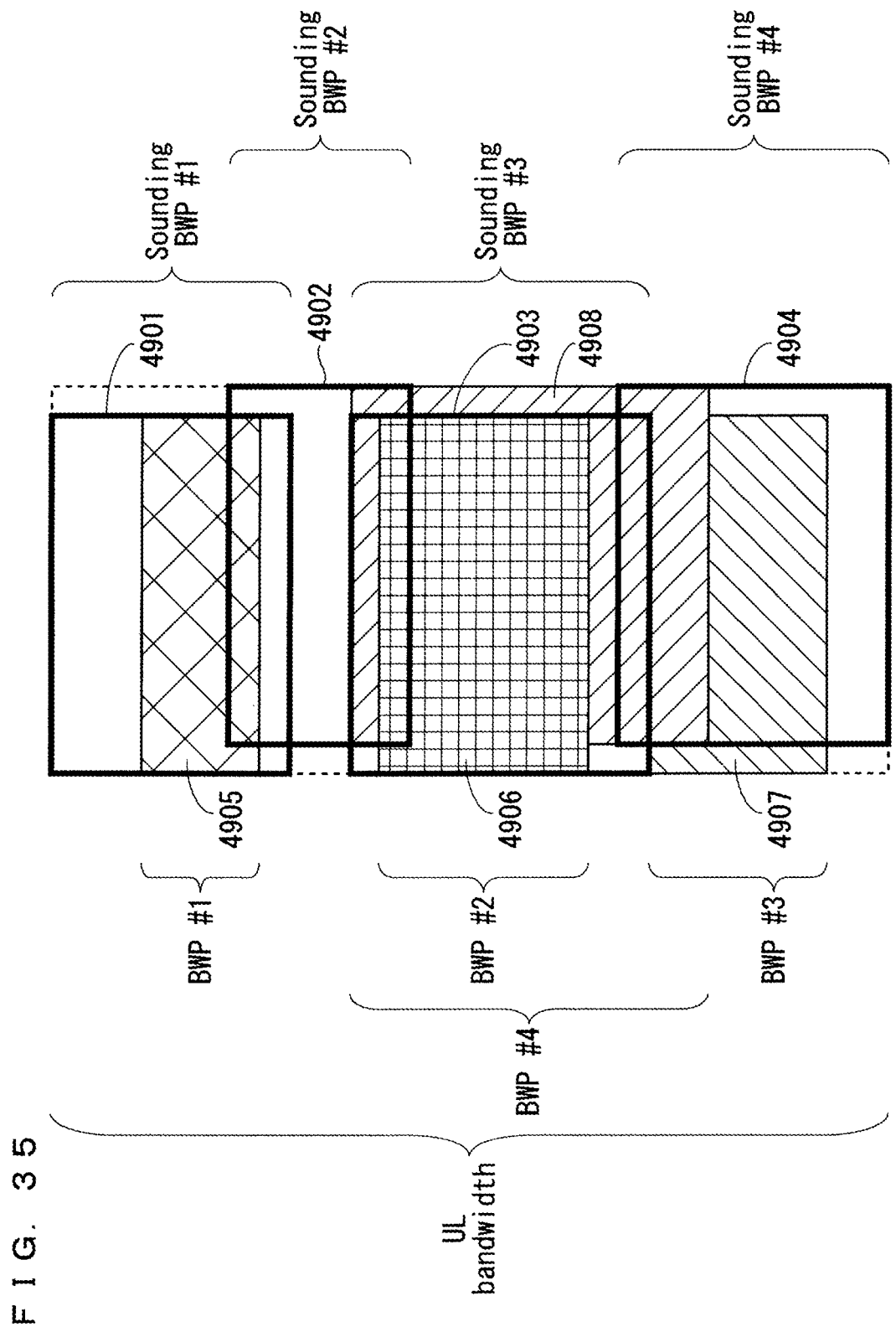
FIG. 35 illustrates an example of how to provide sounding BWPs according to the third embodiment.

FIG. 35 illustrates an example where sounding BWPs are provided. The vertical axis represents the UL frequency band. The sounding BWPs are configured separately from the BWPs for communication other than those for UL sounding. The gNB configures the sounding BWPs separately from the BWPs for communication other than those for UL sounding, and notifies the UE of the configuration. The gNB should give the notification, for example, via the RRC signaling.

The gNB should configure, for the UE, a sounding BWP according to the configuration of the SRS transmission at a preconfigured UL frequency. Furthermore, the gNB may configure, for the UE, the SRS transmission in each of the sounding BWPs. The methods disclosed in the second embodiment may be appropriately applied to these configurations of the SRS transmission. As such, the gNB enables the UE to transmit the SRS in the sounding BWPs.

As another method, the gNB may configure, for the UE, the SRS transmission according to the configuration of the sounding BWPs. Furthermore, the gNB should configure, for the UE, the SRS transmission in each of the sounding BWPs. The methods disclosed in the second embodiment may be appropriately applied to these configurations of the SRS transmission. As such, the gNB enables the UE to transmit the SRS in the sounding BWPs.

As another method, the gNB may configure, for the UE, the sounding BWPs to include the entire UL frequency band. Furthermore, the gNB should configure, for the UE, the SRS transmission in each of the sounding BWPs. The methods disclosed in the second embodiment may be appropriately applied to these configurations of the SRS transmission. As such, the gNB enables the UE to transmit the SRS in the sounding BWPs in the entire UL frequency band.

As another method, the UE may switch to the sounding BWP according to the configuration of the SRS transmission at a preconfigured UL frequency. For example, the UE may determine a sounding BWP to be a switching destination, according to the configuration of the SRS transmission.

As another example, a relationship between the configuration of the SRS transmission and the sounding BWP to be used for transmitting the SRS may be preconfigured. For example, the gNB preconfigures the sounding BWP to be used for configuring each SRS transmission, and notifies the UE of the configuration. The UE should determine the sounding BWP to be a switching destination, according to the configuration. The gNB may notify the configuration via the RRC signaling, the MAC signaling, or the L1/L2 signaling. The gNB may notify the configuration together with the configuration of the SRS transmission and/or the configuration of the sounding BWP. Consequently, the notification in switching to the sounding BWP can be unnecessary. The amount of signaling can be reduced.

For example, the relationship between the configuration of the SRS transmission and the sounding BWP to be used for transmitting the SRS may be statically preconfigured, for example, in a standard. The gNB need not notify the UE of the configuration. For example, the same transmission band may be configured for the sounding BWP and the SRS as the relationship between the configuration of the SRS transmission and the sounding BWP to be used for transmitting the SRS. For example, the UE can easily determine the configuration of the sounding BWP to be a switching destination.

The UE may switch to the active BWP for communication other than that for the immediately previous sounding, after transmitting the SRS. The UE switches to the active BWP after transmitting the SRS, even in the absence of the notification of switching to the active BWP from the gNB. This can reduce the amount of signaling.

In FIG. 35, a BWP #1 of 4905, a BWP #2 of 4906, a BWP #3 of 4907, and a BWP #4 of 4908 are configured as the BWPs for communication other than those for sounding.

In FIG. 35, for example, the gNB configures, for the UE, the sounding BWPs to include the entire UL frequency band. 4901 denotes a sounding BWP #1. 4902 denotes a sounding BWP #2. 4903 denotes a sounding BWP #3. 4904 denotes a sounding BWP #4. The sounding BWPs #1 to #4 are configured to cover the entire UL frequency band.

Furthermore, the gNB configures, for the UE for each sounding BWP, the SRS transmission within the sounding BWP. Consequently, the UE can recognize the configuration of the SRS transmission in the sounding BWP, and transmit the SRS.

The gNB selects the sounding BWP to be used next from among the four sounding BWPs configured for the UE to perform switching. The gNB may switch from the BWP for communication other than those for sounding to the sounding BWP, or switch between the sounding BWPs. For example, the gNB configures, for the UE, the BWP #1 as an active BWP for communication other than sounding.

Suppose that this BWP #1 is switched to the sounding BWP #1. The gNB includes information for the switching in the DCI to notify the UE of the information with the PDCCH. Upon receipt of the information for the switching, the UE switches to the sounding BWP #1 according to the information. The UE transmits the SRS in the sounding BWP #1 with the configuration of the SRS transmission which has been previously made.

For example, the gNB switches from the sounding BWP #1 to the BWP #1 that is a BWP for communication other than those for sounding to perform normal communication with the UE. Here, the switched BWP need not be the original BWP #1. For example, the gNB may switch to the BWP #2, the BWP #3, or the BWP #4. The gNB should include the information for switching to the BWP for communication other than those for sounding in the DCI to notify the UE of the information with the PDCCH.

As another method, when the sounding BWP configuration duration is configured in a standard or when the gNB configures the sounding BWP configuration duration for the UE, the UE should restore the configuration to the configuration of the BWP #1 that is a BWP for communication other than those for sounding. This can reduce the information for switching to the BWP for communication other than those for sounding.

One or more configurations of sounding BWPs may be grouped into one group. This group is hereinafter referred to as a sounding BWP set. The sounding BWP may be switched using the sounding BWP set. As a configuration of consecutively switching between the sounding BWPs in the sounding BWP set, information indicating switching to the sounding BWP set may be provided. The information may be included in the information indicating switching to the sounding BWP. The information may include the order of the sounding BWPs to be switched in the sounding BWP set.

Alternatively, the order of switching between the sounding BWPs may be statically predetermined, for example, in a standard. For example, switching between the sounding BWPs in the descending order or the ascending order of identifiers of the sounding BWPs may be predetermined. This reduces the amount of information to be notified from the gNB to the UE. As such, consecutively switching between the sounding BWPs enables transmission of the SRS in the entire UL frequency band. The sounding is possible in the entire UL frequency band.

The method for transmitting the SRS by switching between the BWPs is disclosed above. Another method is disclosed. Although one active BWP is conventionally configured for the UE, a plurality of active BWPs are configurable. A plurality of active DL-BWPs may be configurable. Furthermore, a plurality of active UL-BWPs may be configurable. Consequently, the UE can transmit the SRS within the plurality of active BWPs. Thus, it is unnecessary to switch between the BWPs.

A scheduling method in configuring a plurality of active BWPs is disclosed. In the DL, scheduling is performed for each active DL-BWP. Transmission of a DL signal or a DL channel and transmission of the scheduling information corresponding to the transmission of the DL signal or the DL channel are performed using the same active DL-BWP. The scheduling for transmitting a UL signal or a UL channel is performed in an arbitrary active DL-BWP. The scheduling information should include an identifier of the active UL-BWP to be scheduled. Upon receipt of the identifier of the active UL-BWP, the UE can recognize scheduling in which active UL-BWP.

As another scheduling method, transmission of the DL signal or the DL channel and transmission of the scheduling information corresponding to the transmission of the DL signal or the DL channel may be performed using different active DL-BWPs. The scheduling information should include identifiers of the active DL-BWPs to be scheduled. Upon receipt of the identifiers of the active DL-BWPs, the UE can recognize scheduling of which active DL-BWPs.

The scheduling information is included in the DCI to be notified with the PDCCH. The gNB may assign numbers to one or more BWPs to be configured when preconfiguring the BWPs for the UE. The gNB may assign the numbers in the DL-BWP. The gNB may assign the numbers in the UL-BWP. The numbers may be used as the identifiers of the active UL-BWPs or the identifiers of the active DL-BWPs to be included in the scheduling information. Since the active BWP can be represented by less amount of information than that when the identifier is used, the amount of information can be reduced.

The scheduling may be performed in one active DL-BWP among a plurality of active DL-BWPs. The gNB performs scheduling in the one active DL-BWP for the UE. The one active DL-BWP is hereinafter referred to as a primary active DL-BWP. Consequently, the UE need not receive the scheduling information in all the active DL-BWPs. Thus, the power consumption of the UE can be reduced.

A plurality of active BWPs are configured from a plurality of BWP configurations previously made. The gNB selects, for the UE, a plurality of active BWPs from the plurality of BWP configurations previously made and notifies the UE of the plurality of active BWPs. Identifiers of the respective BWPs should be used as information indicating the selected plurality of active BWPs.

The gNB may give the notification via the L1/L2 signaling similarly to the notification of the conventional active BWPs. The gNB includes information on the plurality of active BWPs in the DCI to notify the information with the PDCCH. Another method for notifying the active BWPs may be the MAC signaling. Since the reception error rate in the UE can be reduced, malfunctions can be reduced.

When the scheduling is performed in an arbitrary active DL-BWP, the UE monitors the scheduling information of the active DL-BWP according to the received information on the active DL-BWP. Consequently, the UE can perform reception in the active DL-BWP and transmission in the active UL-BWP.

In a method of performing scheduling in one active DL-BWP, the gNB should notify the UE of information on the active DL-BWP in which the scheduling is performed. The UE monitors the scheduling information of the active DL-BWP in which the scheduling is performed. The gNB may notify the UE of the information on the active DL-BWP in which the scheduling is performed together with information on the active BWP. Consequently, the gNB can perform scheduling in the one active DL-BWP.

The PRACH or the PUCCH may be transmitted in one active UL-BWP. The gNB should notify the UE of information on the active UL-BWP. The gNB may notify the UE of the information together with the information on the active BWP. Consequently, the PRACH or the PUCCH can be transmitted in one active UL-BWP.

The SRS may be transmitted in a plurality of active UL-BWPs. The UE can transmit the SRS within the plurality of active UL-BWPs. The gNB configures, for the UE, the SRS for each active UL-BWP. Alternatively, the gNB may configure the SRS for the entire frequency band in the UL. The gNB should enable transmission of only the SRS configuration within the active UL-BWPs when configuring the SRS for the entire frequency band in the UL. The SRS configuration disclosed in the second embodiment should be applied to the aforementioned SRS configuration. The gNB notifies the UE of information on the SRS configuration.

Upon receipt of information on the SRS configuration for each active UL-BWP from the gNB, the UE transmits the SRS in a corresponding active UL-BWP using the information on the SRS configuration. When the configuration is for transmitting the aperiodic SRS, the gNB should notify information for identifying a slot in which the SRS is transmitted, via the L1/L2 signaling. The information may be a slot number or an offset value from the received slot. The offset value should be configured per slot. The gNB may notify the information in an arbitrary active DL-BWP or a primary active DL-BWP.

Simultaneous transmission of the SRSs in a plurality of active UL-BWPs may be avoided. The SRS transmission timings should be configured to be different from one another between the active UL-BWPs. The UE does not simultaneously transmit the SRSs in a plurality of active UL-BWPs. For example, the symbols in which the SRS is transmitted may be different from one another in configuring the SRS in each of the active UL-BWPs. Since the SRS transmission timings are different from one another between the active UL-BWPs, the UE does not simultaneously transmit the SRSs in the plurality of active UL-BWPs.

Consequently, the transmission from the UE can be performed with low distortion. Furthermore, the power consumption can be reduced.

The UE may transmit the SRS in a part of the plurality of active UL-BWPs, and transmit the other UL signals or UL channels in the other active UL-BWPs. The UE does not transmit the SRS and the other UL signals or UL channels in the same active UL-BWP. Since the control is simplified, malfunctions can be reduced.

Simultaneous transmission of the SRSs and the other UL channels or UL signals in a plurality of active UL-BWPs may be avoided. The UE does not transmit the SRS and the other UL channels or UL signals in the plurality of active UL-BWPs. The transmission from the UE can be performed with low distortion. Furthermore, the power consumption can be reduced.

When a plurality of active BWPs have an overlap in frequency range, a priority may be assigned to each of the active BWPs. The priorities may be statically predetermined, for example, in a standard. The gNB and the UE can mutually recognize the priorities. Furthermore, the gNB may notify the UE of the priorities. The gNB may notify the priorities dedicatedly to each UE or for each UE group. Alternatively, the gNB may notify the priorities for each cell. The gNB may notify the priorities via the RRC signaling or the MAC signaling. Alternatively, the gNB may notify the priorities via the L1/L2 signaling. When giving the notification for each cell, the gNB may include the priorities in the broadcast information to broadcast the priorities.

Consequently, the UE can recognize, in the DL, scheduling information of which active DL-BWP should be prioritized and monitored. For example, this is effective when the resources to which the scheduling information is mapped overlap between the active DL-BWPs.

Furthermore, the UE can recognize, in the UL, in which active UL-BWP transmission of the UL signals or the UL channels should be prioritized and performed. For example, this is effective when the transmission timings and the frequencies of the UL signals or the UL channels overlap between the active UL-BWPs.

According to the methods disclosed in the third embodiment, transmission of the SRS in the UL frequency band can be appropriately configured. Since the UL sounding is possible in a desired UL frequency band, the communication quality can be improved.

The Fourth Embodiment

When one UE has transmission of two PUSCHs with different latency requirements, the transmission of the PUSCHs may be allocated to the same time and/or frequency resources. For example, in the presence of transmission of a PUSCH requiring a normal latency (may be hereinafter referred to as a normal latency PUSCH) and transmission of a PUSCH requiring a low latency (may be hereinafter referred to as a low latency PUSCH), when the transmission of the low latency PUSCH is allocated to a part of symbols in a slot to which the transmission of the normal latency PUSCH is allocated, allocations of the time and/or frequency resources may overlap.

The UE may prioritize the transmission of the low latency PUSCH in the slot. In other words, the UE need not transmit the normal latency PUSCH in the slot. Alternatively, the UE may transmit the normal latency PUSCH only until the start of transmission of the low latency PUSCH. Alternatively, the UE need not transmit the normal latency PUSCH with the time and/or frequency resources which collide with those for the transmission of the low latency PUSCH. Alternatively, the UE may transmit the normal latency PUSCH after the slot.

When a BWP to be used for the low latency PUSCH (may be hereinafter referred to as a low latency BWP) is different from a BWP to be used for the normal latency PUSCH (may be hereinafter referred to as a normal latency BWP), application of the aforementioned operations cause the following problem. For example, suppose that the low latency PUSCH is scheduled while the normal latency PUSCHs are consecutively scheduled for each slot. Here, the PDCCH in which the normal latency PUSCHs are scheduled does not include a notification for switching between the BWPs. Furthermore, a duration from the PDCCH in which the normal latency PUSCHs are scheduled to the start of transmission of the PUSCHs includes the PDCCH in which the low latency PUSCH is scheduled and the low latency PUSCH. The BWP to be used by the UE has been switched to the low latency BWP when the low latency PUSCH is transmitted. Furthermore, the PDCCH in which the normal latency PUSCHs are scheduled does not include a notification for switching between the BWPs. Thus, the UE cannot transmit the normal latency PUSCHs after transmitting the low latency PUSCH. This may reduce the transmission rate of the PUSCH in the communication system. This may also cause a variance in the BWP to be used by the UE between the base station and the UE, which may further cause a malfunction.

Figure 36:
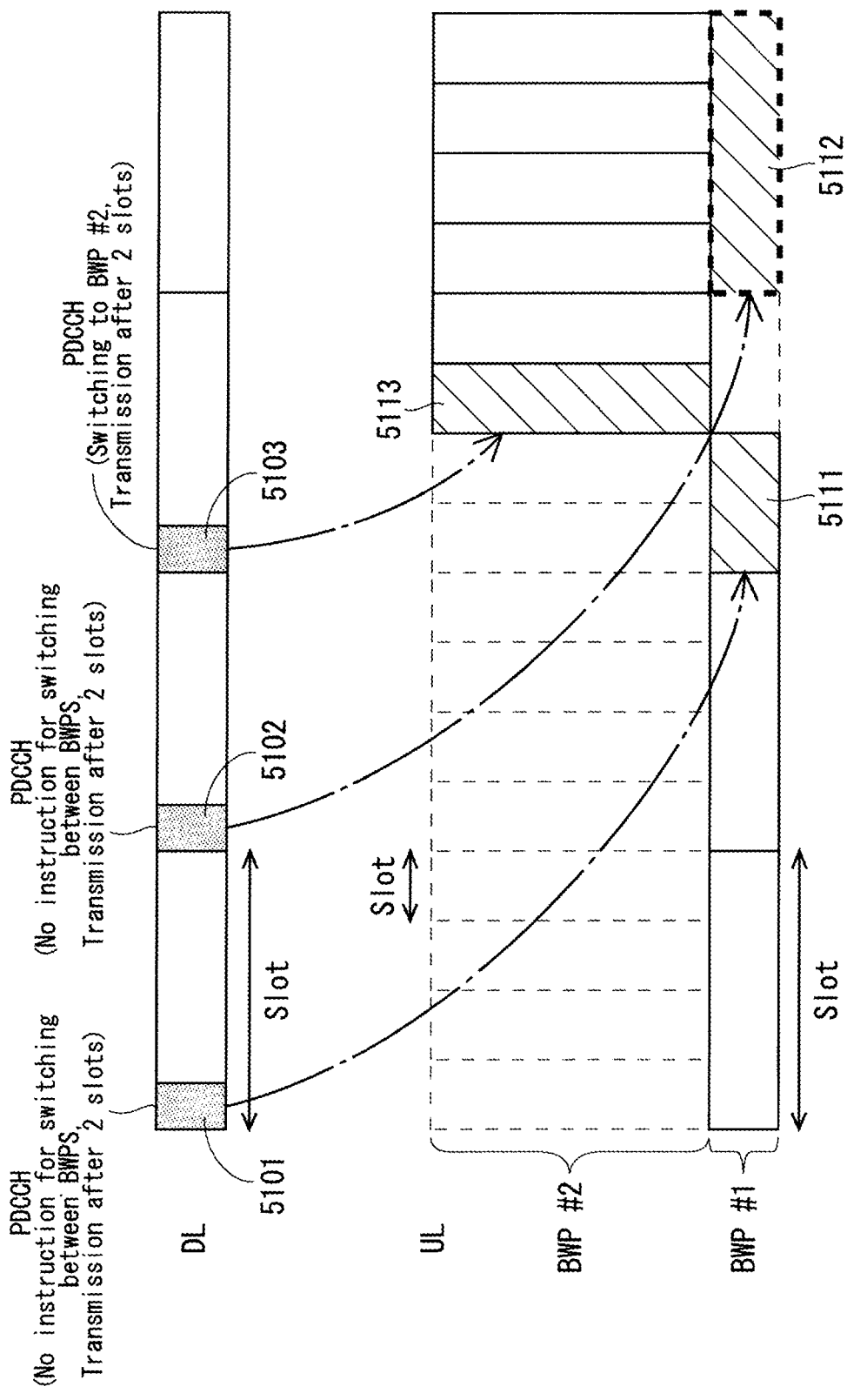
FIG. 36 illustrates a problem when a low latency PUSCH and normal latency PUSCHs differ in use BWP according to the fourth embodiment.

FIG. 36 illustrates a problem when the low latency PUSCH and the normal latency PUSCHs differ in use BWP. In FIG. 36, a BWP #1 represents the normal latency BWP, and a BWP #2 represents the low latency BWP. FIG. 36 illustrates an example where the BWP #1 and the BWP #2 have different numerologies.

In FIG. 36, the base station transmits each of PDCCHs 5101, 5102, and 5103 to the UE. Although each of the PDCCHs 5101 and 5102 includes information on the PUSCH to be allocated after two slots and transmitted using the BWP #1, they do not include an instruction for switching between the BWPs. The PDCCH 5103 includes information on the PUSCH to be allocated after two slots in the BWP #2, and an instruction for switching from the BWP to the BWP #2. Since a slot of the BWP #2 which is allocated by the PDCCH 5103 is allocated in the middle of a slot of the BWP #1 which is allocated by the PDCCH 5101, the UE transmits a PUSCH 5111 in the BWP #1 until the middle of the slot, and then switches to the BWP #2 to transmit a PUSCH 5113. However, since the PDCCH 5102 does not include the instruction for switching between the BWPs, the UE cannot transmit a PUSCH 5112 in the next slot of the BWP #1.

Although FIG. 36 illustrates the case where the BWP #1 and the BWP #2 have different numerologies, the same problem occurs even when both of the BWP #1 and the BWP #2 have the same numerology. For example, the same problem occurs upon configuring a duration from the PDCCH in which the low latency PUSCH is scheduled to the start of transmission of the PUSCH to be shorter than a duration from the PDCCH in which the normal latency PUSCHs are scheduled to the start of transmission of the PUSCHs.

A solution to the problems is disclosed.

The UE need not switch from the low latency BWP to the normal latency BWP. The UE need not transmit the scheduled normal latency PUSCHs. The UE may discard information on the scheduling of the PUSCHs. The base station may schedule the normal latency PUSCHs again for the UE. The information on the scheduling may include information on the switching between the BWPs. The UE switches from the use BWP to the normal latency BWP with the information on the switching between the BWPs. Accordingly, the UE can transmit the normal latency PUSCHs.

Another solution is disclosed. The UE may switch from the low latency BWP to the normal latency BWP. The UE may transmit the scheduled normal latency PUSCHs. The UE may switch between the BWPs even when the scheduling information of the normal latency PUSCHs does not include the instruction for switching between the BWPs. This can, for example, increase the transmission rate of the normal latency PUSCHs.

Another solution is disclosed. The base station may notify the UE of information on the switching between the BWPs after transmitting the PUSCH. The information may be included in the information on the scheduling of the PUSCH. The information may be, for example, information indicating whether the use BWP is restored to the original BWP after transmitting the PUSCH. With the information, the UE may switch between the use BWPs after transmitting the PUSCH. The UE may, for example, restore the use BWP to the original normal latency BWP after transmitting the PUSCH. This can, for example, prevent a variance in the use BWP between the base station and the UE in the presence of scheduling of the PUSCHs with different latencies.

The information on the switching between the BWPs after transmitting the PUSCH may be similarly applied to the scheduling of the PDSCH. This produces, for example, the same advantages as previously described.

Another solution is disclosed. The base station may notify the UE of only the PUSCH scheduling information including the instruction for switching between the BWPs. The DCI including the instruction for switching between the BWPs, for example, the DCI format 0_0 (see Non-Patent Document 25 (3GPP TS38.212 v15.0.0)) need not be used for the uplink grant from the base station to the UE. Information on the BWPs included in the instruction for switching between the BWPs may be identical to or different from that on the BWPs being used by the UE. The aforementioned operations may be applied, for example, when a plurality of BWPs are configured for the UE. The UE need not expect to receive the DCI that does not include the instruction for switching between the BWPs. The UE may receive only the PUSCH scheduling information including the instruction for switching between the BWPs. The UE may perform an irregular process on reception of the DCI that does not include the instruction for switching between the BWPs. The UE may discard the PUSCH scheduling information that does not include the instruction for switching between the BWPs. As another example, the UE may notify the base station of occurrence of irregularities. The notification may include information on receiving the DCI that does not include the instruction for switching between the BWPs. This can, for example, prevent a variance in the use BWP between the base station and the UE in the presence of scheduling of the PUSCHs with different latencies.

The low latency BWP and the normal latency BWP may be identical or different in numerology according to the fourth embodiment. For example, even when both of the BWPs have the same numerology, application of the methods described in the fourth embodiment can prevent a variance in the use BWP between the base station and the UE.

The fourth embodiment can prevent a variance in the BWP to be used by the UE between the base station and the UE. Consequently, malfunctions in the communication system can be prevented.

The Fifth Embodiment

In transmission of the PUSCH, a slot duration from reception of the PDCCH including the uplink grant to transmission of the PUSCH by the UE is given per slot length of the PUSCH (see Non-Patent Document 15 (TS 38.214 v15.0.0)).

Here, the following problem occurs. Specifically, when the downlink and the uplink have different numerologies, particularly, when the slot length in the downlink is greater than that in the uplink, the slot durations from receipt of the PDCCH to transmission of the PUSCH vary, depending on a position of an uplink slot. Consequently, latencies in the transmission of the PUSCH vary, depending on the position of the slot.

Figure 37:
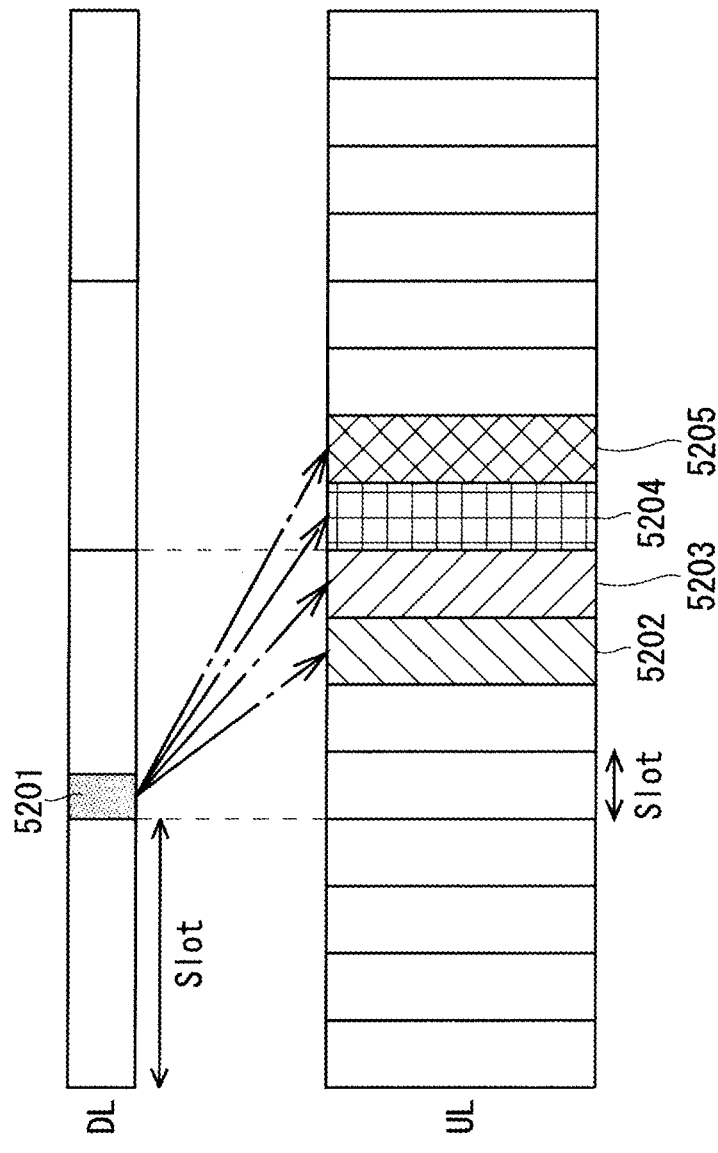
FIG. 37 illustrates a problem in the PUSCH scheduling when the downlink and the uplink have different numerologies according to the fifth embodiment.

FIG. 37 illustrates a problem in the PUSCH scheduling when the downlink and the uplink have different numerologies. In FIG. 37, the scheduling information on PUSCH 5202 to 5205 is transmitted by a PDCCH 5201. Here, the slot duration from the PDCCH 5201 to each of the PUSCHs 5202 to 5205 ranges from 2 to 5 slots. Thus, the slot durations vary, depending on a position of a slot. Consequently, latencies in the transmission of the PUSCH vary, depending on the position of the slot.

A solution to the problem is disclosed.

The base station may include the PUSCH scheduling information in the PDCCH in the middle of a slot to notify the UE of the PUSCH scheduling information. The UE may obtain the PUSCH scheduling information through receiving the PDCCH in the middle of the slot. The PDCCH may be, for example, a PDCCH for scheduling a non-slot.

Whether the uplink scheduling information is included in the PDCCH in the beginning of a downlink slot or the PDCCH in the middle of the slot may be determined, depending on a position of an uplink slot. Furthermore, the position of a slot in which the PDCCH including the uplink scheduling information is placed may be determined, depending on the position of the uplink slot. This can, for example, reduce variations in the latency in transmission of the PUSCH.

Figure 38:
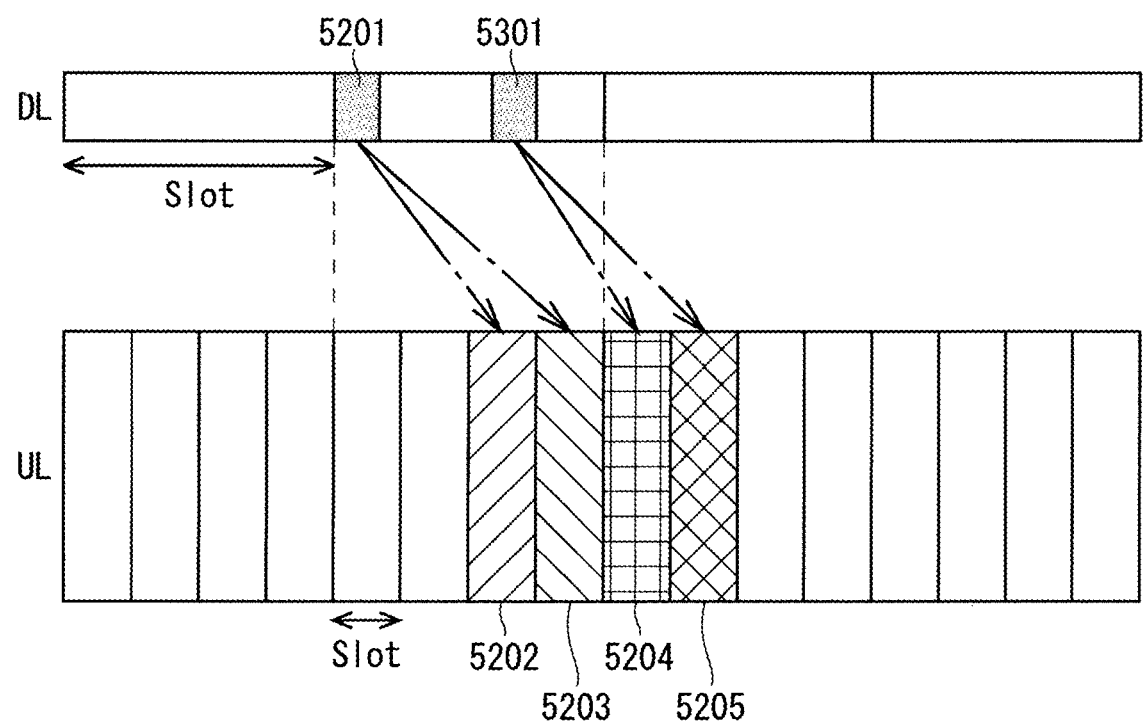
FIG. 38 illustrates the PUSCH scheduling using the PDCCH in the middle of a slot according to the fifth embodiment.

FIG. 38 illustrates the PUSCH scheduling using the PDCCH in the middle of a slot. FIG. 38 illustrates an example where the uplink slot length is shorter than the downlink slot length. FIG. 38 also illustrates an example using both of the PDCCH in the beginning of a slot and the PDCCH in the middle of the slot. In FIG. 38, the same figure numbers are applied to the signals common to those in FIG. 37, and the common description thereof is omitted.

In FIG. 38, the scheduling information on the PUSCHs 5202 and 5203 is included in the PDCCH 5201 in the beginning of the slot, and notified to the UE. The scheduling information on the PUSCHs 5204 and 5205 is included in a PDCCH 5301 in the middle of the slot, and notified to the UE.

A correspondence between the positions of the PDCCHs and the positions of the PUSCHs may be determined in a standard. Alternatively, the base station may determine the correspondence and notify or broadcast the correspondence to the UE.

The conditions and/or equations for determining a slot duration from reception of the PDCCH including the uplink grant to transmission of the PUSCH by the UE (see Non-Patent Document 15 (TS 38.214 v15.0.0)) may include a symbol number including the PDCCH. The symbol number may be the first symbol number or the last symbol number of the PDCCH. As another example, the conditions and/or equations may include information for identifying a non-slot, for example, a non-slot number. The non-slot number may be, for example, a number given by dividing slots per several symbols or a number assigned to each position in which the non-slot is allocated in a slot. Consequently, for example, a common parameter for using both of the PDCCH in the middle of a slot and the PDCCH in the beginning of the slot is available. Consequently, options of parameters that can be selected by the base station in the scheduling, and flexibility in the uplink transmission can be increased.

As another example, the conditions and/or equations for determining the slot duration may be given per symbol or per non-slot number. This can, for example, configure a value of a duration shorter than a unit of slot. As a result, the low latency in the communication is possible.

The methods disclosed in the fifth embodiment may be applied to the other uplink signals or channels. For example, the methods may be applied to the SRS, the PUCCH including the HARQ feedback, and the PUSCH including the CSI report. This can, for example, reduce variations in the latency in the signals or channels which depend on a position of an uplink slot.

The methods disclosed in the fourth embodiment may be applied to the fifth embodiment. For example, the low latency PUSCH to be transmitted using the low latency BWP may be scheduled using the PDCCH in the middle of a slot. This can, for example, prevent a variance in the use BWP between the base station and the UE when the PUSCH with a normal latency and the PUSCH requiring a lower latency are transmitted in parallel with each other.

The fifth embodiment can reduce variations in the latency in the uplink PUSCH which depend on a position of a slot. Consequently, the latency in transmission of the uplink PUSCH can be reduced.

The embodiments and the modifications are mere exemplifications of the present invention, and can be freely combined within the scope of the present invention. The arbitrary constituent elements of the embodiments and the modifications can be appropriately modified or omitted.

A subframe in the embodiments and the modifications is an example time unit of communication in the fifth generation base station communication system. The subframe may be configured per scheduling. The processes described in the embodiments and the modifications as being performed per subframe may be performed per TTI, per slot, per sub-slot, or per mini-slot.

While the invention is described in detail, the foregoing description is in all aspects illustrative and does not restrict the present invention. Therefore, numerous modifications and variations that have not yet been exemplified are devised without departing from the scope of the present invention.

DESCRIPTION OF REFERENCES 200 communication system, 202 communication terminal device, 203 base station device.

The invention claimed is:

1. A user apparatus in a communication system comprising: a plurality of user apparatuses each of which is configured to transmit a sounding reference signal (SRS); and a base station configured to wirelessly communicate with the plurality of the user apparatuses, wherein
a user apparatus of the plurality of user apparatuses receives, from the base station, a notification about configuration information related to a wireless resource of the sounding reference signal allocated to another user apparatus of the plurality of user apparatuses, and
the configuration information includes information to identify the wireless resource, information related to a port corresponding to the wireless resource, information related to comb configuration of the wireless resource, information related to a transmission symbol of the wireless resource, information related to a transmission frequency of the wireless resource, information related to a type of the wireless resource, information related to a sequence of the wireless resource, information related to a transmission cycle and an offset of the wireless resource, information related to a beam for the wireless resource, and information related to a numerology of the wireless resource.

2. The user apparatus according to claim 1, wherein the configuration information is transmitted from the base station by using a radio resource control (RRC) signaling.

3. The user apparatus according to claim 2, wherein the configuration information is transmitted from the base station by using an RRC reconfiguration message.

4. The user apparatus according to claim 3, wherein the user apparatus receives the configuration information when being an RRC_Connected state.

5. A base station in a communication system comprising: a plurality of user apparatuses each of which is configured to transmit a sounding reference signal (SRS); and the base station configured to wirelessly communicate with the plurality of the user apparatuses, wherein
the base station sends a notification to a user apparatus of the plurality of user apparatuses about configuration information related to a wireless resource of the sounding reference signal allocated to another user apparatus of the plurality of user apparatuses, and
the configuration information includes information to identify the wireless resource, information related to a port corresponding to the wireless resource, information related to comb configuration of the wireless resource, information related to a transmission symbol of the wireless resource, information related to a transmission frequency of the wireless resource, information related to a type of the wireless resource, information related to a sequence of the wireless resource, information related to a transmission cycle and an offset of the wireless resource, information related to a beam for the wireless resource, and information related to a numerology of the wireless resource.

6. A communication system comprising:
a plurality of user apparatuses each of which is configured to transmit a sounding reference signal (SRS); and
a base station configured to wirelessly communicate with the plurality of the user apparatuses, wherein
the base station sends a notification to a user apparatus of the plurality of user apparatuses about configuration information related to a wireless resource of the sounding reference signal allocated to another user apparatus of the plurality of user apparatuses, and
the configuration information includes information to identify the wireless resource, information related to a port corresponding to the wireless resource, information related to comb configuration of the wireless resource, information related to a transmission symbol of the wireless resource, information related to a transmission frequency of the wireless resource, information related to a type of the wireless resource, information related to a sequence of the wireless resource, information related to a transmission cycle and an offset of the wireless resource, information related to a beam for the wireless resource, and information related to a numerology of the wireless resource.

* * * * *